(12) United States Patent
Hugenroth et al.

(10) Patent No.: US 12,336,550 B2
(45) Date of Patent: Jun. 24, 2025

(54) FROZEN CONFECTION MACHINE

(71) Applicant: CREMMJOY INC., Baton Rouge, LA (US)

(72) Inventors: Jason Hugenroth, Baton Rouge, LA (US); Max Louis Lemoine, Baton Rouge, LA (US); Daniel Ross Stelly, Baton Rouge, LA (US)

(73) Assignee: CREMMJOY INC., Baton Rouge, LA (US)

( * ) Notice: Subject to any disclaimer, the term of this patent is extended or adjusted under 35 U.S.C. 154(b) by 369 days.

(21) Appl. No.: 17/428,091

(22) PCT Filed: Feb. 4, 2020

(86) PCT No.: PCT/US2020/016628
§ 371 (c)(1),
(2) Date: Aug. 3, 2021

(87) PCT Pub. No.: WO2020/163369
PCT Pub. Date: Aug. 13, 2020

(65) Prior Publication Data
US 2022/0159992 A1    May 26, 2022

Related U.S. Application Data

(60) Provisional application No. 62/942,467, filed on Dec. 2, 2019, provisional application No. 62/854,601, filed
(Continued)

(51) Int. Cl.
*A23G 9/08* (2006.01)
*A23G 9/22* (2006.01)
(Continued)

(52) U.S. Cl.
CPC ............ *A23G 9/224* (2013.01); *A23G 9/08* (2013.01); *A23G 9/281* (2013.01); *B01F 31/312* (2022.01);
(Continued)

(58) Field of Classification Search
CPC ........ A23G 9/224; A23G 9/227; A23G 9/281; A23G 9/08; A23G 9/12; A23G 9/14;
(Continued)

(56) References Cited

U.S. PATENT DOCUMENTS

| | | |
|---|---|---|
| 3,332,670 A | 7/1967 | Swartz |
| 3,828,571 A | 8/1974 | Lechner |

(Continued)

FOREIGN PATENT DOCUMENTS

| | | | | |
|---|---|---|---|---|
| AU | 2015216694 A1 | * | 8/2016 | ............. A23G 9/045 |
| CN | 105876066 A | | 8/2016 | |

(Continued)

OTHER PUBLICATIONS

WO-2016090438-A1 English Translation (Year: 2016).*
(Continued)

Primary Examiner — David J Teitelbaum
Assistant Examiner — Devon Moore
(74) *Attorney, Agent, or Firm* — Carlson, Gaskey & Olds, P.C.

(57) ABSTRACT

Apparatuses, systems, and methods are disclosed for eliminating or greatly reducing the cleaning process of frozen confection apparatus or machines by having the comestible mixture contained in a flexible container or bag. The comestible mixture is chilled and/or frozen and dispensed from the bag without contacting other parts of the machine, thereby helping to prevent the comestible mixture from being contaminated with bacterial, viral, chemical, or physical contaminants.

53 Claims, 40 Drawing Sheets

Related U.S. Application Data on May 30, 2019, provisional application No. 62/801,194, filed on Feb. 5, 2019.

(51) Int. Cl.
*A23G 9/28* (2006.01)
*B01F 31/31* (2022.01)
*B01F 35/90* (2022.01)
*B01F 101/13* (2022.01)

(52) U.S. Cl.
CPC .......... *B01F 35/90* (2022.01); *B01F 2035/98* (2022.01); *B01F 2101/13* (2022.01)

(58) Field of Classification Search
CPC .......... A23G 9/16; A23G 9/163; A23G 9/166; A23G 9/106; A23G 9/00; A23G 9/287; A23G 9/283; B01F 35/90; B01F 31/312; B01F 2035/98; B01F 2101/13; B01F 31/651; B01F 31/65; F16K 7/07; F16K 7/10; B67D 1/0001; B67D 1/0462; B67D 1/0801

See application file for complete search history.

(56) References Cited

U.S. PATENT DOCUMENTS

| | | | |
|---|---|---|---|
| 3,828,572 A | 8/1974 | Calim | |
| 4,022,031 A | 5/1977 | Calim | |
| 4,049,242 A * | 9/1977 | Porter | B01F 31/55 366/292 |
| 4,550,653 A | 11/1985 | Hedenberg | |
| 4,717,047 A | 1/1988 | van Overbruggen et al. | |
| 5,405,054 A | 4/1995 | Thomas | |
| 5,520,010 A | 5/1996 | Altman | |
| 5,875,930 A | 3/1999 | Nakajima et al. | |
| 6,016,935 A | 1/2000 | Huegerich et al. | |
| 6,142,340 A | 11/2000 | Watanabe et al. | |
| 6,419,121 B1 | 7/2002 | Gutierrez et al. | |
| 6,439,759 B1 | 8/2002 | Ray et al. | |
| 6,691,894 B2 | 2/2004 | Chrisman et al. | |
| 6,814,262 B1 | 11/2004 | Adams et al. | |
| 6,868,987 B2 | 3/2005 | Hedington et al. | |
| 8,181,568 B1 | 5/2012 | Hofman et al. | |
| 8,602,259 B2 | 12/2013 | Py et al. | |
| 8,678,236 B2 | 3/2014 | Burke et al. | |
| 8,944,289 B2 | 2/2015 | Cocchi et al. | |
| 9,505,600 B2 | 11/2016 | Vulpitta et al. | |
| 9,591,865 B2 | 3/2017 | Rayji et al. | |
| 10,017,371 B2 | 7/2018 | Vulpitta et al. | |
| 10,207,234 B2 | 2/2019 | Ray et al. | |
| 2003/0085237 A1 | 5/2003 | Kateman et al. | |
| 2004/0250554 A1 | 12/2004 | Kateman et al. | |
| 2004/0251270 A1 | 12/2004 | Davis et al. | |
| 2006/0134275 A1 | 6/2006 | Maeda et al. | |
| 2007/0154605 A1 | 7/2007 | Kobayashi et al. | |
| 2008/0105711 A1 | 5/2008 | Kirimli et al. | |
| 2008/0149664 A1 | 6/2008 | Schroeder et al. | |
| 2008/0290117 A1 | 11/2008 | Schroeder et al. | |
| 2011/0068120 A1 | 3/2011 | McGill | |
| 2015/0253067 A1 | 9/2015 | Bucceri | |
| 2015/0289708 A1 | 10/2015 | Ezaz-Nikpay et al. | |
| 2016/0174593 A1 * | 6/2016 | Cocchi | A23G 9/12 62/132 |
| 2017/0015541 A1 | 1/2017 | Vulpitta et al. | |
| 2017/0172173 A1 | 6/2017 | Navarro et al. | |
| 2018/0110238 A1 | 4/2018 | Mohammed et al. | |
| 2018/0289034 A1 | 10/2018 | Vulpitta et al. | |
| 2019/0142028 A1 | 5/2019 | Arao et al. | |
| 2019/0234685 A1 | 8/2019 | Heninger | |
| 2019/0345430 A1 | 11/2019 | Sethi et al. | |

FOREIGN PATENT DOCUMENTS

| | | | | |
|---|---|---|---|---|
| EP | 2266417 A1 | 12/2010 | | |
| FR | 2172749 A1 | 10/1973 | | |
| GB | 2348637 A | 10/2000 | | |
| IT | 201700101073 A1 | 3/2019 | | |
| JP | 2001-95495 A | 4/2001 | | |
| WO | 98/54979 A1 | 12/1998 | | |
| WO | 03/070071 A1 | 8/2003 | | |
| WO | 2007/108136 A1 | 9/2007 | | |
| WO | WO-2010149509 A1 * | 12/2010 | ............ | A23G 9/08 |
| WO | WO-2014067987 A1 * | 5/2014 | ............ | A23G 9/08 |
| WO | WO-2014182423 A2 * | 11/2014 | ............ | A23L 2/04 |
| WO | 2015/073511 A2 | 5/2015 | | |
| WO | WO-2016090438 A1 * | 6/2016 | ............ | A61M 39/22 |
| WO | WO-2017200022 A1 * | 11/2017 | ............ | A23G 9/22 |
| WO | 2018/141758 A1 | 8/2018 | | |
| WO | WO 2018/215743 A1 | 11/2018 | | |

OTHER PUBLICATIONS

WO-2017200022-A1 English Translation (Year: 2017).*
International Preliminary Report on Patentability issued Aug. 10, 2021 for International application No. PCT/US2020/016628 (20 pages).
International Search Report and Written Opinion of the International Searching Authority issued Jun. 10, 2020 for International application No. PCT/US2020/16628.
European Search Report for EP Application No. 21827914.9 dated Jun. 24, 2024.
European Search Report for EP Application No. 20751966.1 dated Sep. 27, 2022.
International Search Report and Written Opinion for PCT Application No. PCT/US2021/039105 mailed Sep. 29, 2021.
International Preliminary Report on Patentability for PCT Application No. PCT/US2021/039105 dated Dec. 13, 2022.

* cited by examiner

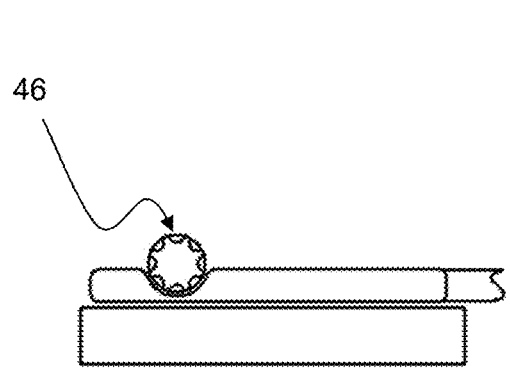
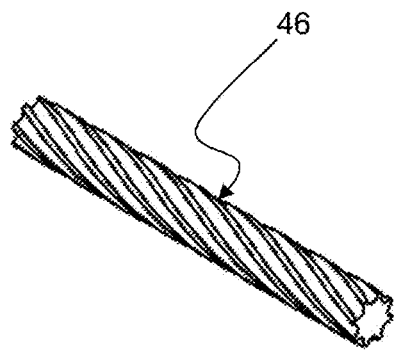
Fig. 9A
Fig. 9B
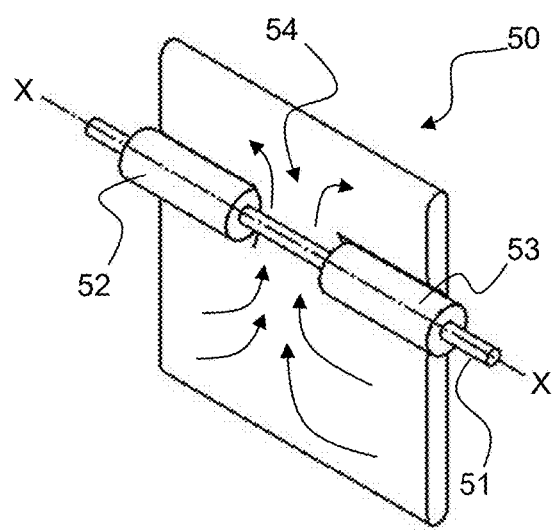
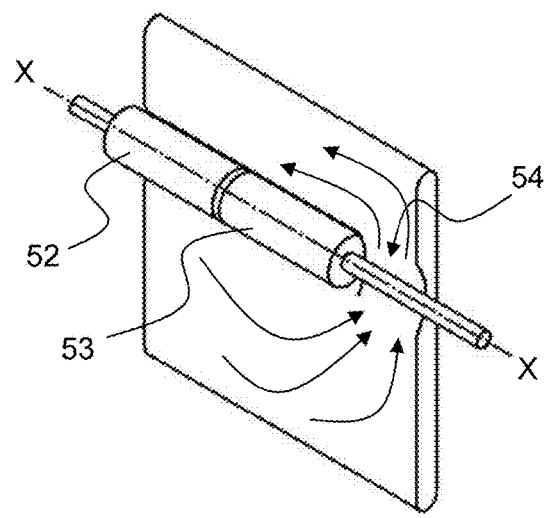
Fig. 10A
Fig. 10B

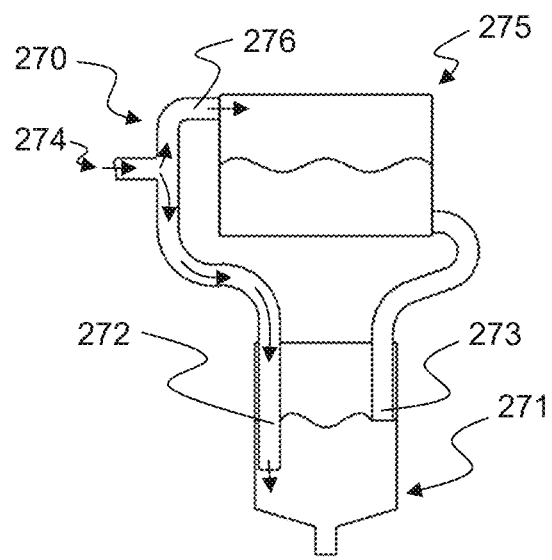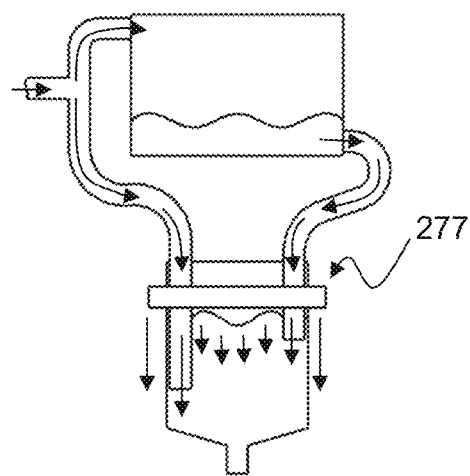
Fig. 31A            Fig. 31B
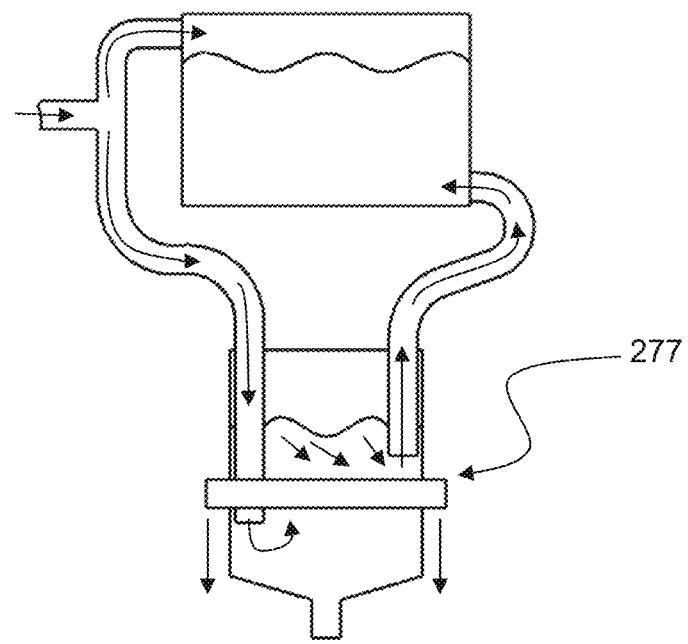
Fig. 31C

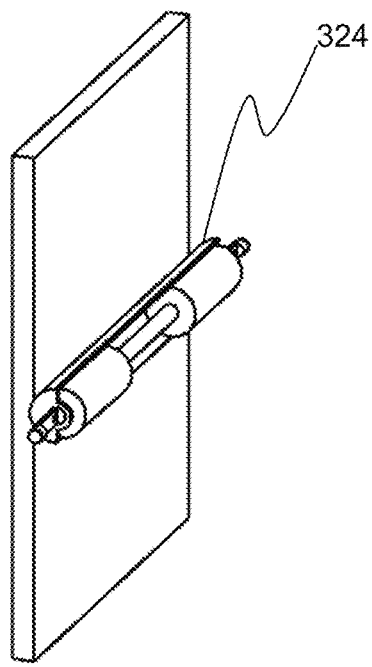 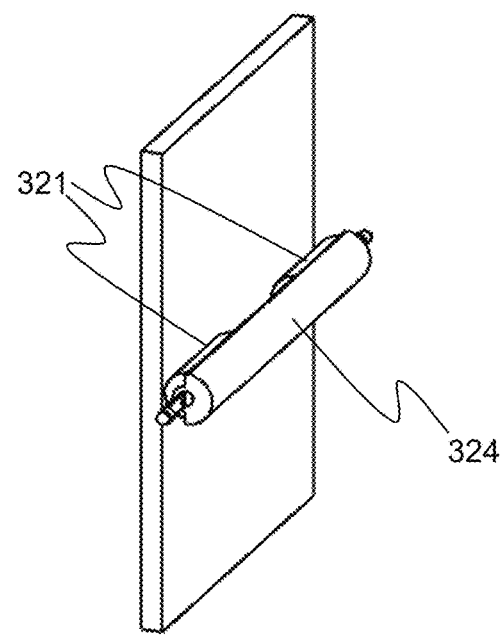
Fig. 44A  Fig. 44B
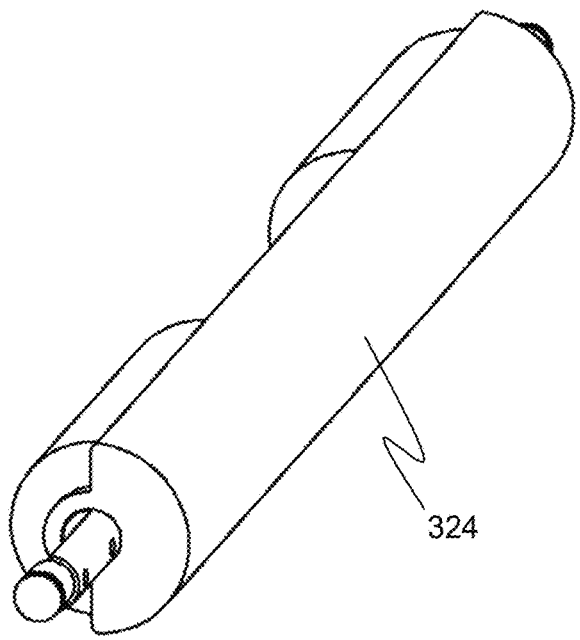 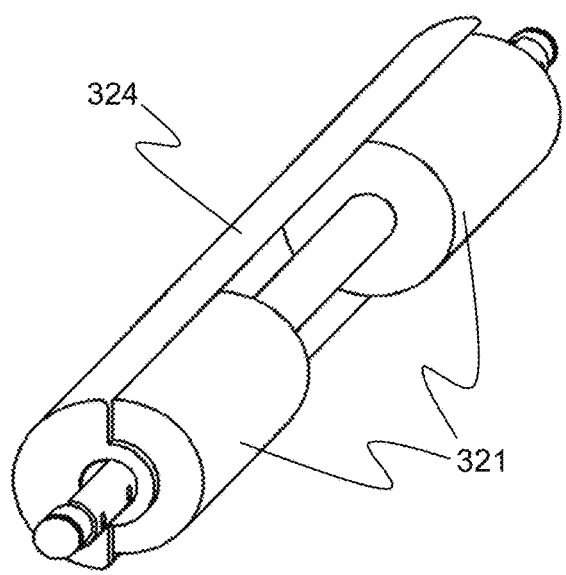
Fig. 45A  Fig. 45B

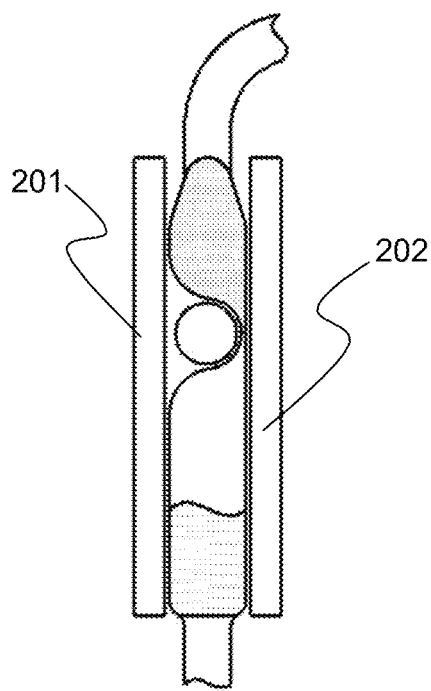
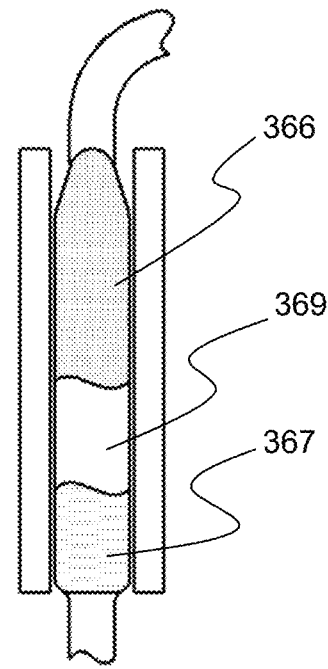
Fig. 49A　　　　　　　　Fig. 49B
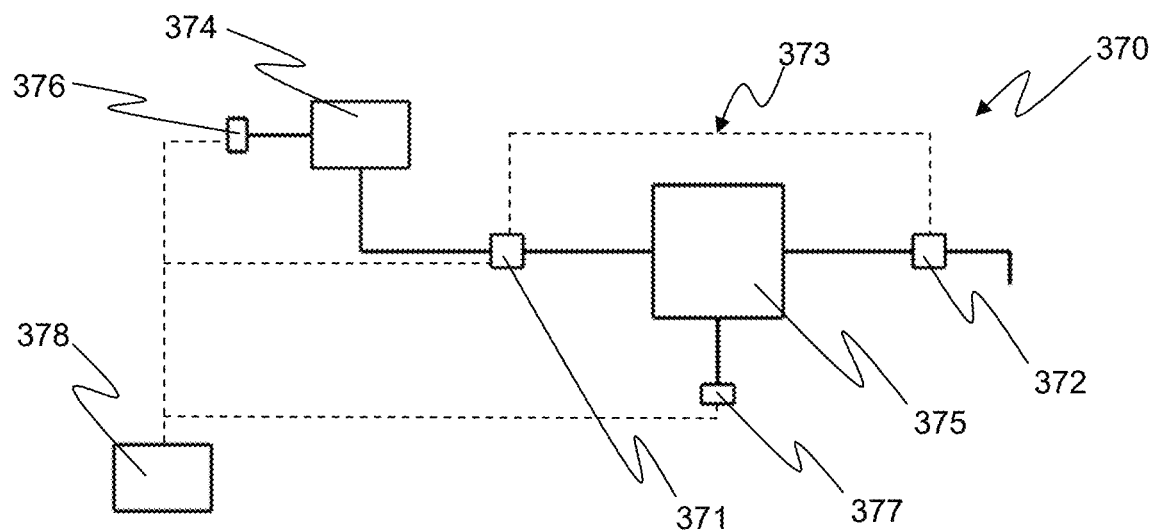
Fig. 50

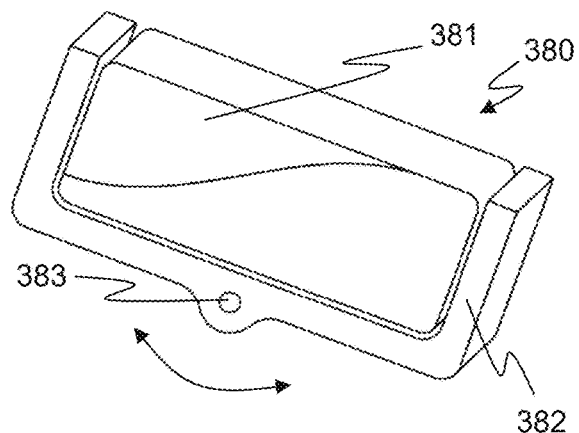
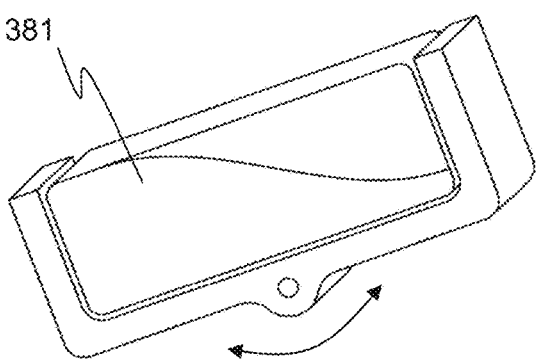
Fig. 51A
Fig. 51B
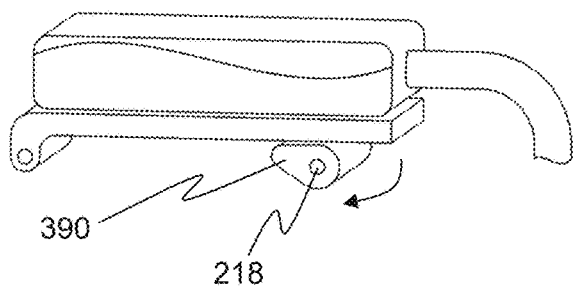
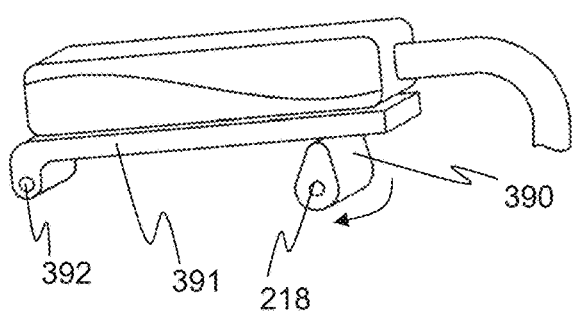
Fig. 52A
Fig. 52B

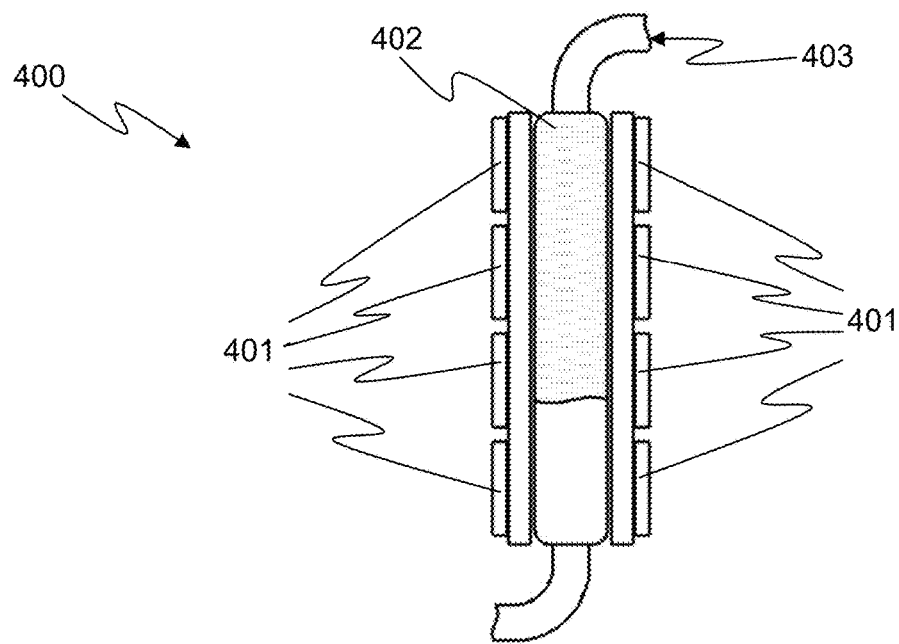
Fig. 53
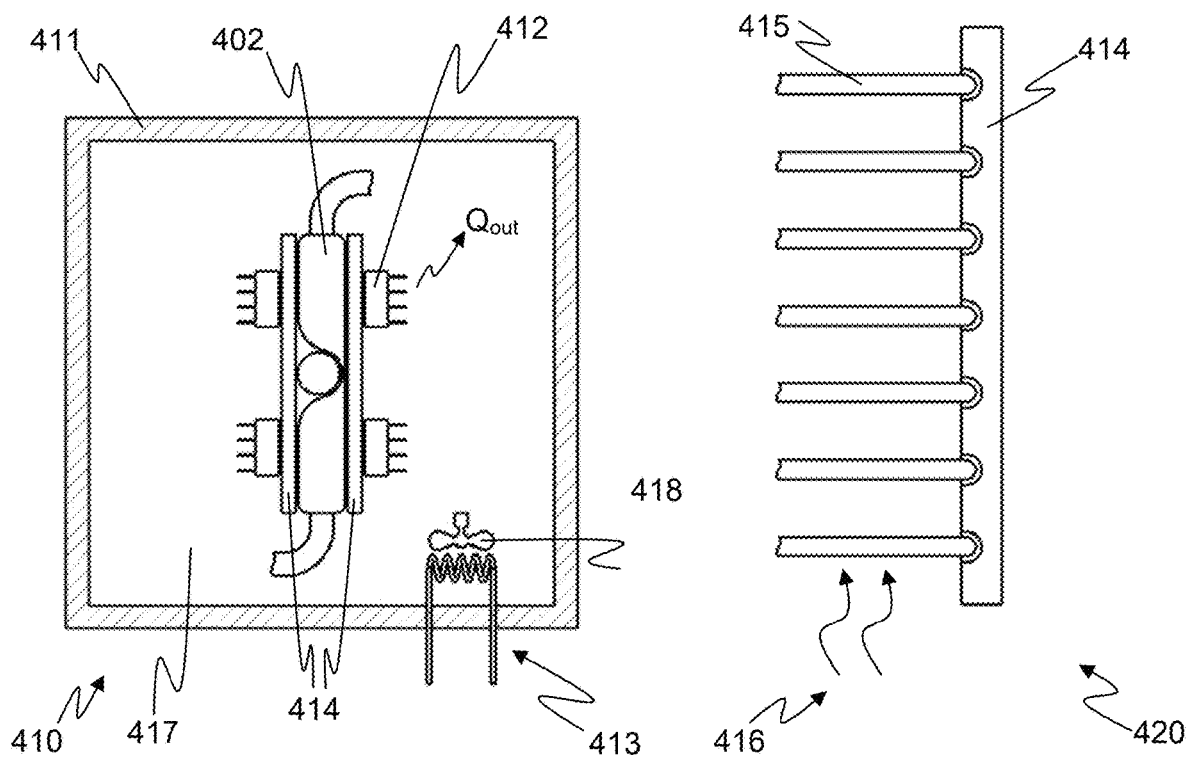
Fig. 54
Fig. 55

FROZEN CONFECTION MACHINE

This application claims the priority benefit of each of U.S. Provisional Patent Application Ser. No. 62/801,194 filed Feb. 5, 2019, U.S. Provisional Patent Application Ser. No. 62/854,601 filed May 30, 2019, and U.S. Provisional Patent Application Ser. No. 62/942,467, filed Dec. 2, 2019, the entire disclosure of each of which is fully incorporated herein by reference.

BACKGROUND

The present exemplary embodiment relates to apparatuses, systems, and methods for freezing and dispensing confections such as ice cream, smoothies, sorbets, gelatos, yogurts, daiquiris, margaritas, etc., and the like. It finds particular application in conjunction with low cost disposable packages, typically flexible containers, packages, tubes or bags, which contain a comestible mixture for producing more than a single serving of such confections and will be described with particular reference thereto. However, it is to be appreciated that the present exemplary embodiment is also amenable to other like applications. Generally, machines that freeze and dispense product are referred to as "frozen confection machines" or apparatus, and distinguishable from "frozen confection dispensing machines" that only dispense but don't freeze an initially liquid mix or substance.

Most existing frozen confection machines that freeze and dispense product (e.g., soft serve ice cream machines) have a similar structure despite being made by various manufacturers. Typically, these machines have a reservoir of comestible mixture in liquid form. The reservoir is often referred to as a hopper. A tube feeds the comestible mixture from the hopper into a cylindrical shaped barrel. If the hopper is located above the barrel, the liquid comestible mixture can be fed to the barrel by gravity. If the hopper is located below the barrel, a pump is used to feed comestible mixture to the barrel. A means for drawing air into the barrel with the comestible mix is also usually provided for soft serve ice cream and similar products. This is not necessary for some products such as slushes. A refrigeration system cools the walls of the barrel. A rotatable auger assembly is installed in the barrel. The auger, which typically rotates at about 200 RPM performs several functions. It distributes the comestible mixture along the walls of the barrel, where freezing occurs. The auger rapidly scrapes the frozen comestible mixture from the wall of the barrel, thus keeping the size of ice crystals small. The auger vigorously mixes the air and comestible mixture in the barrel. Air mixed in with the frozen product is referred to as overrun. Small ice crystal size and overrun are what give soft serve ice cream its smooth creamy texture. The auger typically has a helical shape which urges the frozen comestible mixture to the front of the barrel where dispensing occurs through a user operable dispensing nozzle. When product is dispensed liquid comestible mix from the hopper is admitted to the back of the barrel. Critically, the auger and barrel design is such that liquid comestible mixture at the back of the barrel does not mix with the frozen comestible mix at the front of the barrel. This prevents undesirable softening of the frozen comestible mix that is ready to dispense.

A common deficiency of the aforementioned existing technology is that the frozen confection machine must be disassembled on a regular basis to clean and sanitize all components that contact the comestible mixture. The cleaning process is typically performed daily, or every few days depending on machine type and local health code regulations. The cleaning process is laborious, time consuming, requires worker skill, is prone to errors and poses health risks if done incorrectly. It would be desirable to provide apparatuses, systems, and/or methods related to frozen confection machines which addresses at least the aforementioned issues of the prior art. The current invention is distinct from prior art, such as U.S. Pat. No. 10,017,371, that addresses the simple task of dispensing already frozen or viscous product from a flexible container. The current invention is distinct from prior art such as U.S. Pat. No. 9,591,865 that addresses freezing and dispensing a single serving of frozen confection from a flexible container.

BRIEF DESCRIPTION

A frozen confection apparatus formed in accordance with the present disclosure includes a cooling element and a flexible container containing a comestible mixture or substance (referred to herein as mixture). The flexible container is disposed such that the cooling element cools the comestible mixture through an outer surface of the flexible container. At least one physical element, such as a roller(s), shoe(s), pressing member(s), ultrasonic component(s), etc., in preferred embodiments, is arranged to interact with or contact at least a portion of the flexible container. Typically, but not in all cases, the physical element causes the inner walls of the flexible container to contact each other in the area of the physical element, such that a temporary seal is formed. This scrapes and crushes ice crystals on or near the inner surface of the flexible container, or otherwise in the vicinity of the physical element, while causing the comestible mixture to flow and mix within the flexible container. When comestible mixture is not being dispensed, at least one passage is provided to permit continuous flow of comestible mixture within the flexible container, thus, preventing a flow blockage. In accordance with the present disclosure the flexible container can be made from expendable materials such as but not limited to polyethylene and nylon films.

In accordance with some embodiments of the frozen confection apparatus, the physical element/roller contacts less than a total width of the flexible container to form a flow passage within the flexible container. The less than full width contact can be affected by controlling the width of the roller, position of the roller on the flexible container, or the physical shape of the roller.

According to other embodiments, the flexible container of the frozen confection apparatus further includes a dispensing tube, and the passage enables the comestible mixture to flow around the roller when the dispensing tube is closed.

In accordance with additional embodiments of the frozen confection apparatus disclosed herein, the physical element is arranged to contact a full width of the flexible container and the physical element has a feature formed thereon to enable the flow of comestible mixture through the feature of the physical element. In particular embodiments, the feature of the physical element is a dispensing shoe which selectively defines a gap through which the comestible mixture can flow.

According to some embodiments, the physical element/ roller is made of multiple rollers spaced apart from each other to enable the flow of comestible mixture through the spaces. In other embodiments, the frozen confection apparatus of the present disclosure further includes a control mechanism operable to move the roller. In accordance with some additional embodiments, the frozen confection apparatus includes a pump located adjacent a dispensing tube of the flexible bag.

In accordance with some further embodiments of the frozen confection apparatus, the flexible container is pressurized with a liquid or gas. In some more particular embodiments, the frozen confection apparatus additionally includes a first cold plate and a second cold plate. The pressurized flexible container is structurally supported between the first and second cold plates. The pressurized flexible container also thermally contacts both the first and second cold plates.

According to other embodiments of the frozen confection apparatus, a reservoir containing the comestible mixture is also included. The reservoir is in fluid communication with the flexible container to enable flow of the comestible mixture from the reservoir container to the flexible container. According to some embodiments it is desirable for the reservoir to be flexible. According to other embodiments the reservoir can be rigid or semi-rigid and can be made from expendable materials such as polyethylene plastic. Expendable materials can include the materials that provide fluid communication between the reservoir and flexible container and the dispensing nozzle.

In accordance with additional embodiments of the frozen confection apparatus, the flexible container is a first flexible container containing a first comestible mixture and the apparatus further includes a second flexible container containing a second comestible mixture. In such embodiments, a selective dispensing mechanism can be provided to permit dispensing from one or both of the first and second flexible containers. In some particular embodiments, the selective dispensing mechanism includes a valve or a pump unit on the first and second flexible containers. The embodiments that illustrate up to two flexible containers in a single frozen confection machine are not intended to be limiting. The frozen confection machine can contain more than two flexible containers.

A method for making a frozen confection apparatus in accordance with the present disclosure includes: providing a flexible container containing a comestible mixture or substance and at least one physical element interacting or contacting at least of portion of the flexible container, moving the physical element to knead the comestible mixture within the flexible container, and continuously freezing and dispensing the comestible mixture where the term "continuous" is understood to mean that when product is dispensed, more liquid comestible mixture or substance is introduced from the reservoir to be frozen. Thus, the actual steps of dispensing, freezing, and feeding from the reservoir are typically intermittent, and the user dispenses product as needed.

In accordance with some embodiments of the method for making a frozen confection apparatus, the method also includes supporting the flexible container between a first support structure and a second support structure. The first support structure and second support structure, optionally, being a first cold plate and a second cold plate. Optionally, the flexible container is pressurized with a gas or a liquid. In some particular embodiments, the method further includes providing a reservoir containing the comestible mixture and introducing the comestible mixture from the reservoir to the flexible container to thereby enable the continuous freezing and dispensing of the comestible mixture.

In accordance with other particular embodiments, the flexible container is provided as a first flexible container containing a first comestible mixture and the method further includes providing a second flexible container containing a second comestible mixture and selectively dispensing one or both of the first and second comestible mixtures.

A frozen confection apparatus formed in accordance with another embodiment of the present disclosure includes a pressurized flexible container having at least one inlet and outlet. The pressurized flexible container contains a comestible mixture. A first and second cold plate are also included and the pressurized flexible container is structurally supported between the first and second cold plates. In addition, one or more rollers are arranged to contact at least a portion of the flexible container to enable the comestible mixture to flow within the flexible container. At least one passage is located adjacent the physical element(s) to enable flow of the comestible mixture around the portion of the physical element(s) which interacts/interact or contacts/contact the flexible container. Finally, a reservoir containing the comestible mixture is in fluid communication with the inlet of the pressurized flexible container to enable flow of the comestible mixture from the reservoir container to the flexible container.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

FIGS. 6 and 7 represent one version of dispensing a flowable frozen confection.

FIGS. 8, 9A-9B, and 10A-10B schematically illustrate alternative arrangements of kneading a frozen confection.

FIG. 31A is an illustration of a simplified view of a freezer bag system made in accordance with the present disclosure and which includes features for controlling liquid and air levels;

FIG. 31B is an illustration showing additional detail of the freezer bag system of FIG. 31A;

FIG. 31C is another illustration showing additional detail of the freezer bag system of FIG. 31A;

FIG. 44A illustrates an exemplary roller assembly suitable for use in a frozen confection machine made in accordance with the present disclosure and which includes a roller with dispensing shoe feature that extends the full length/width of a freeze bag;

FIG. 44B is an illustration showing additional detail of the roller with dispensing shoe feature of FIG. 44A;

FIG. 45A is another illustration with additional detail of the roller and dispensing shoe feature of FIG. 44A;

FIG. 45B is an additional illustration showing details of the roller and dispensing shoe feature of FIG. 44A;

FIG. 49A is a simplified side view illustration of the freezer bag system of FIG. 48;

FIG. 49B is a second simplified side view illustration of the freezer bag system of FIG. 48;

FIG. 50 illustrates an exemplary embodiment of a freezer bag system suitable for use in a frozen confection machine made in accordance with the present disclosure where the system includes a fill pump and a dispense pump/flow meter;

FIG. 51A illustrates an exemplary embodiment that is intended to agitate contents in a reservoir which is suitable for use in a frozen confection machine made in accordance with the present disclosure;

FIG. 51B is another illustration of agitating contents of the reservoir from FIG. 51A;

FIG. 52A is illustrates another exemplary embodiment that agitates contents stored in a reservoir which is suitable for use in a frozen confection machine made in accordance with the present disclosure;

FIG. 52B is another illustration of the design that agitates the contents stored in the reservoir from FIG. 52A;

FIG. 53 illustrates a simplified view of an exemplary kneader assembly with a plurality of piezoelectric transducers/rollers suitable for use in a frozen confection machine made in accordance with the present disclosure;

FIG. 54 is an illustration of an exemplary embodiment of a cooling system suitable for use in a frozen confection machine made in accordance with the present disclosure;

FIG. 55 is an illustration of another exemplary embodiment of a cooling system suitable for use in a frozen confection machine made in accordance with the present disclosure and which includes heat pipes;

FIG. 68D is yet another illustration showing additional details of the agitation system of FIG. 68A; and, FIG. 69 illustrates an exemplary embodiment of a freezer bag system suitable for use in a frozen confection machine made in accordance with the present disclosure and which includes encrypted codes associated with the freeze bag and reservoir bag.

FIG. 70A illustrates an exemplary embodiment of a dispensing roller apparatus.

FIG. 70B is an end view of the FIG. 70A embodiment with the dispensing roller in a first position.

FIG. 70C is an end view of the FIG. 70A embodiment with the dispensing roller in a second position.

FIG. 71 illustrates a flexible bag retention system.

FIGS. 72A-72B show a flexible bag system with a bypass tube.

DETAILED DESCRIPTION

Figure 1:
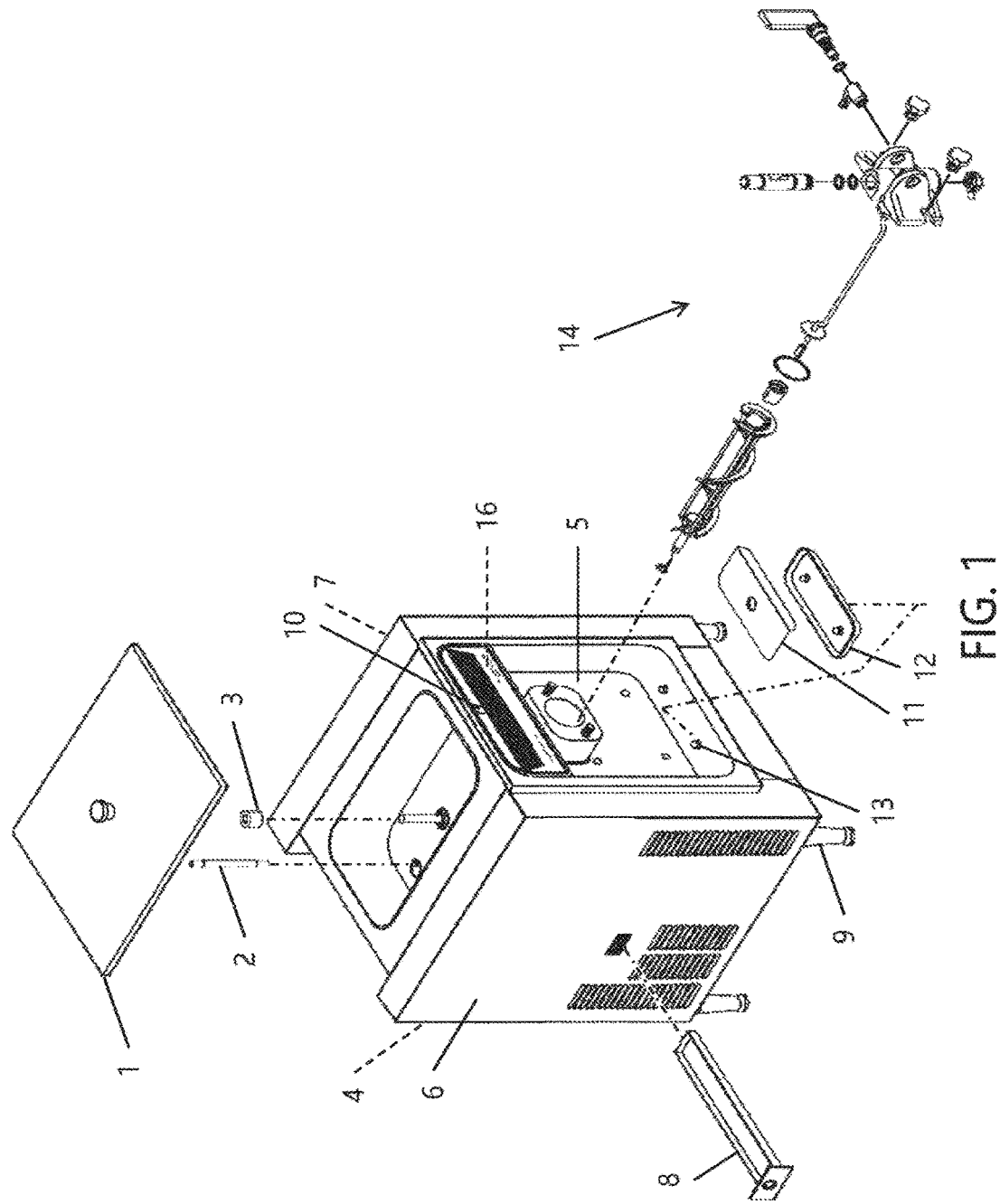
FIG. 1 shows a prior art exploded view of a typical frozen confection machine such as a soft serve ice cream machine.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The present disclosure discloses embodiments of apparatuses, systems, and methods related to confection dispensing which eliminate or greatly reduce the cleaning process of machines which dispense such confection products. The required cleaning procedure for existing confection dispensing machines (e.g., soft serve ice cream machines, daiquiri machines, etc., and the like) poses a significant maintenance burden on the operator. Moreover, improper cleaning represents a potential health risk for consumers of the frozen product. Apparatuses, systems, and methods of freezing and dispensing soft serve ice cream without the maintenance and health risk of prior art machines is herein disclosed. This is achieved by having the comestible mixture contained in a flexible container, package, or bag. The comestible mixture is chilled and/or frozen and dispensed from the bag without contacting other parts of the machine that could cause the comestible mixture to be contaminated with bacterial, viral, chemical or physical contaminants. Several embodiments are disclosed wherein the comestible mixture being chilled and/or frozen is generally described as ice cream. However, it should be understood that any comestible mixture could be used without departing from the scope of the present disclosure.

FIG. 1 shows a prior art exploded view of a typical soft serve ice cream machine. The prior art soft serve ice cream machine is generally made of components known in the art, including but not limited to: hopper cover 1, feed tube 2, mix level float 3, rear and front panels 4 and 5, side panels 6 and 7, drip pan 8, leg(s) 9, low mix indicator light 10, splash shield 11, drip tray 12, drip tray holder 13, and mix dispensing assembly 14. Most of the components shown require cleaning and sanitizing as often as daily based on the machine and local regulations.

Figure 2:
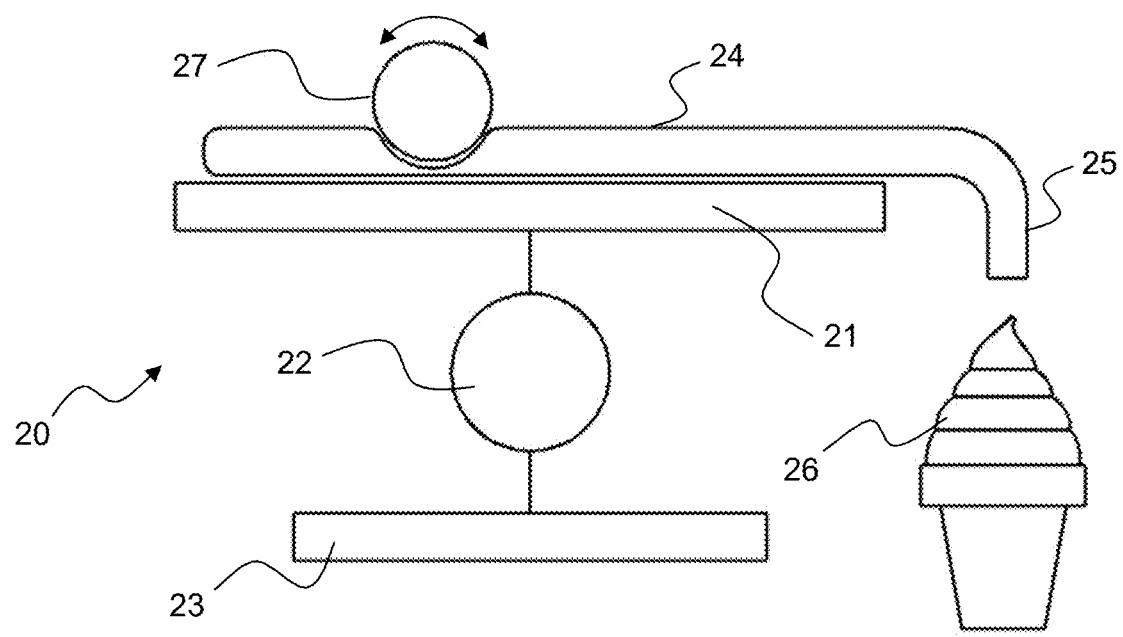
FIGS. 2 and 3 schematically illustrate a simplified version of the present disclosure.

FIG. 2 shows a simplified view of an embodiment of the present disclosure. The frozen confection machine or apparatus 20 having a refrigeration system that includes a heat absorber or heat absorbing element, such as a cold plate 21, which is maintained at a relatively cold temperature, and a heat rejector 23. The cold plate 21 can be any of a number of shapes and form factors, many of which are known in the art. The refrigeration system can be one or a combination of a variety of refrigeration technologies known in the art, including but not limited to: vapor compression, thermoelectric, and magnetocaloric. Vapor compression technology is what is most commonly used for frozen confection machine applications. The cold plate can potentially include multiple cooling zones operating at different temperatures or cooling rates. Components of the refrigeration system can be located locally (i.e. within the machine) or remotely (outside the machine). A comestible substance or mixture (referred to herein as "mixture") is contained in a flexible freeze container or bag (where the terms "container" and "bag" can be used essentially synonymously) 24. The freeze bag 24 may also contain a certain amount of a gas, such as but not limited to air. Bacteriostatic or bateriocidal gases could also be used. Carbon dioxide gas could be used to carbonate the mixture. The freeze bag 24 sits on the cold plate 21. This reduces the temperature of the comestible mixture in the freeze bag to the desired temperature, generally bellow 0° C. Typically, the desired temperature will range from about −5° C. to −20° C. A physical element such as a roller 27 is included which is operable to agitate or knead the contents of the freeze bag 24. As ice crystals are formed at or near the inner surface of the freeze bag the roller moves along the surface of the freeze bag 24. The freeze bag 24 is pinched between the roller 27 and cold plate 21. This mechanically separates ice crystals from the inner surface of the bag and can also facilitate crushing the ice crystals. The churning performed by roller 27 prevents the formation of large ice crystals and mixes air into the ice cream. The mixture of air and ice cream is commonly referred to as overrun. The combination of the overrun along with small sized ice crystals gives ice cream its smooth creamy texture. A dispensing tube 25 is used for dispensing the comestible mixture 26.

Figures 7, 8:
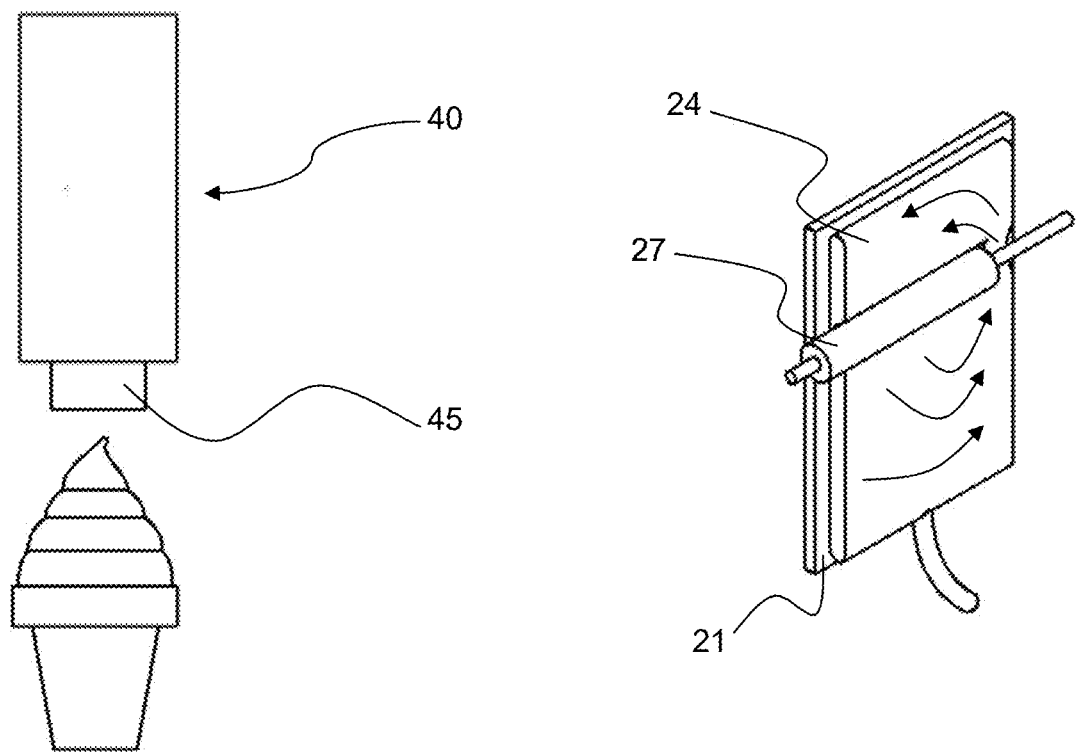

With reference to FIG. 8, an isometric view of cold plate 21, freeze bag 24, and roller 27 is illustrated. Flow lines on bag 24 depict how the ice cream flows around the edge of the roller 27. The width of the gap where ice cream flow occurs can be controlled by the width or position of the roller 27. A relatively narrow gap will result in a relatively high speed flow of ice cream, which is useful for increasing overrun. Therefore, the position and speed of the roller 27 can be varied to adjust the desired overrun. Referring to FIGS. 9A and 9B, another embodiment of an exemplary roller 46 is illustrated. The roller 46 has a non-circular cross section which provides flow passages for the ice cream as the roller kneads the mixture.

Figure 3:
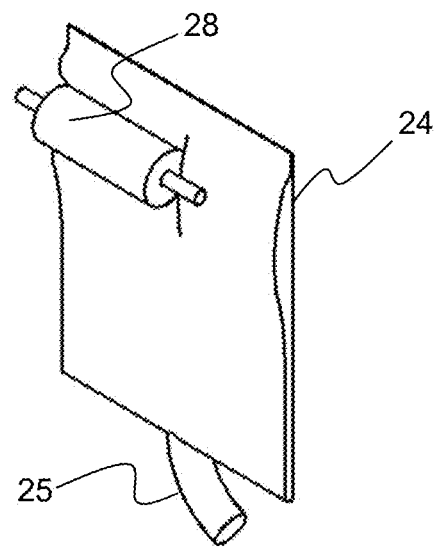

FIG. 3 shows an isometric view of a kneader 28 on the freeze bag 24. The mechanism for controlling the motion of the kneader is not shown for ease of illustration. However, the control mechanism is generally operable to move the kneader 28 up, down, left, and right so that the all of the mixture in the freeze bag 24 can be kneaded. The kneader 28 as shown is less than the width of the freeze bag 24. This gives the ice cream mixture room to flow within the freeze bag 24 as the roller 28 moves. The churning and flowing of the ice cream mixture in the freeze bag 24 prevents the formation of large ice crystals and allows air to be mixed with the ice cream, which produces overrun. This results in a smooth creamy ice cream. A dispensing tube 25 is used for dispensing the comestible mixture.

Figure 4:
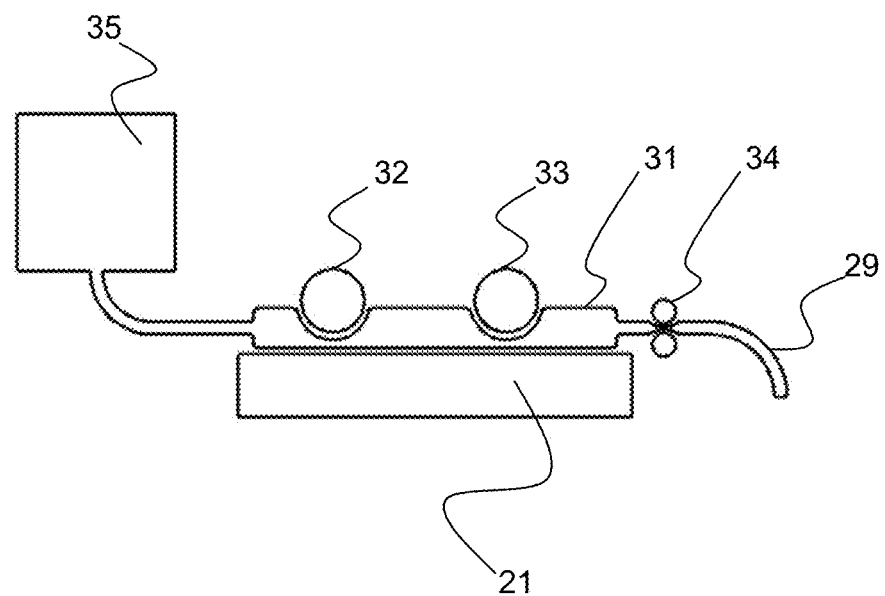
FIGS. 4 and 5 schematically show another version of the present disclosure.
Figure 5:
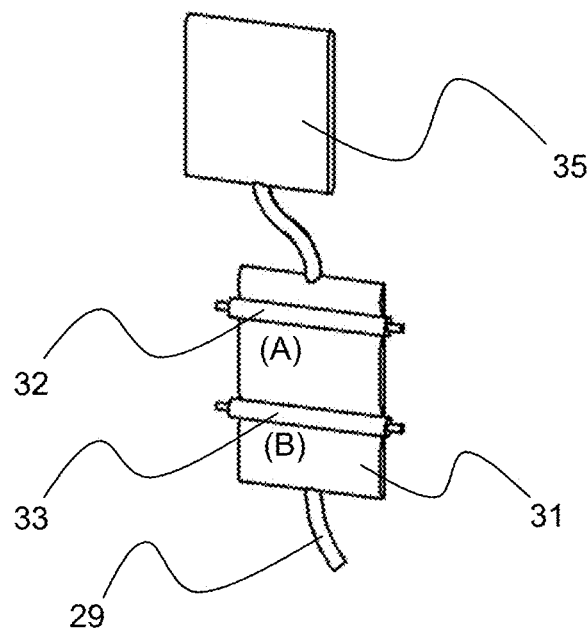

FIGS. 4 and 5 show another embodiment of the present disclosure having a freeze bag 31 in fluid communication with a reservoir bag 35, with FIG. 4 showing a side view of the embodiment and FIG. 5 showing a top view thereof. The freeze bag 31 sits on the cold plate 21. A first kneader 32 and a second kneader 33 separate the freeze bag 31 into an unfrozen section (A) and a frozen section (B), respectively, (FIG. 5). Pinching rollers 34 (not shown in FIG. 5) prevent the ice cream from exiting the freeze bag 31 before needed. The movement of kneaders 32, 33 is coordinated by a motion control mechanism (not shown) so that ice cream can be continuously frozen and dispensed via dispensing tube 29 while fresh unfrozen mixture from the reservoir bag 35 is introduced.

Figure 6:
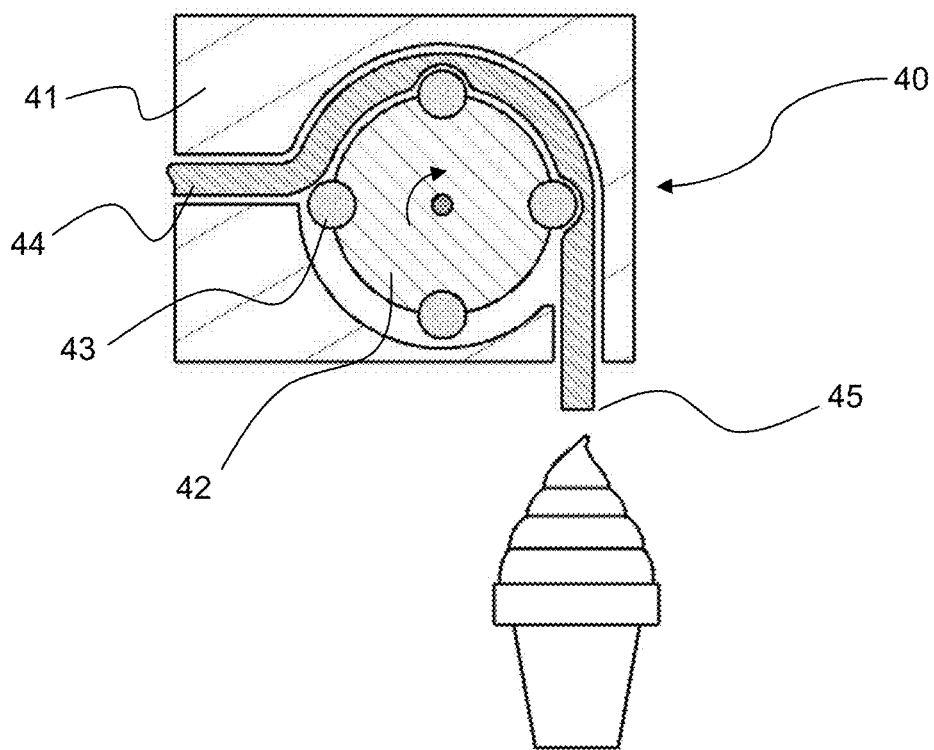

FIG. 6 shows a side section view of a dispensing mechanism which includes a pump such as peristaltic pump 40 used to dispense or assist in dispensing the ice cream. FIG. 7 illustrates a front view of the dispensing mechanism 40 including dispensing nozzle 45. Dispensing tube 44 runs between a housing 41 and peristaltic roller 42. In embodiments where peristaltic pump 40 is used to assist in dispensing ice cream, dispensing tube 44 may be part of or connected to dispensing tube 25 from FIGS. 2 and 3 or dispensing tube 29 from FIGS. 4 and 5. The housing 41 is generally cooled to maintain ice cream consistency. Roller 42 has protrusions 43 that push the ice cream along the dispensing tube 44 as the roller 42 rotates in a clockwise direction. The ice cream exits at nozzle 45. The roller 42 is also configured to rotate in a counterclockwise direction to push un-dispensed product back into the freeze bag 31. Heating elements (not shown) can be contained in the housing 41, roller 42, on the surface of the dispensing tube 44, or on the nozzle 45. The heating elements are used to sanitize the components on which they are located (i.e., to kill, prevent or limit the growth of bacteria or other pathogens). This may be necessary for long periods of time (e.g., overnight) where ice cream or other products are being stored in the machine.

Although FIG. 6 illustrates a roller 42 with protrusions 43, it is contemplated that numerous other peristaltic pump mechanisms can be used without departing from the scope of the present disclosure. For example, a conveyer belt type roller (not shown) could be used instead of the round roller 42. This would provide additional freedom in design of the dispensing system's form factor.

FIGS. 10A and 10B show a roller assembly 50 where a shaft 51 supports a first roller element 52 and a second roller element 53. The roller elements 52, 53 are independently movable along axis (X) of the shaft (i.e., horizontally movable to the left and right along axis (X))—compare relative positions of the roller elements along the shaft 51 in FIGS. 10A and 10B. This provides a flow passage 54 for the ice cream as the rollers 52, 53 move down and/or up (i.e., in a direction perpendicular to axis (X)). This provides a mechanism to thoroughly knead the ice cream and allow air to be incorporated into the mixture.

Figure 11A:
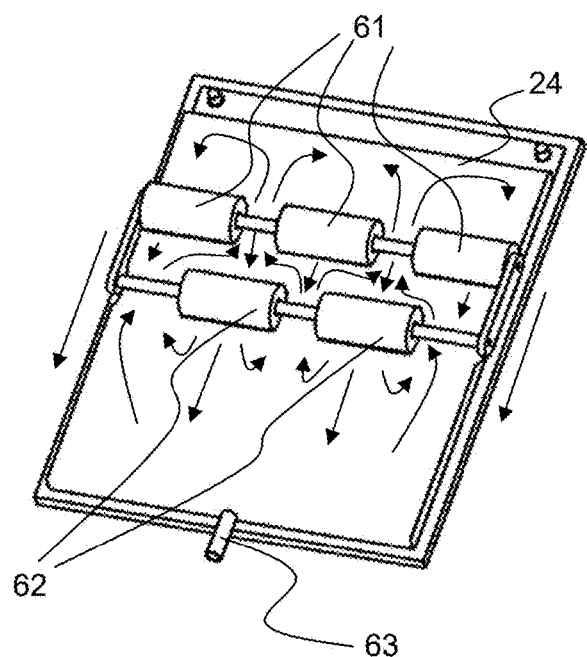
FIGS. 11A-11B are illustrations showing additional detail of a kneader assembly.
Figure 11B:
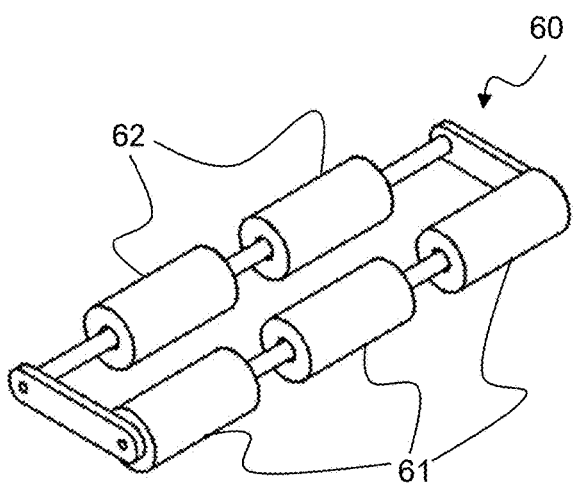
Figure 11C:
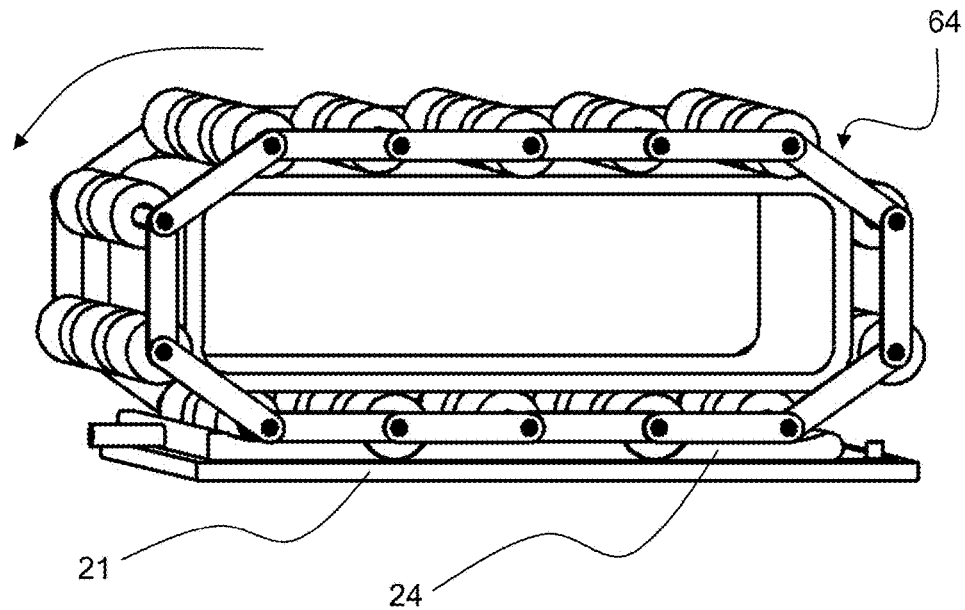
FIG. 11C is an illustration showing the kneader assembly of FIG. 11A being configured as a belt or chain to achieve continuous kneading of the ice cream mixture.

FIGS. 11A-11C show a kneader embodiment 60 that uses multiple rollers. Rollers 61 are spaced so that the ice cream mixture can flow between them. Rollers 61, 62 are spaced similarly (or could be dissimilarly spaced) in fixed positions along their respective shafts but the rollers 61 are offset from rollers 62 on an adjacent shaft. This provides a somewhat arduous path for the ice cream to flow, while ensuring that all areas of the freeze bag 24 come into contact with the rollers 61, 62, thereby ensuring that the ice cream mixture is well kneaded. Rollers 61, 62 provide a net movement of the ice cream toward the dispensing tube 63 while allowing the ice cream to flow past the rollers when the dispensing tube 63 is closed. As shown in FIG. 11C, the rollers 61, 62 can be configured as a belt or chain 64 so that continuous kneading of the ice cream mixture can be achieved.

Figure 12A:
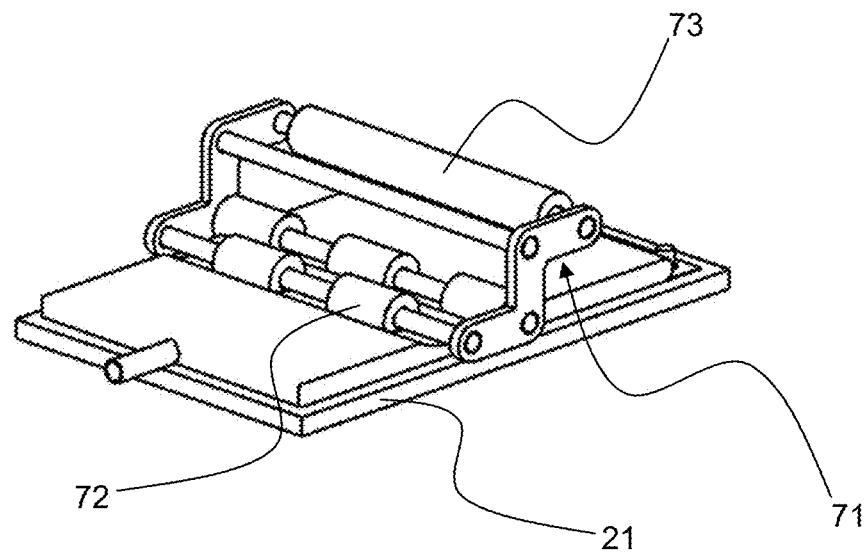
FIG. 12A illustrates a simplified view of an exemplary kneader assembly with multiple rollers suitable for use in a frozen confection machine made in accordance with the present disclosure and which includes a linkage mechanism.
Figure 12B:
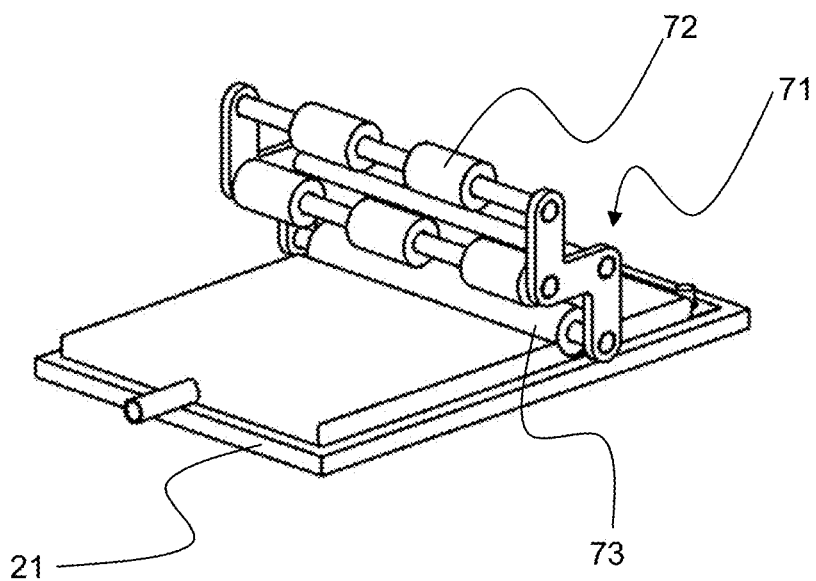
FIG. 12B is an illustration showing an additional simplified view of the kneader assembly of FIG. 12A.

FIGS. 12A and 12B show an embodiment similar to FIGS. 11A-11C that uses multiple rollers. In the embodiment of FIGS. 12A and 12B, a linkage mechanism 71 is included which is rotatably supported over cold plate 21 for switching between one or more different types of rollers. In particular, the linkage mechanism 71 is configurable in a first position shown in FIG. 12A to use one or more kneading rollers 72 and a second position shown in FIG. 12B to use one or more dispensing roller(s) 73. Of course other configurations of the linkage mechanism and/or the rollers can be used without departing from the scope and intent of the present disclosure.

Figure 13A:
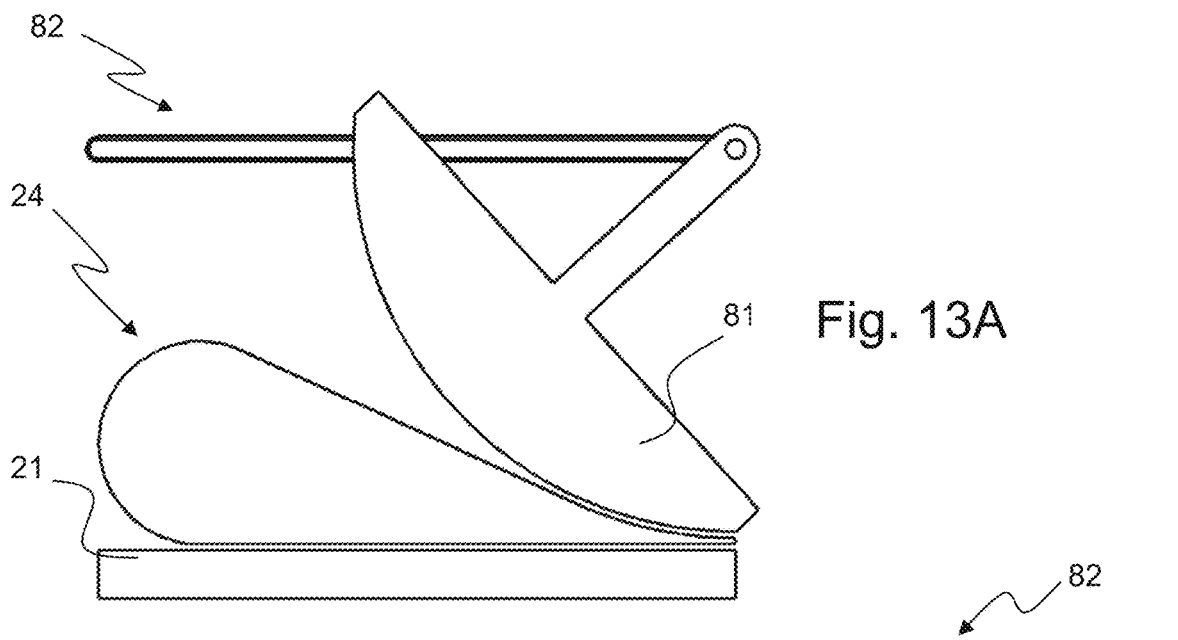
FIG. 13A shows an embodiment according to the present disclosure where an oscillating kneader is used to knead a comestible mixture in a freeze bag.
Figure 13B:
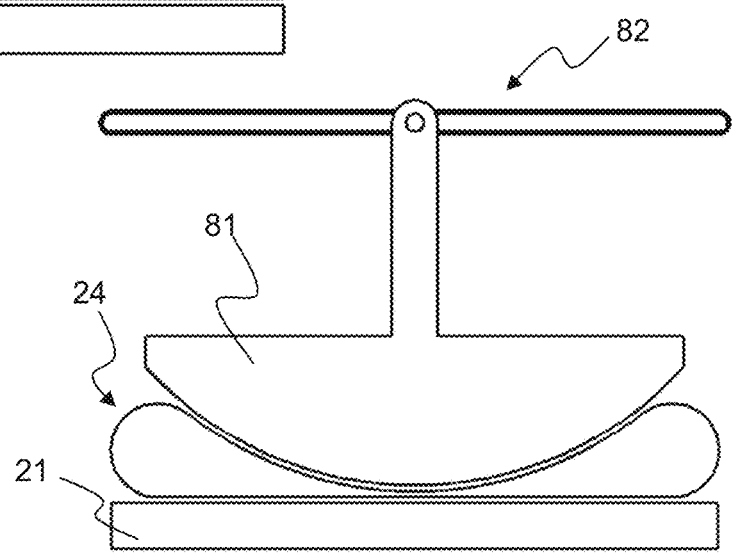
FIG. 13B is an illustration showing additional detail of the oscillating kneader of FIG. 13A.
Figure 13C:
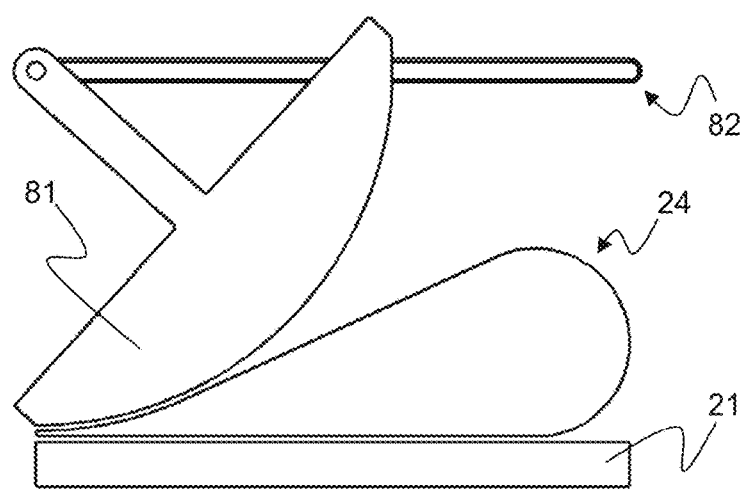
FIG. 13C is another illustration showing additional detail of the oscillating kneader of FIG. 13A.

FIGS. 13A-13C show an embodiment where an oscillating kneader 81 is used to knead the ice cream mixture in freeze bag 24 sitting on cold plate 21. A guide slot 82 is used to control the oscillating motion of the kneader 81 with respect to the freeze bag 24 and cold plate 21. More particularly, the guide slot 82 receives a follower extending from the kneader 81 and is configured to permit the kneader 81 to oscillate between the various positions illustrated in FIGS. 13A-13C and effectively knead the ice cream mixture in the freeze bag 24.

Figure 14A:
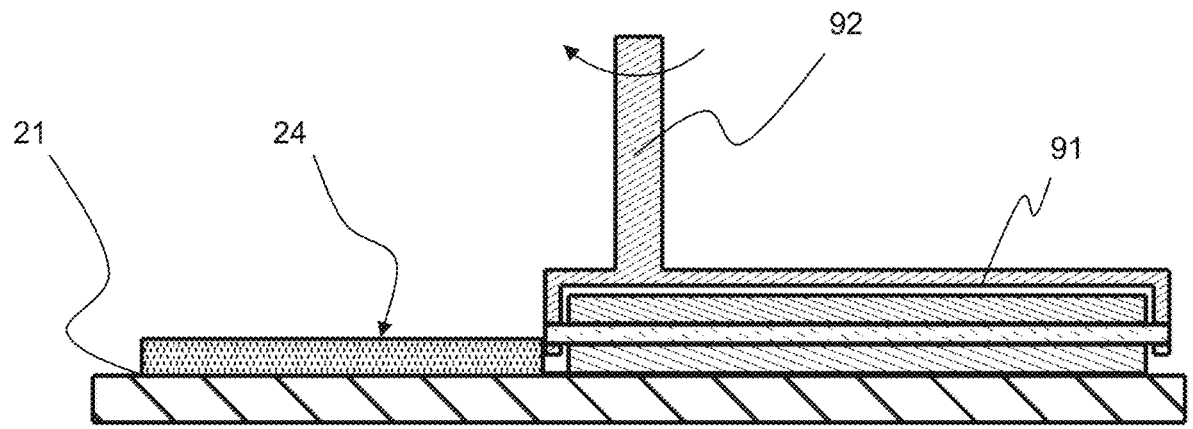
FIG. 14A is a simplified side view of a roller supported on a rotatable shaft which kneads a comestible mixture in a freeze bag.
Figure 14B:
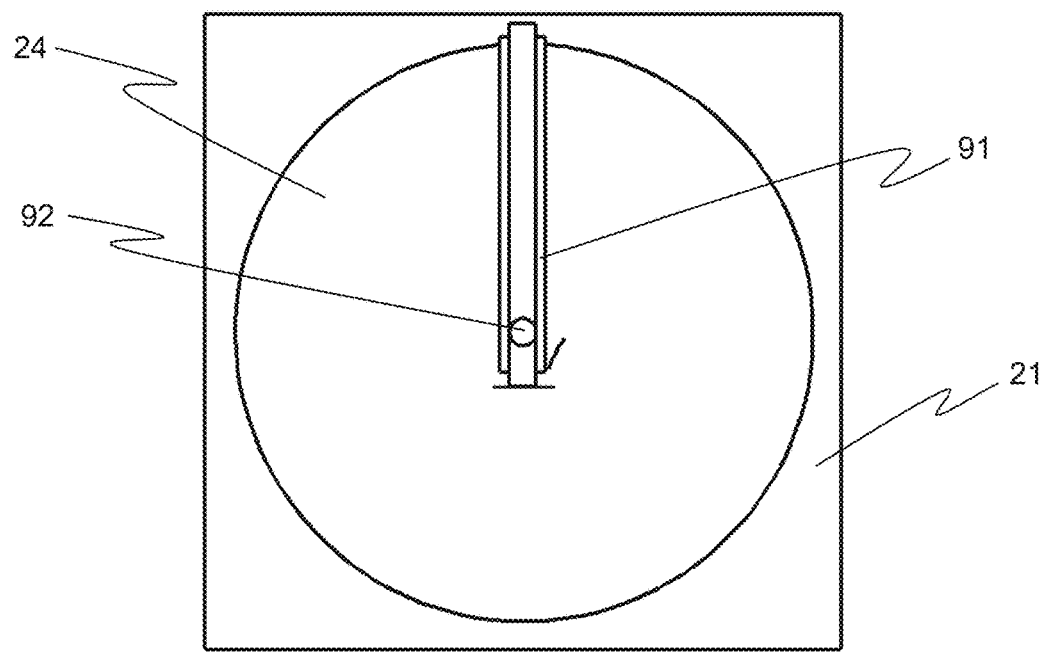
FIG. 14B is a simplified top view of the roller of FIG. 14A.

FIG. 14A shows a side view and FIG. 14B shows a top view of an embodiment with a roller 91 supported on a rotatable shaft 92. The roller 91 rotates around a horizontal axis while the shaft 92 rotates around a vertical axis. Rotation of the roller 91 via the shaft 92 kneads the ice cream mixture in the freeze bag 24 sitting on top of cold plate 21.

Figure 15:
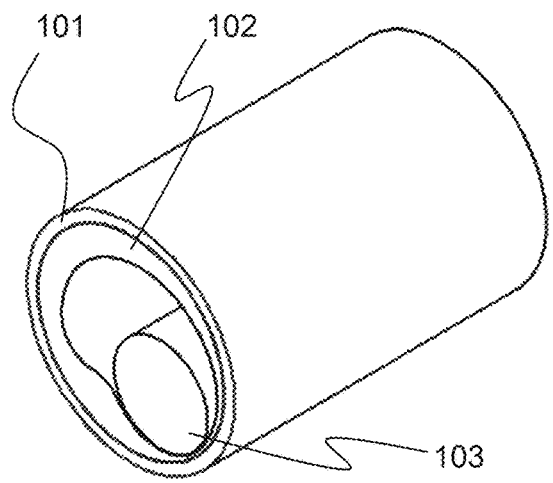
FIG. 15 illustrates a perspective view of an exemplary cylindrically shaped cold plate suitable for use in a frozen confection machine made in accordance with the present disclosure.
Figure 16:
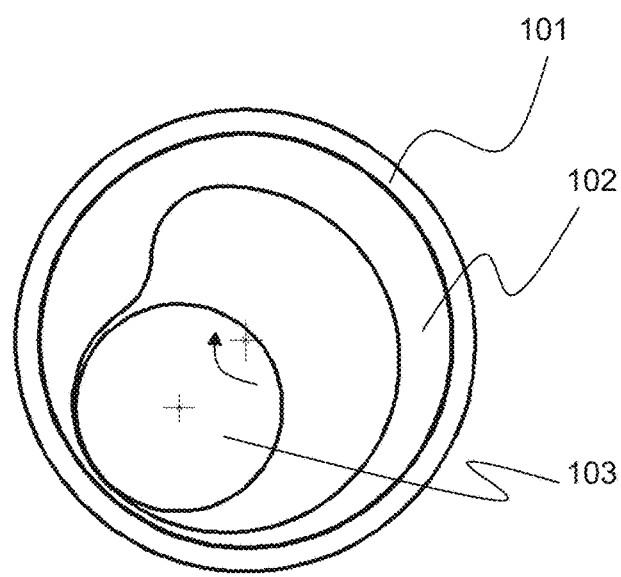
FIG. 16 is a simplified front view of the cylindrically shaped cold plate of FIG. 15.
Figure 17:
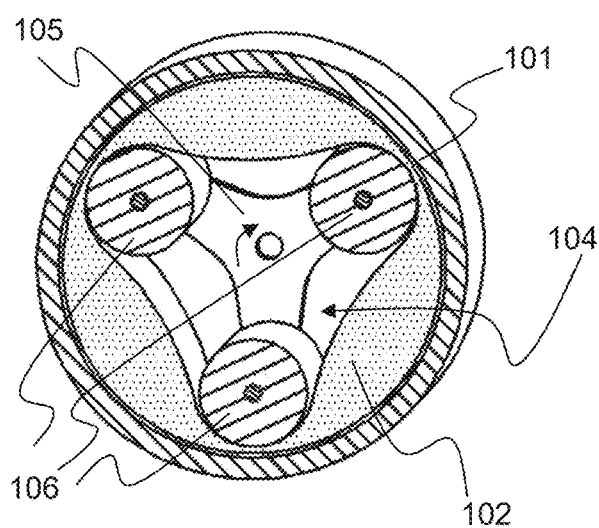
FIG. 17 is an illustration of an alternate kneader design suitable for use with the cylindrically shaped cold plate of FIG. 15.

FIGS. 15 and 16 show an alternate embodiment where the cold plate 101 is cylindrically shaped. The freeze bag 102 sits inside the cold plate 101. A kneader 103 rolls eccentrically in the cold plate 101 to knead the ice cream mixture in the freeze bag 102 sitting within cold plate 101, i.e., the freeze bag 102 is radially positioned between an interior surface of the hollow cylindrical cold plate 101 and the kneader 103, and the kneader and the cylindrical cold plate have parallel, offset axes as represented in FIG. 16 The kneader 103 is shown as a cylinder. Various geometries or features on the kneader 103 can be devised to enhance kneading, overrun or to reduce the power required for kneading. For example, FIG. 17 shows an alternative kneader design 104 which can be used with the hollow cylindrical cold plate 101. Kneader 104 generally includes a support frame 105 for supporting one or more rollers 106 which move along the inner circumference of the cold plate 101 to knead the ice cream mixture in the freeze bag 102 sitting within cold plate 102.

Figure 18A:
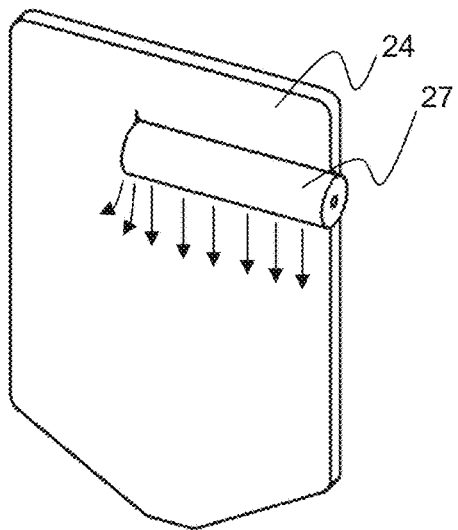
FIG. 18A illustrates a first step in a four-step process of a roller moving over a freeze bag to knead its contents.
Figure 18B:
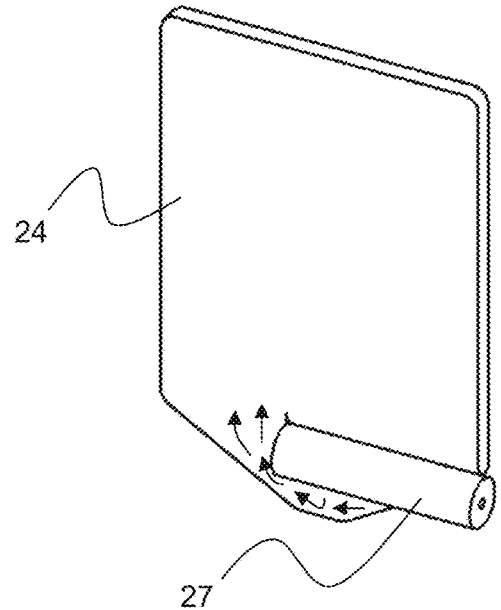
FIG. 18B illustrates a second step in the four-step process of FIG. 18A of a roller moving over a freeze bag to knead its contents.
Figure 18C:
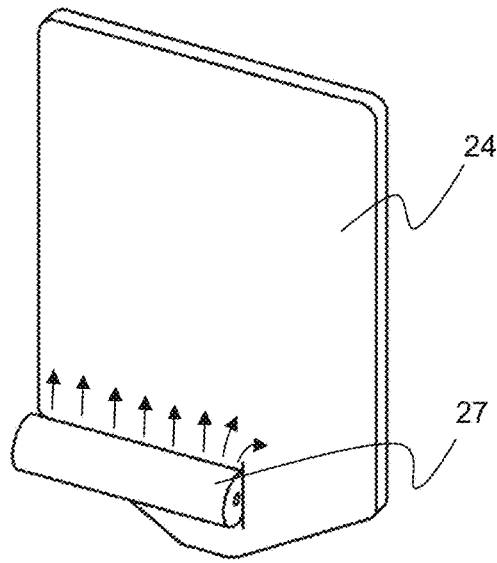
FIG. 18C illustrates a third step in the four-step process of FIG. 18A of a roller moving over a freeze bag to knead its contents.
Figure 18D:
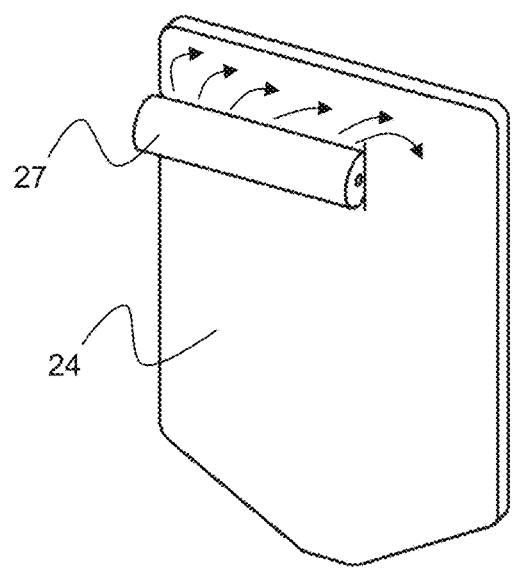
FIG. 18D illustrates a fourth step in the four-step process of FIG. 18A of a roller moving over a freeze bag to knead its contents.

FIGS. 18A-18D illustrate a four-step process of the roller 27 moving over the freeze bag 24 to knead the contents. In FIG. 18A the roller 27 is positioned or biased toward the right side of freeze bag 24 and moving in a downward direction indicated by the arrows adjacent to the roller. In FIG. 18B, the roller 27 is still positioned/biased toward the right side of freeze bag 24 and has moved downward until the direction of flow of the mixture in the bag has reversed to an upward direction indicated by the arrows. Thus, the terminal end of the roller 27 is positioned so that the contents of the freeze bag 24 can migrate around the end of the roller 27. In FIG. 18C, the position/bias of the roller 27 has changed to or toward the left side of freeze bag 24 and the roller is moving in a direction opposite to that in FIGS. 18A and 18B. In FIG. 18D, the roller 27 is still biased toward the left side of freeze bag 24 and has moved upward until the direction of flow of the mixture in the bag has reversed back to a downward direction as indicated by the arrows.

Figure 19A:
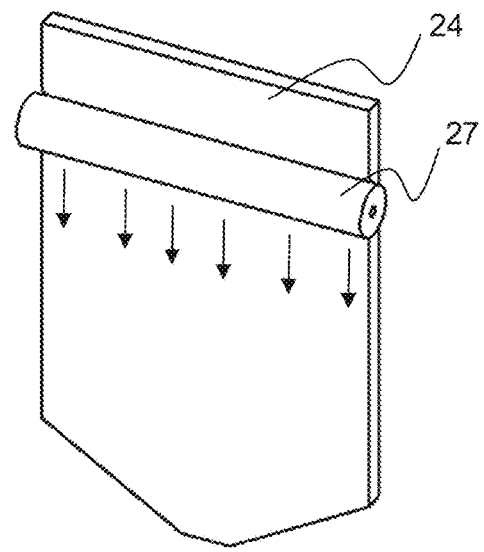
FIG. 19A illustrates a first step in a two-step process of a roller being moved over a freeze bag to dispense ice cream.
Figure 19B:
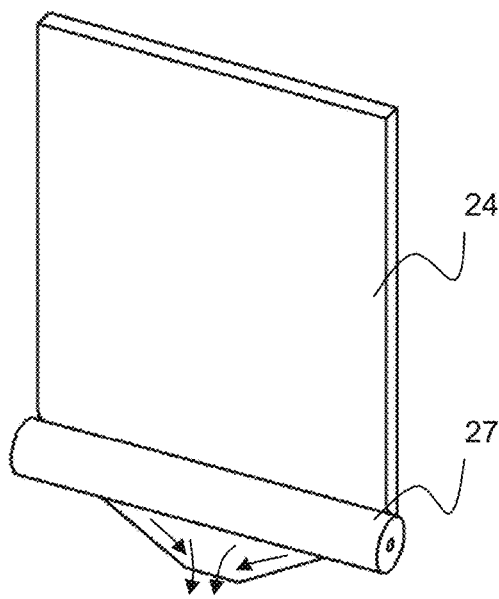
FIG. 19B illustrates a second step in the two-step process of FIG. 19A of a roller being moved over a freeze bag to dispense ice cream.

FIGS. 19A and 19B illustrate a two-step process of the roller 27 being moved over the freeze bag 24 to dispense the ice cream. The roller 27 starts in the upper position illustrated in FIG. 19A and moves into the downward position illustrated in FIG. 19B, thereby causing the contents of bag 24 to flow in the direction indicated by the arrows. Here, the roller 27 has an axial length that extends over an entire width of the cavity of the freeze bag 24 to urge/dispense the ice cream from the freeze bag.

Figure 20:
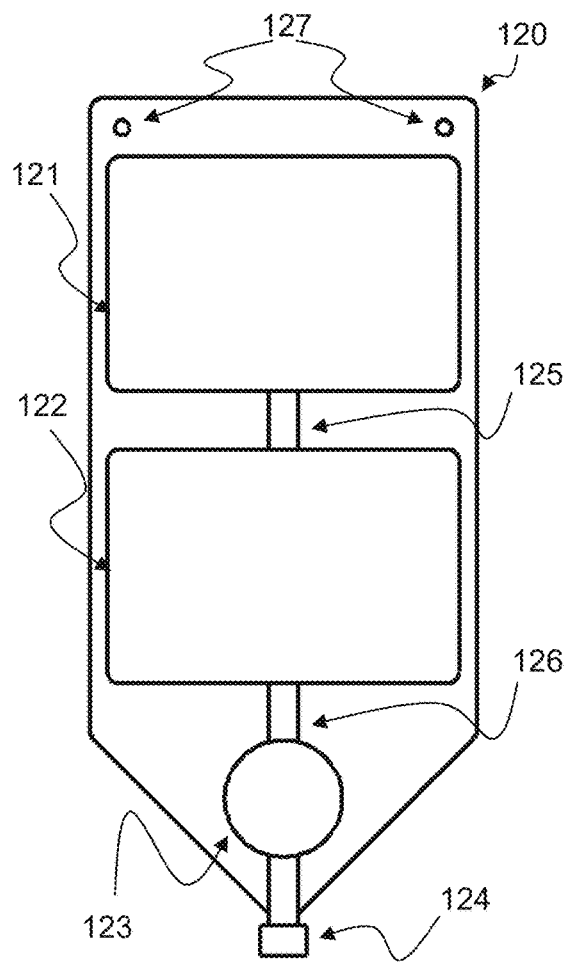
FIG. 20 shows an alternate embodiment of a freeze bag in accordance with the present disclosure.

FIG. 20 shows an alternate embodiment of a freeze bag 120. A first compartment 121 holds a liquid ice cream mixture. A second compartment 122 is exposed to below freezing temperatures by, for example, being in contact with the cold plate 21 (not shown, but understood to contact the freeze bag in that region of the second compartment). The ice cream mixture is kneaded in the second compartment 122 by one or more kneader(s) (not shown). A third compartment 123 has a roller mechanism (not shown) that further kneads the ice cream to create a peristaltic pump-like action (similar to peristaltic pump 40 illustrated in FIG. 6). The roller mechanism (not shown) pumps the ice cream from the second compartment 122 through the third compartment 123 and creates enough pressure to overcome resistance by optional check valve 124, thereby permitting the dispensing of the bag contents. Passages 125 and 126 provide fluid communication between compartments. Optional valve or clamping mechanisms (not shown) may be used in passages 125 and 126 to control the movement of ice cream between compartments. Mounting holes 127 (or other alternate holding mechanism) are used to hold the freeze bag 120 in place.

Figure 21:
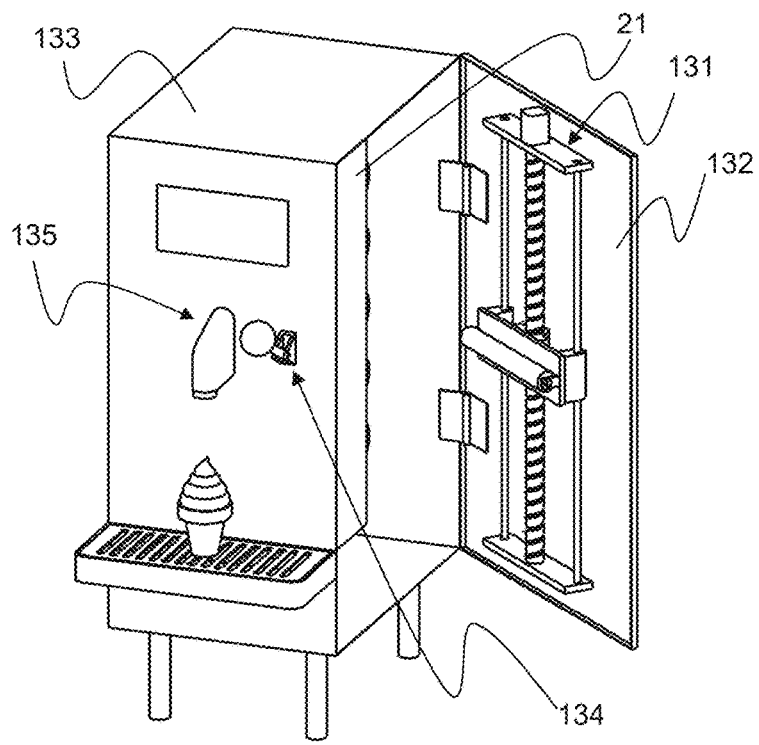
FIG. 21 shows an exemplary embodiment for a frozen confection machine made in accordance with the present disclosure.

FIG. 21 shows an exemplary embodiment for a frozen confection machine made in accordance with the present disclosure. In the embodiment of FIG. 21, the cold plate 21 is oriented vertically and perpendicular to the front of the machine. The vertical and perpendicular arrangement can be convenient for housing multiple cold plates (not shown) for multiple freeze bags (e.g. flavors) in a single machine. However, the cold plate 21 could also be oriented horizontally or angularly without departing from the scope of the present disclosure. A kneader assembly 131 is attached to the cabinet door 132. The system is contained in the cabinet 133. The kneader assembly 131 mates with the cold plate 21 when the cabinet door 132 is closed. Other parts of the system (e.g., the refrigeration system) are not shown. A dispensing handle 134 is used to dispense the ice cream or other comestible frozen mixture through dispensing nozzle 135 in a first position (open/dispense position) of the handle and prevents the frozen confection mixture from being dispensed when in a second position (closed/no dispense position).

Figure 22A:
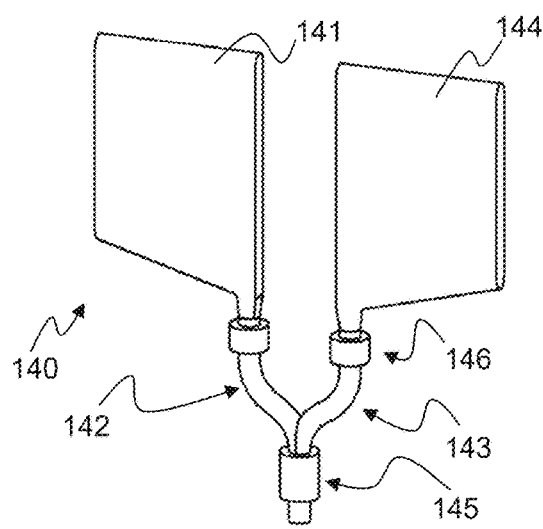
FIG. 22A illustrates a frozen confection machine made in accordance with the present disclosure which can be configured to freeze and dispense two or more flavors simultaneously.
Figure 22B:
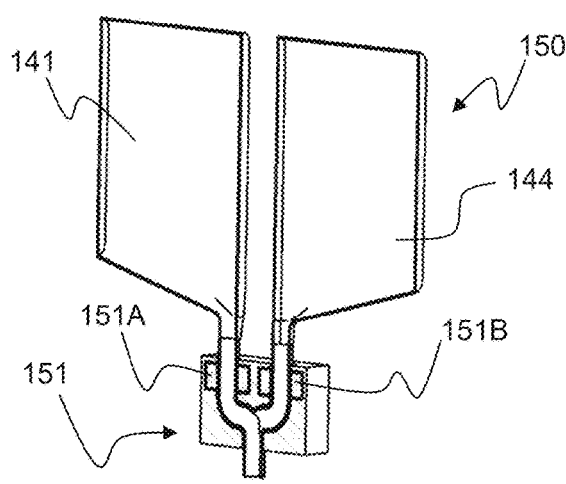
FIG. 22B shows a variation of the frozen confection machine of FIG. 22A where a pump unit is used instead of a valve arrangement to freeze and dispense two or more flavors simultaneously.

Prior art frozen confection machines utilizing a flexible container have been configured to freeze and dispense one flavor of ice cream. As illustrated in FIGS. 22A and 22B, the frozen confection machine made in accordance with the present disclosure can be advantageously configured to freeze and dispense two or more flavors simultaneously. In some instances, it may be desirable to dispense the two flavors from the same or nearly the same location on the machine. The freeze bag system 140 illustrated in FIG. 22A shows an embodiment where a first freeze bag 141 has a dispensing tube 142 that is oriented to overlap with the dispensing tube 143 from a second freeze bag 144. Freeze bags 141 and 144 can generally be identical to one another with one bag flipped over although it is not a requirement that the freeze bags be identical. Dispensing pump 145 is configured to dispense from both bags simultaneously. A valve 146 in the freeze bags 141, 145 can be used to selectively permit dispensing from one or both of the freeze bags. Therefore, one pump 145, (e.g., a peristaltic pump) can be used to dispense either flavor or both simultaneously.

The freeze bag system 150 illustrated in FIG. 22B is similar to FIG. 22A, except that pump unit 151 has two independently operable pumping mechanisms 151A and 151B to selectively permit dispensing from one or both of the freeze bags. In this regard, pump 151A can be activated to dispense from first freeze bag 141 and pump 151B can be activated to dispense from second freeze bag 144.

Figure 23A:
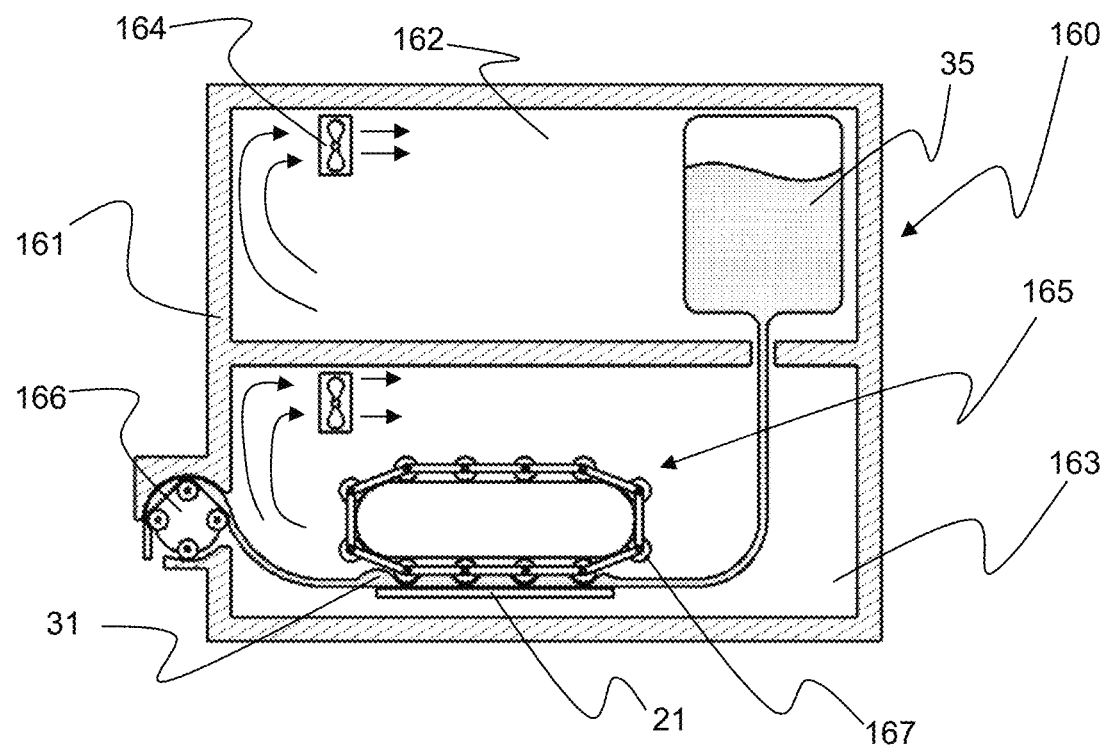
FIG. 23A illustrates an insulated enclosure with a refrigerated section and a freezer section which is suitable for use with a frozen confection machine made in accordance with the present disclosure.
Figure 23B:
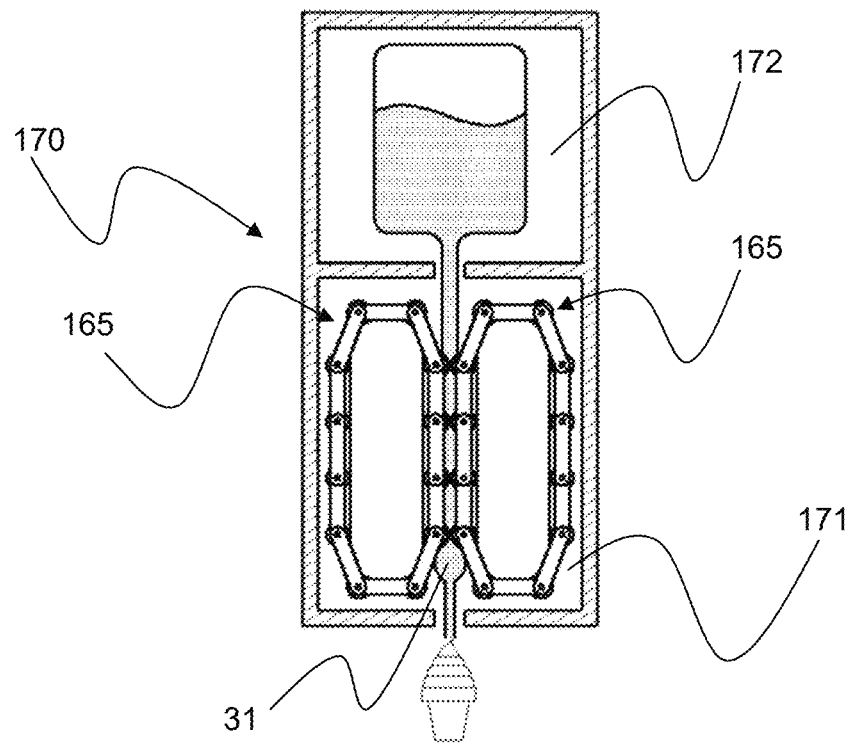
FIG. 23B shows a variation of the insulated enclosure of FIG. 23A with a freeze bag oriented vertically within the enclosure instead of horizontally.

FIGS. 23A and 23B show possible arrangements of components in an ice cream machine system made in accordance with the present disclosure. Embodiment 160 in FIG. 23A includes an insulated enclosure 161 with a refrigerated section 162 and a freezer section 163. Cooling for the refrigerated section 162 and freezer section 163 can come from one or more independent cooling systems or cooling elements. Freezing of the comestible mixture can come from the cold plate 21 cooled fluid in the freezer section, such as but not limited to air, a liquid (e.g. a brine), a liquid spray 163 or any combination of a cooling fluid and cold plate. The reservoir 35 is contained in the refrigerated section 162. A fan 164 can optionally be used to circulate air. A roller assembly 165 of the type shown in FIGS. 11A-11C is used to knead the ice cream. However, either a single or multiple roller assembly can be used. The roller assembly 165 pushes the ice cream toward the optional dispensing pump 166. However, as shown in FIG. 11A, ice cream can flow past the rollers 167 due to the spaces therebetween. As a result, a constant pressure pushes the ice cream toward the dispensing pump 166, but ice cream is prevented from dispensing until dispensing pump 166 turns on. Optionally, a simple pinch valve (not shown) can be used for dispensing. The roller assembly 165 turns on and off as necessary to knead the ice cream and/or assist with dispensing. The roller assembly 165 can operate in either direction or oscillate as necessary. However, during typical operation of the roller assembly 165, roller 167 moves toward the dispensing pump 166. As ice cream is dispensed, more space will become available in the horizontally oriented freeze bag 31. This will allow mixture from the reservoir bag 35 to flow into the freeze bag 31. This flow can be due to gravity or pressure generated by other means such as a pump. The arrangement illustrated in FIG. 23A allows for continuous freezing and dispensing of ice cream. The reservoir bag 35 can be much larger than might be practical for the freeze bag 31. Other parts of the system (e.g., refrigeration systems, control electronics, and other components known in the art) are not shown in FIG. 23A.

Embodiment 170 in FIG. 23B shows an arrangement similar to embodiment 160 illustrated in FIG. 23A, including a refrigerated section 172 and a freezer section 171. In the configuration of FIG. 23B, the freeze bag 31 is oriented vertically. Roller assemblies 165 are disposed on both sides of the freeze bag 31 and cooling of the ice cream occurs via the surrounding air in the freezer section 171. However, a cold plate could be used with a vertically oriented freeze bag without departing from the scope of the present disclosure.

Figure 24:
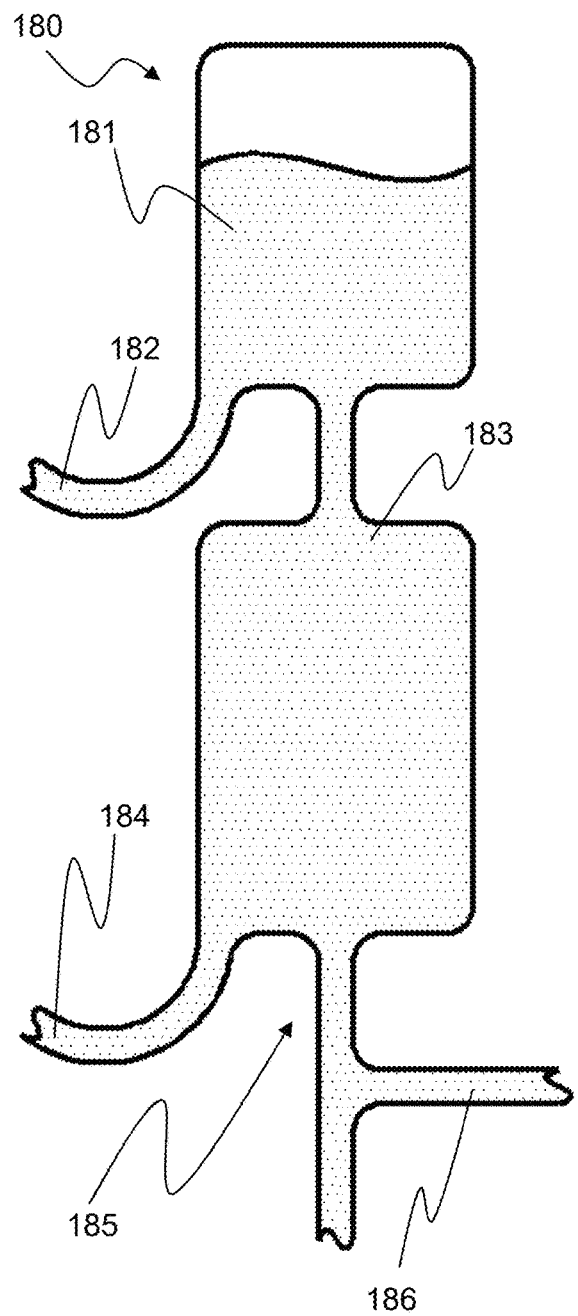
FIG. 24 is an illustration of a simplified view of a freezer bag system made in accordance with the present disclosure.

An additional freezer bag system embodiment 180 is schematically illustrated in FIG. 24. Here, reservoir bag 181 has one or more tubes 182 in fluid communication. Tube 182 can be used for injecting air, flavorings, or more ice cream mixture. Freeze bag 183 can have one or more tubes 184 in fluid communication. This can be used for injecting air, ice cream or flavorings into the ice cream mixture. Dispensing tube 185 can have one or more other tubes 186. This can be used for injecting air, ice cream or flavorings in solid or liquid form. For example, it may be undesirable to inject flavorings such as fudge sauce, caramel, strawberries, etc., into the freeze bag 183, since they would be mixed thoroughly with the ice cream or in the case of solids they would be liquefied or ground into very small particles by the kneading rollers. Injecting a flavoring in tube 186 can occur during dispensing so that a swirl consistency with injected flavorings can be achieved.

Figure 25:
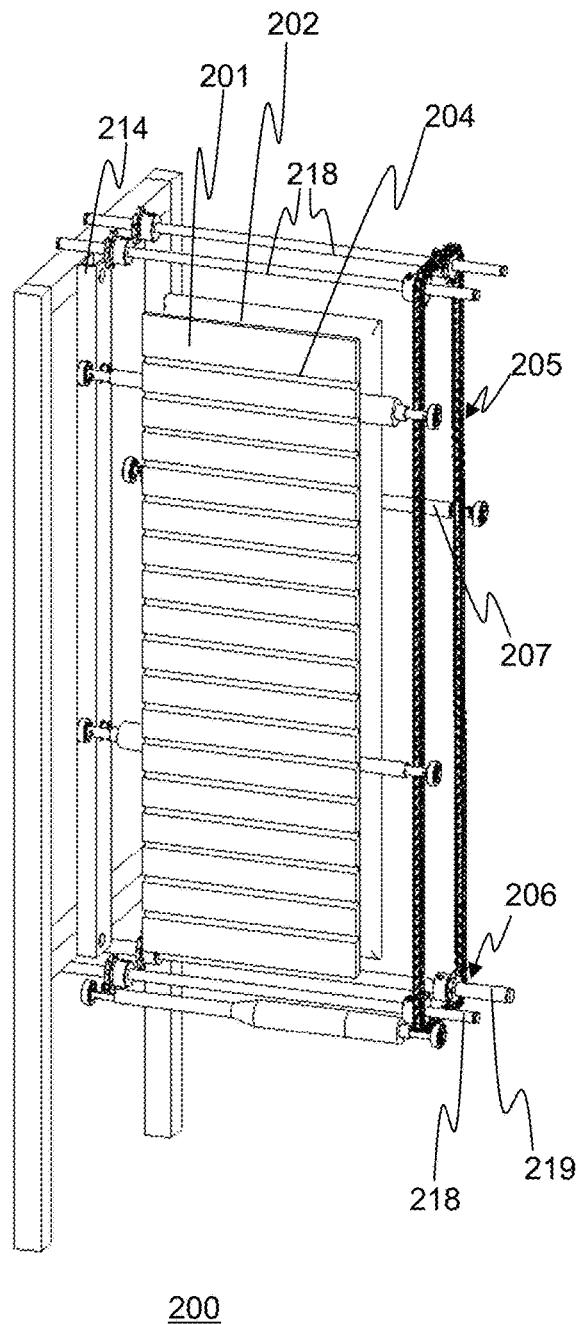
FIG. 25 illustrates an isometric view of an embodiment of a frozen confection machine made in accordance with the present disclosure.

FIG. 25 shows an isometric view of an embodiment of a frozen confection machine 200 made in accordance with the present disclosure. For clarity, some elements of the system are not shown (e.g., parts of the support frame). The freeze bag 203 (FIGS. 26A and 26B) is located between an outer cold plate 201 and an inner cold plate 202. One or both of the cold plates 201, 202 are cooled to a temperature suitable for freezing the comestible mixture. Generally, the suitable freezing temperature is between about −5° C. and −30° C.

Figure 26A:
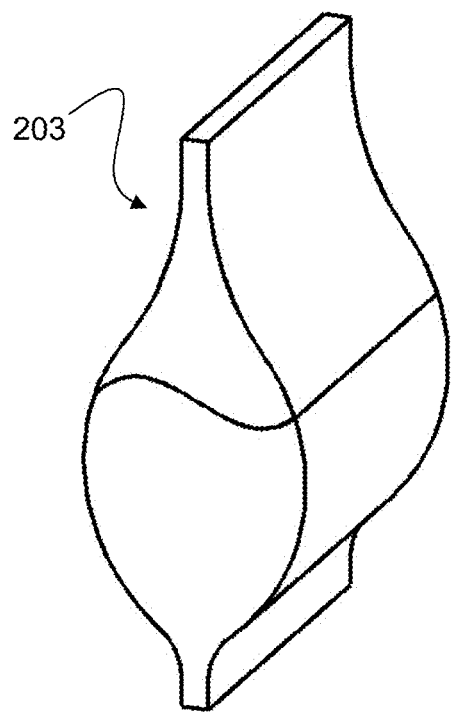
FIG. 26A shows a simplified view of a freezer bag system suitable for use in the frozen confection machine of FIG. 25.

Many methods known in the art can be used for cooling the cold plates in the embodiment of FIG. 25. One method is to attach tubes (not shown) to the cold plates that circulate a cooling fluid, for example the refrigerant from a vapor compression refrigeration system. Channels 204 on the cold plates can be used to accept cooling tubes. The use of two cold plates provides several advantages. It increases heat transfer area for freezing the comestible mixture. It provides structural support for the freeze bag. Since the comestible mixture is initially in the liquid state, the mixture will slump to the bottom of the freeze bag 203 (FIG. 26A). When the bag is supported between cold plates 201, 202 (FIG. 26B), the form of the bag can be controlled and the comestible mixture remains in contact with the cold plate over a relatively large area.

In certain embodiments, the freeze bag 203 may be pressurized with a liquid or gas. However, gas is generally preferred. Examples of suitable gases to achieve pressurization include but are not limited to air, carbon dioxide, nitrogen, or nitrous oxide. Different gases have different advantages. Air is readily available from the atmosphere, nitrogen can inhibit oxidation, carbon dioxide can carbonate the comestible mixture, and nitrous oxide is bacteriostatic and dissolves in milk fat giving ice cream a light fluffy texture. When pressurized with a gas, cold plates 201, 202 provide structural support while a conveyer system uses a roller chain 205 and pulleys 206 suitably arranged for driving mixing bars 207 over the freeze bag 203, such that the freeze bag is pinched between outer cold plate 201 and roller 212 on the mixing bar 210 (FIG. 25).

Figure 27:
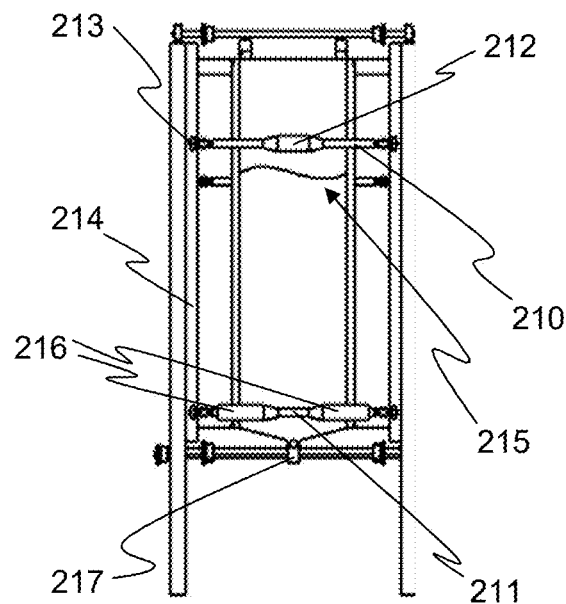
FIG. 27 is a front view of the frozen confection machine from FIG. 25 with an outer cold plate being removed to show additional detail of the machine.

FIG. 27 shows a front view of the frozen confection machine 200 from FIG. 25 with the outer cold plate 201 removed. In this view, mixing bar 210 and mixing bar 211 are visible. Mixing bar 210 has a roller 212 generally centered on the mixing bar 210. The roller 212 as shown is generally a right circular cylinder. However, other shapes are possible. For example, the ends can be tapered to reduce stress on the freeze bag 203 at the roller edges. The roller 212 could be textured, have grooves or a generally noncircular cross section. It is not a requirement for the rollers 212, 216 to roll over the freeze bag 203. Other geometries will result in a sliding motion. The mixing bar 210 has guide bearings 213 that mate with guide rail 214. The guide bearing 213 and guide rail 214 forces the roller 212 to pinch the freeze bag 203 between the roller 212 and outer cold plate 201 such that there is little or no gap remaining. The comestible mixture freezes on the surface of the freeze bag 203 where it contacts the cold plates 201, 202.

The roller 212 provides several functions. The pressing and rolling against the freeze bag 203 squeezes the frozen mixture off of the surface of the bag and causes it to mix with the unfrozen mixture. This action helps to crush ice crystals and minimize their size which results in smooth ice cream. Ice crystals are also kept small because the mixing bars 210, 211 move over the freeze bag 203 frequently enough that large ice crystals do not have time to form. The freeze bag 203 can be fully filled with comestible mixture or partially filled. In a preferred embodiment, the freeze bag is partially filled with comestible mixture as indicated by liquid level 215. A gas, typically air, occupies the space above the liquid level 215. In the embodiment of FIG. 27, the mixing bar 210 moves from the gas side of the freeze bag into the liquid side, with the dispensing nozzle 217 at the bottom of the freeze bag. Alternatively, the dispensing nozzle could be at or near the top of the freeze bag and the rollers could move in an upward direction or switch directions. Roller 212 does not extend the full width of the freeze bag 203. This allows mixture to flow past roller 212, which helps produce overrun and mixes the frozen and unfrozen mixture. It is also necessary for the mixture to flow within the bag when it is not dispensing. Mixer bar 211 has rollers 216 that are generally positioned toward the edges of the bag. The function of roller 212 and rollers 216 are similar. Rollers 216 are positioned to contact the areas of the bag missed by roller 212, such that all surfaces of the freeze bag that are contacted by the cold plates are contacted by the rollers. Preferably there is some overlap between roller 212 and rollers 216 so that no part of the freeze bag inadvertently misses the rollers.

As shown in FIGS. 25 and 27, the mixing bars are connected to a roller chain 205. Chain 205 mates with drive shaft 219 and idler shafts 218. Drive shaft 219 is driven by a motor (not shown). This arrangement allows the mixer bars to operate on a continuous loop. Another function of the rollers 212, 216 is to urge the comestible mixture toward the dispensing nozzle 217. The gaps between rollers 212, 216 allow for the rollers to traverse the freeze bag 203 without dispensing product and provide desirable churning of the mixture. At the same time when the nozzle 217 is opened, the rollers supply sufficient pressure on the frozen comestible mixture to dispense the mixture from the nozzle. The dispensing nozzle 217 can be sealed by a number of methods known in the art, for example a pinch valve can be used. As another example, a pump, such as a peristaltic pump, can be used.

In the embodiments illustrated in FIGS. 25-27, the cold plates 201, 202 are oriented vertically and the mixing bars 211 move downward. However, the cold plates can be oriented in any orientation without departing from the scope of the present disclosure. For example, the cold plates can be oriented horizontally or at a 45-degree angle. In addition, the mixing bars can also be configured to move in an upward direction or change directions. For example, the dispensing nozzle can be placed at the upper end of the freeze bag 203 when the rollers 212, 216 are moving in an upward direction. This arrangement has the advantage of separating the liquid contents of the freeze bag 203 from the frozen contents. This is important for having continuous dispensing, freezing and replenishment from a reservoir, since mixing of the liquid and frozen comestible mix would soften the frozen comestible mixture, which is otherwise ready to dispense. Separation of the liquid and frozen mix is achieved as follows. The liquid mixture enters the freeze bag 203, preferably from the lower end. The liquid mixture pools at the bottom of the freeze bag due to gravity. The liquid mixture is cooled by the cold plates. Rollers 212, 216 move upward pushing some liquid mixture up along the cold plate, which facilitates freezing. The flow paths around the rollers 212, 216 allows the liquid mix to drain back to the lower end of the freeze bag. When the mixture is sufficiently frozen it is a semi-solid with a relatively high viscosity. When this occurs, the upward motion of the rollers 212, 216 pushes the mixture upwards. As the rollers reach the top of the freeze bag, the frozen mixture flows past the roller gaps or flow paths. The high viscosity of the frozen mix and the relatively narrow spacing between the cold plate causes the frozen mixture to remain packed at the top of the freeze bag 203. Liquid mix not yet frozen or fresh liquid mix from the reservoir remain a the bottom of the freeze bag. Multiple methods can be used to affect separation of the liquid mixture and frozen mixture in the freeze bag 203. For example, the cold plates 202, 204 don't need to be perfectly vertical. Also, the cold plates could have a vertical section for freezing and an upper horizontal section for storing frozen product. The rollers could traverse the freeze bag in a horizontal direction, with the vertical position of the rollers staged to urge the frozen mixture upwards. The rollers could also move at an angle (i.e. neither vertically or horizontally) Note that separation of the liquid mixture and frozen mixture in the freeze bag is beneficial even when no reservoir bag is used. In general, the freeze bag 203 will contain several servings of comestible mixture. The relatively large volume of comestible mixture may require an undesirably long time to freeze. Upward motion of rollers 212, 216 allows more frozen portions of the comestible mixture to be packed at the top of the freeze bag 203, while less frozen or liquid portions of the comestible mixture remain at the bottom of the freeze bag 203. Therefore, at least a portion of the comestible mixture is ready to dispense relatively quickly. FIGS. 28A-28F show an embodiment of an exemplary dispensing valve 251. Freeze bag 203 has a dispensing tube 250 that mates with a dispensing valve 251. In the embodiment shown, valve 251 has a fixed member 252 and movable member 253. However, both members 252, 253 could be configured to move. The dispensing tube 250 needs to be sufficiently long to reach from the freeze bag 203 to the point of dispensing outside of the machine. When movable member 253 is forced towards fixed member 252, the dispensing tube 250 is squeezed shut. The dispensing valve 251 is configured to contact a substantial length of the dispensing tube 250. This has the effect of emptying the tube 250 of its contents, which is desirable. A portion of the dispensing tube 250 will be outside the cold area of the frozen confection machine. Any frozen mixture trapped in the tube 250 will melt and drip or be trapped in the tube until the next serving is dispenses.

Figure 28A:
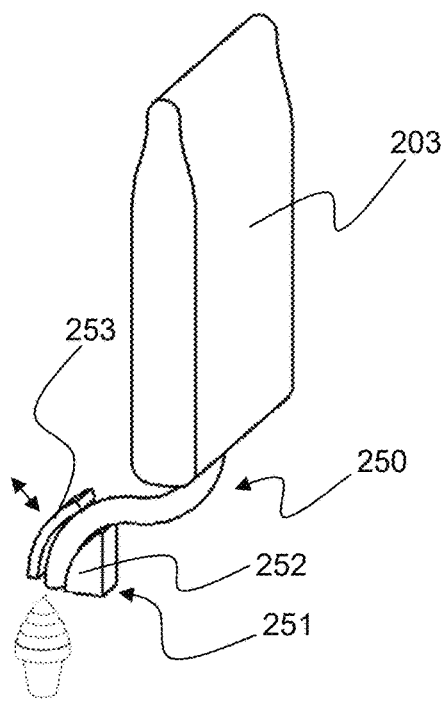
FIG. 28A illustrates an exemplary embodiment of a dispensing valve suitable use in the freezer bag systems and frozen confection machines of the present disclosure.
Figure 28B:
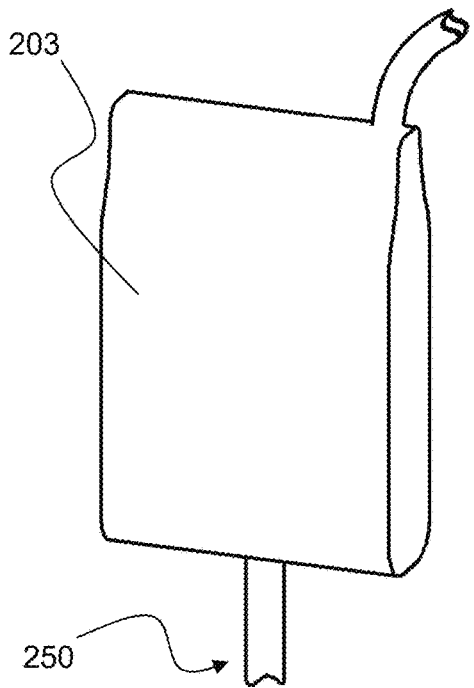
FIG. 28B shows the freezer bag isolated from the other components of the dispensing valve embodiment of FIG. 28A.
Figure 28C:
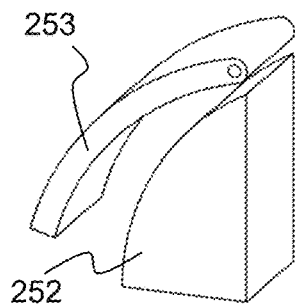
FIG. 28C illustrates a movable member component variation of the dispensing valve embodiment of FIG. 28A.
Figure 28D:
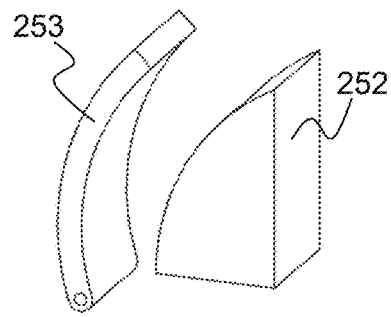
FIG. 28D illustrates another variation of the movable member component from FIG. 28C.
Figure 28E:
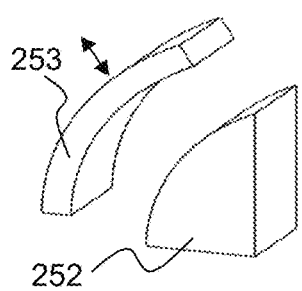
FIG. 28E shows still another variation of the movable member component from FIG. 28C.
Figure 28F:
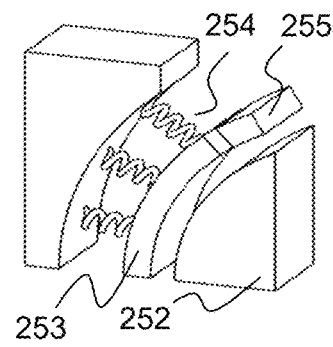
FIG. 28F shows yet another variation of the movable member component from FIG. 28C.

The movable member 253 can move in any number of ways. As shown in FIG. 28C, movable member 253 can pivot from a top end so that closure squeezes mixture out of the tube. As shown in FIG. 28D, movable member 253 can pivot from the bottom end to force mixture toward the freeze bag 203. As shown in FIG. 28E, movable member 253 can translate linearly and squeeze mixture in both directions. A number of contrivances can be used to affect movement of the movable member 253, such as mechanical, electro-mechanical, manual or automatic options. Moreover, as shown in FIG. 28F, elastic members such as springs 254 can be used to bias the movable member 253 toward fixed member 252. This would allow the movable member 253 to automatically move toward the fixed member 252 when dispensing pressure is reduced or a secondary valve 255 is closed.

Figure 26B:
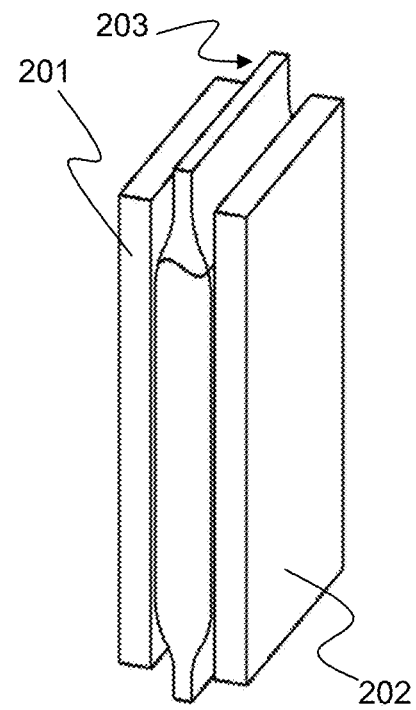
FIG. 26B shows another simplified view of a freezer bag system suitable for use in the frozen confection machine of FIG. 25 where the bag system is being supported between a first and second cold plate of the frozen confection machine.

FIGS. 29A-29C and FIG. 30 show another embodiment of a bag system 260. Bag system 260 contains a freeze bag 203, dispensing tube 250, reservoir bag 261, air tube 262, and liquid tube 263 that extends in fluid communication between the reservoir bag 261 to the freeze bag 203. The flexible freeze bag 203 is structurally supported in a suitable manner, for example, by cold plates as shown in FIG. 26B. Reservoir bag 261 may be deformable, be rigid or semi-rigid, sit in a support structure, or have supports. Liquid tube 263 fluidly communicates with the freeze bag 203 at a level between the top and bottom of the freeze bag 203. Air enters the air tube 262 via air compressor or other means known in the art, such that the pressure in the bag system 260 is higher than outside the bag system. In addition, the pressure surrounding the bag system 260 can be lowered to create a pressure differential. As in other embodiments discussed herein, gases other than air can be used.

The pressure differential created by the air forced into air tube 262 inflates the freeze bag 203 and has several benefits. The air pressure forces the freeze bag against the cold plates 201, 202 which ensures good thermal contact between the freeze bag 203 and cold plates 210, 202. Air pressure also forces liquid comestible mixture above the level of the liquid tube 263 back into the reservoir bag 261. This ensures that an air pocket exists above the liquid tube 263. Liquid level line 264 indicates the liquid level in the freeze bag 203 when the freeze bag contents are still liquid Reservoir bag 261 is in fluid communication with the freeze bag 203 through liquid line 263. When ice cream is dispensed from dispensing tube 250 the level of mixture in the freeze bag 203 drops. This allows liquid mixture from reservoir bag 261 to drain into the freeze bag 203. This allows for continuous dispensing and freezing of the comestible mixture. The dispensing tube 250 is shown at the bottom of the freeze bag 203. The dispensing tube 250 could also be on the upper end of the freeze bag 203 as previously describe for frozen mixture and liquid mixture separation. In this case, flow of liquid mixture from the reservoir bag 261 to the freeze bag 203 would work in a similar manner when frozen mixture is pushed to the top of the freeze bag 203.

Figures 29A, 29B:
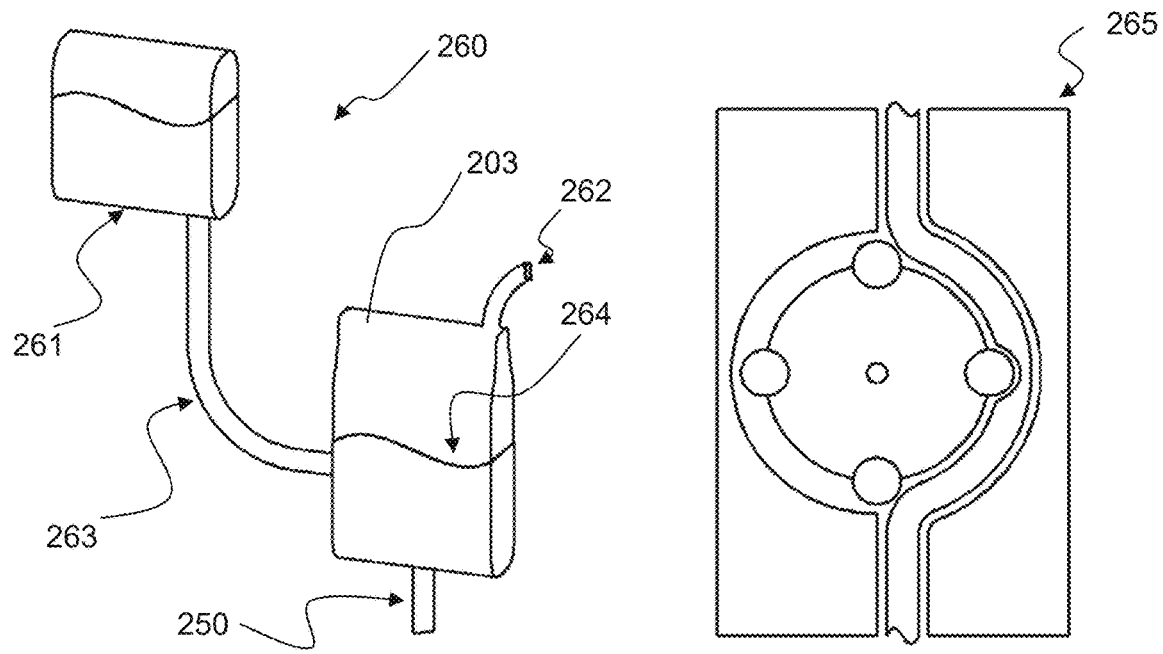
FIG. 29A illustrates an exemplary embodiment of a freezer bag system suitable for use in a frozen confection machine made in accordance with the present disclosure.
FIG. 29B is an illustration showing additional detail of the freezer bag system of FIG. 29A.
Figures 29C, 30:
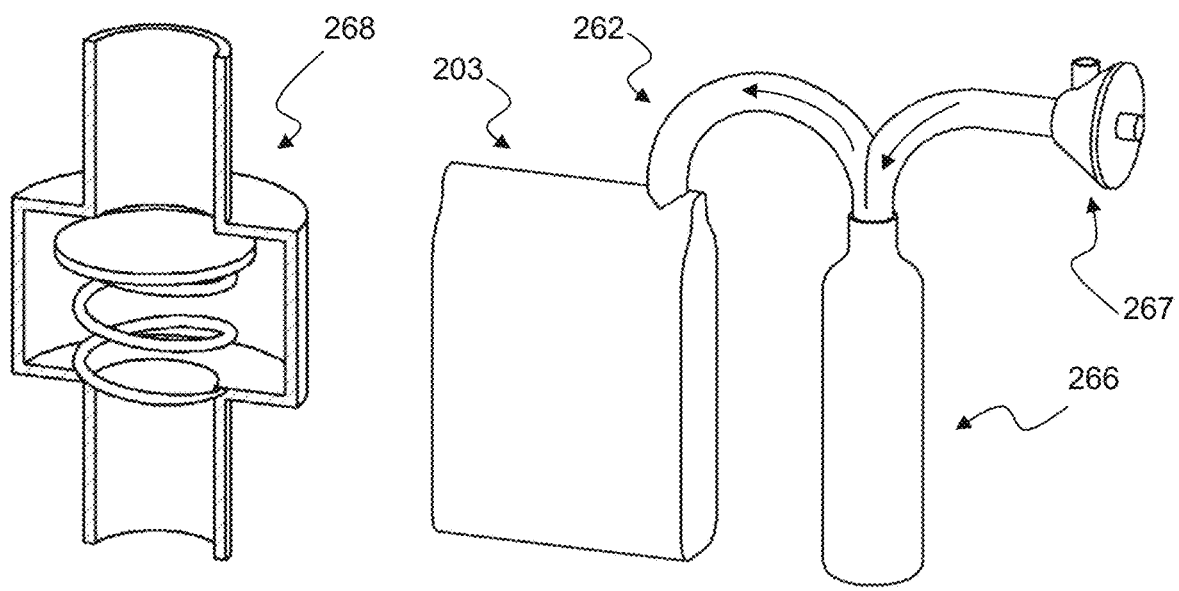
FIG. 29C is another illustration showing additional detail of the freezer bag system of FIG. 29A.
FIG. 30 is a simplified view of a means for feeding air to the freezer bag system of FIG. 29A.

The bag system 260 in FIGS. 29A-29C is not shown to scale. Typically, the reservoir bag 261 volume will be much greater than the freeze bag 203 volume. Additionally, a pump 265 could optionally be used in the liquid tube 263 as illustrated in FIG. 29B. This would allow the reservoir bag 261 to be at a lower pressure than the freeze bag 203. In addition, use of the pump 265 would eliminate the need for the reservoir bag 261 to be disposed above the freeze bag 203 for gravity feeding. Moreover, the reservoir bag 261 could also be contained outside the frozen confection machine, enabling the use of a bag having a larger volume. In addition, it may be desirable to prevent any reverse flow from the freeze bag 203 into the reservoir bag 261. In this case, an optional check valve 268 can be used in the liquid tube 263 as illustrated in FIG. 29C.

As illustrated in FIG. 30, one manner or means of feeding air to air tube 262 is with an air compressor 267. It is desirable to use a small compressor to minimize the cost of the system. However, a small air compressor may not provide enough flow to quickly inflate the freeze bag 203. In addition, when rollers 212, 216 roll over the freeze bag 203, the volume of the bag decreases. This can force air out of the freeze bag through air tube 262. When this occurs, it is desirable to quickly re-inflate the freeze bag 203. To allow the use of a small compressor 267, an air tank 266 can be used to store some volume of air at the required pressure. This will allow the required volume of air to quickly fill the freeze bag 203 without needing an overly large air compressor 267.

FIGS. 31A-31C show another embodiment of a bag system 270 that has features for controlling liquid and air levels in the freeze bag 271. Freeze bag 271 has integral air tube 272 and integral liquid tube 273. Air inlet 274 feeds air into freeze bag 271 and reservoir bag 275 via air tube 272 and air tube 276, respectively. Air tube 272 extends into the freeze bag 271 a distance further than liquid tube 273. When roller 277 (FIGS. 31B and 31C) passes over tubes 272 and 273, the contents in these tubes are drawn into the freeze bag 271. Since liquid tube 273 is shorter than air tube 272, the roller 277 uncovers the liquid tube first. This allows back flow from the freeze bag 271 into the reservoir bag 275. Therefore, when roller 277 uncovers air tube 272, there is no pressure differential to force liquid into the air tube 272 and into the air inlet 274. Otherwise, liquid could enter the air tube and damage the pressurized air source (e.g., an air compressor).

Figure 32A:
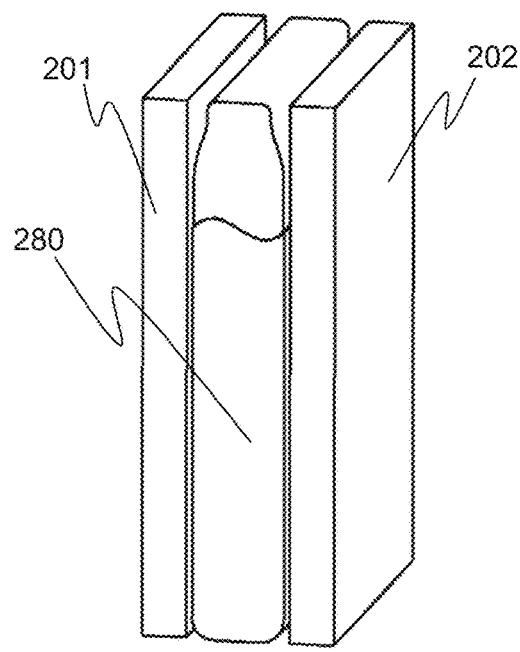
FIG. 32A illustrates an embodiment of a freezer bag according to the present disclosure which does not include a reservoir bag or dispensing nozzle associated therewith.
Figure 32B:
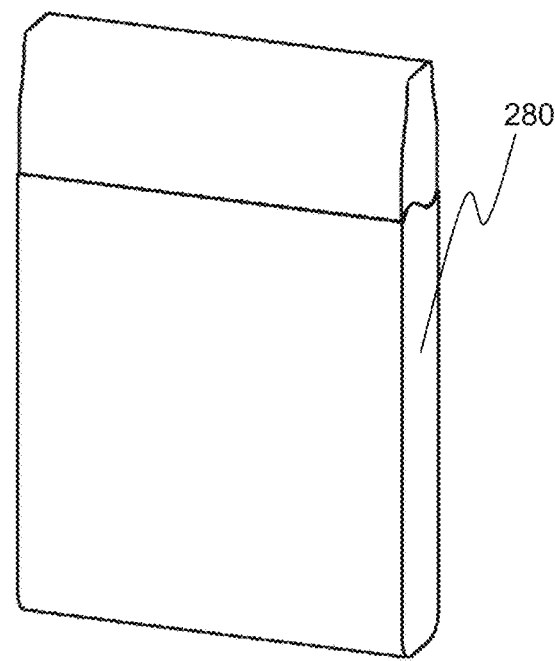
FIG. 32B is an illustration showing additional detail of the freezer bag of FIG. 32A.

FIGS. 32A and 32B show a freeze bag 280 that does not include a reservoir bag or dispensing nozzle associated therewith. Freeze bag 280 can be used in the machine of the embodiments illustrated in FIGS. 25 and 27. Freeze bag 280 could be used for making hard serve ice cream if desired. In such embodiments, the machine will run until soft serve consistency is achieved. The operation of the kneading rollers can be stopped. The bag 280 can be left in the machine between the cold plates 201, 202 to hard freeze or can be removed and put into a conventional freezer.

Figure 33:
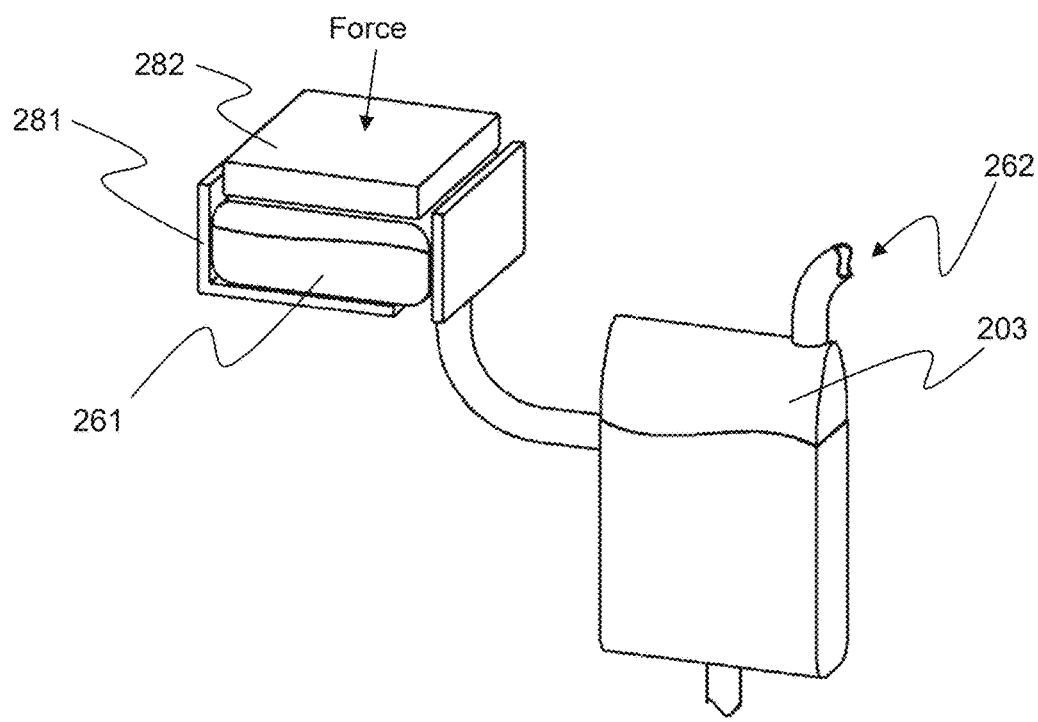
FIG. 33 illustrates an exemplary embodiment of a freezer bag system suitable for use in a frozen confection machine made in accordance with the present disclosure where a rigid structure supports a reservoir bag.

FIG. 33 shows a bag system like that of FIGS. 29A-29C, where reservoir bag 261 is contained by a rigid structure 281. A lid 282 applies a force on the reservoir bag 261. This force could be from the weight of the lid or other means. An air tube 262 may be used to initially inflate the bag system and the lid force can be used to maintain pressure in the bag. This would allow the freeze bag 203 to quickly re-inflate if the rollers cause flow to go from the freeze bag 203 to the reservoir bag 261.

Figure 34:
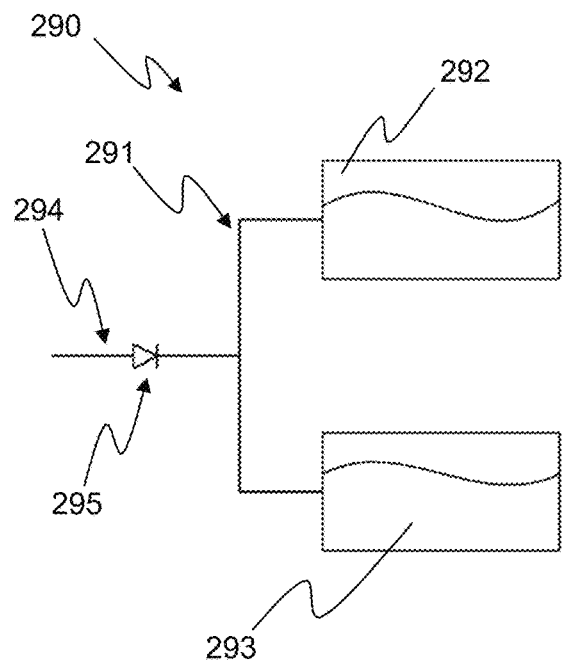
FIG. 34 is an illustration of a schematic arrangement of a freezer bag system in accordance with the present disclosure which includes fluid communication between a reservoir and a freeze bag.

FIG. 34 shows a schematic arrangement of a bag system 290. Tube 291 establishes fluid communication between the reservoir bag 292 and the freeze bag 293. Air tube 294 connects to tube 291. A check valve 295 prevents flow from backing into the air tube 294 yet allows flow through air tube 294 to reach tube 291, and thus communicate with reservoir bag 292 and freeze bag 293. Flow from reservoir bag 292 into freeze bag 293 is enabled by gravity or pump (not shown).

Figure 35:
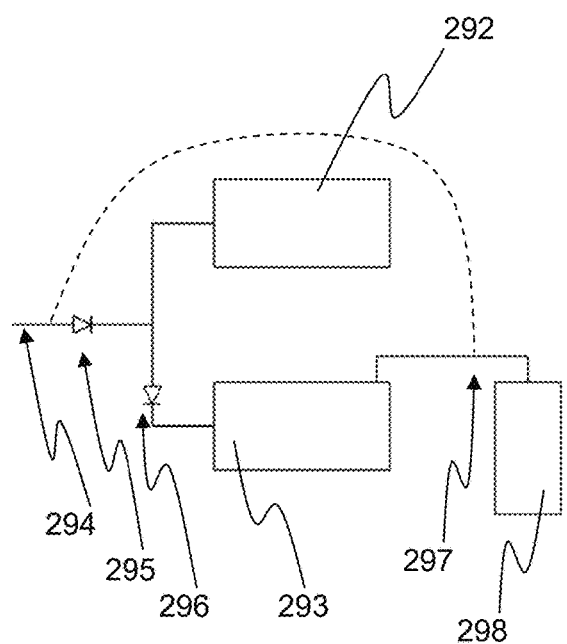
FIG. 35 is an illustration of another schematic arrangement which is a variation of FIG. 34.

FIG. 35 shows another schematic arrangement of a bag system which is a variation of system 290 in FIG. 34. Here, an additional check valve 296 is used to prevent backflow of liquid mixture into the reservoir bag 292. Air tube 297 communicates with air reservoir 298 or optionally with air tube 294, indicated by the broken lines in the bag system. This allows freeze bag 293 to quickly re-inflate after rollers (not shown) squeeze some volume out of the bag.

Figure 36A:
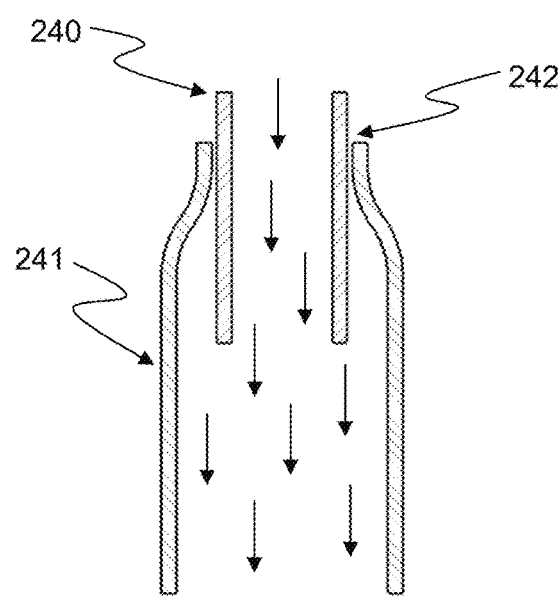
FIG. 36A illustrates a simplified view of an exemplary embodiment of a check valve arrangement suitable use in the freezer bag systems and frozen confection machines of the present disclosure and which is made from standard poly bag materials.
Figure 36B:
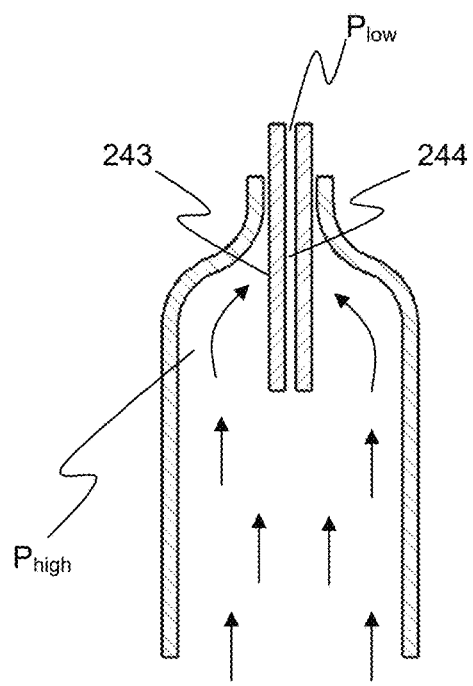
FIG. 36B is another view of the check valve arrangement from FIG. 36A.

FIGS. 36A and 36B show a check valve arrangement that can be constructed from standard plastic film materials (e.g., polyethylene, nylon). This type of tubing has very high flexibility and very low elasticity. Therefore, it collapses unless the pressure inside the tube is greater than the pressure outside the tube. Tube member 240 extends some distance inside tube member 241. A seal 242 exists between the outer wall of tube 240 and the inner wall of tube 241. When pressure urges flow in a first direction (FIG. 36A), pressure inflates the flexible tubing and flow proceeds unimpeded. When pressure urges flow in a second direction (FIG. 36B), the portion of tube 240 that is inside tube 242 sees a higher pressure on the outer wall 243 of tube 240 than on the inner wall 244. This causes tube 240 to collapse, which prevents flow in the second direction.

Figure 37:
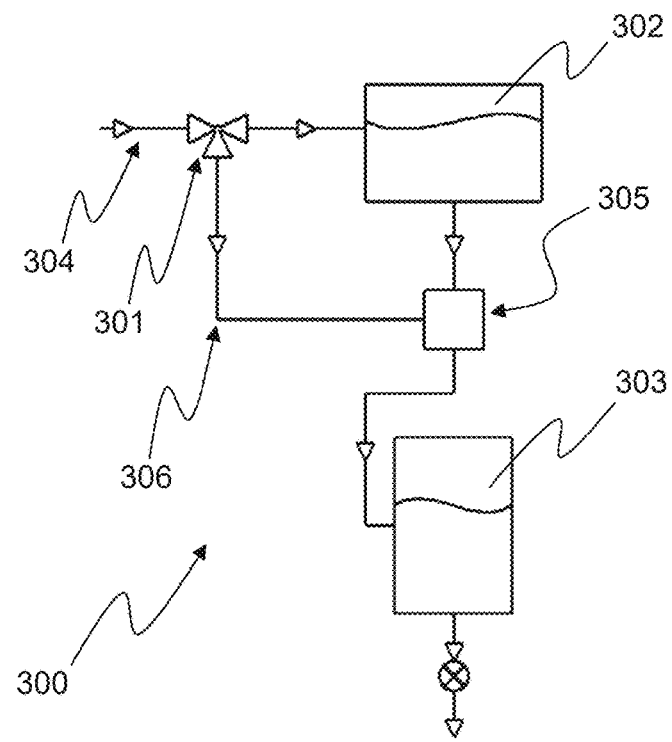
FIG. 37 shows a schematic arrangement of a freezer bag system made in accordance with the present disclosure and which uses a three-way valve to control flow between a reservoir bag and freeze bag.

FIG. 37 shows a schematic arrangement of a bag system 300 that uses a three-way valve 301 to control flow between the reservoir bag 302 and freeze bag 303. When three-way valve 305 is in a first position, air flows into air line 304 and is directed into the reservoir bag 302. Liquid mixture from reservoir bag 302 is forced through valve 305 into freeze bag 303. When rollers (not shown) pass over freeze bag 303, valve 305 will permit flow back into the reservoir bag 302 but prevent flow into tube 306 and three-way valve 301. This prevents contamination of three-way valve 301, which generally is not a disposable element of the system. When three-way valve 301 is in a second position, air flows from air line 304 into tube 306 and through valve 305 and into freeze bag 303.

Figures 38A, 38B, 38C, 38D, 38E:
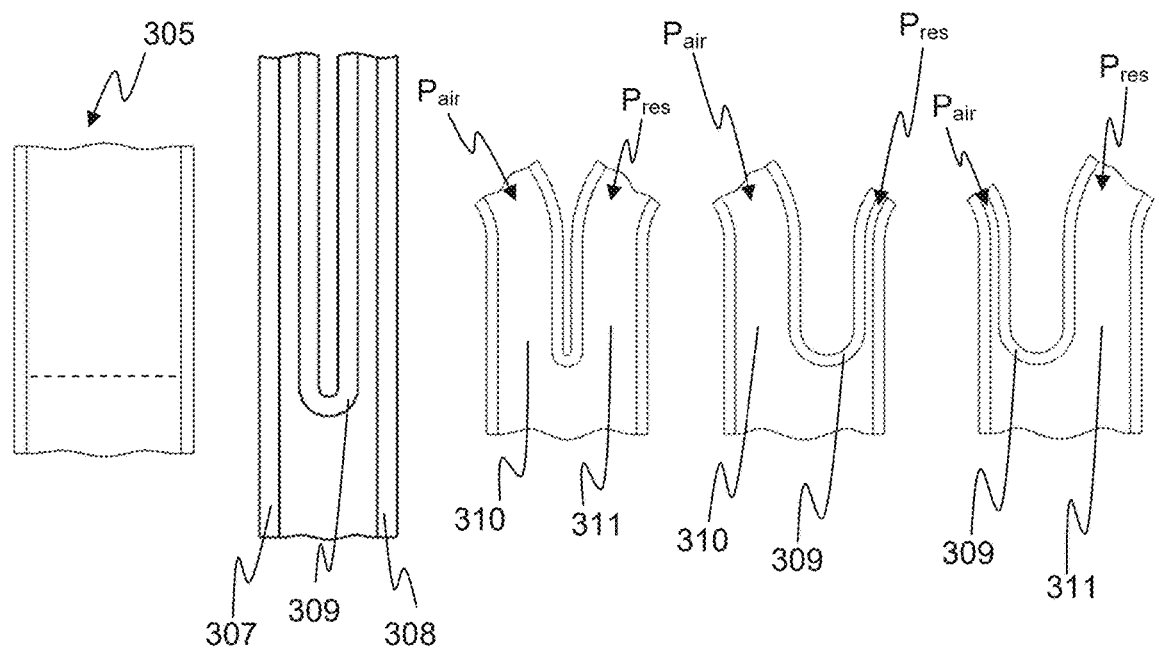
FIG. 38A illustrates a method of implementing a valve component from the freezer bag system of FIG. 37 which shows a front view of the valve component.
FIG. 38B is a first side view illustration of the valve component of FIG. 38A where the centrally disposed divider of the valve component is shown in a neutral position.
FIG. 38C is a second side view illustration of the valve component of FIG. 38A where first and second flow channels are shown.
FIG. 38D is a third side view illustration of the valve component of FIG. 38A where pressure in the first flow channel has forced the divider toward the second flow channel in sealing engagement therewith.
FIG. 38E is a fourth side view illustration of the valve component of FIG. 38A where pressure in the second flow channel has forced the divider toward the first flow channel in sealing engagement therewith.

FIGS. 38A-38E illustrate a method of implementing the valve 305 of FIG. 37 described above. More particularly, plastic film materials are used to make the valve 305 so that fabrication will be inexpensive and the valve can be disposable. FIG. 38A shows a front view of valve 305, and FIGS. 38B-38E show side views of valve 305. Valve 305 contains a left wall 307, a right wall 308, and a divider 309 as shown in FIG. 38B. The components are arranged to form a first flow channel 310 and a second flow channel 311. When air enters the first flow channel 310, the pressure ($P_{air}$) will exceed the pressure in reservoir 302 and flexible divider 309 will be forced toward the second flow channel 311 as shown in FIG. 38D. The second flow channel 311 leads to reservoir bag 302 (FIG. 37). When three-way valve 301 is in a first position and air is directed to reservoir bag 302, the pressure ($P_{res}$) in the reservoir will push divider 309 to seal the first flow channel 310 as shown in FIG. 38E.

Figure 39A:
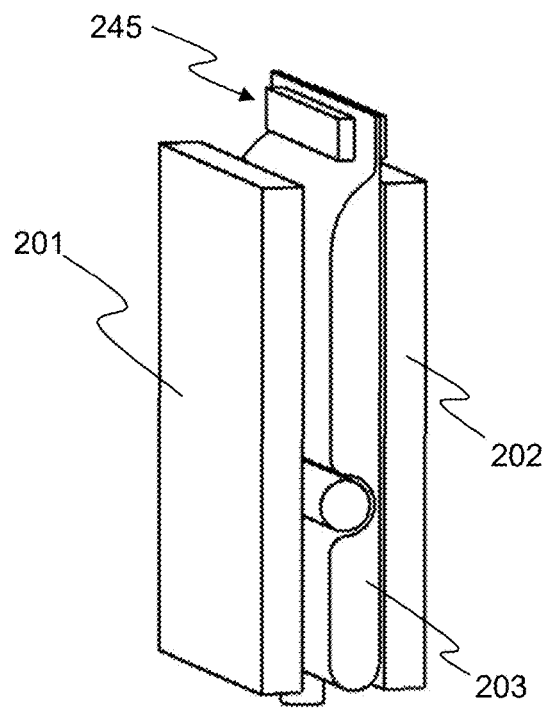
FIG. 39A shows an exemplary clamping mechanism suitable for holding a freezer bag in a frozen confection machine made in accordance with the present disclosure.
Figure 39B:
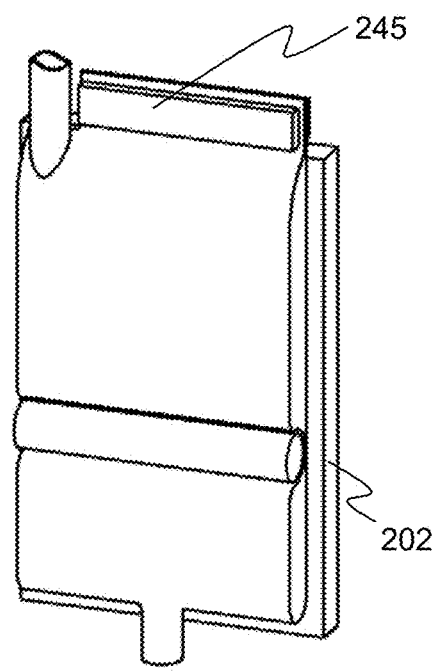
FIG. 39B is an illustration showing additional detail of the clamping mechanism of FIG. 39A.

FIGS. 39A and 39B show an exemplary clamping mechanism 245 used to hold the freeze bag 203 at an upper end thereof. The clamping mechanism 245 holds the freeze bag 203 in place between cold plates 201, 202. Alternatively pins or other retaining features can be used.

Figure 40A:
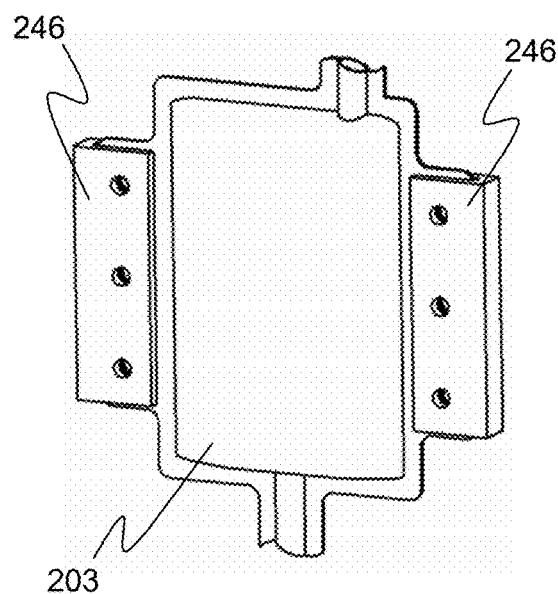
FIG. 40A shows another exemplary clamping mechanism suitable for holding a freezer bag in a frozen confection machine made in accordance with the present disclosure.
Figure 40B:
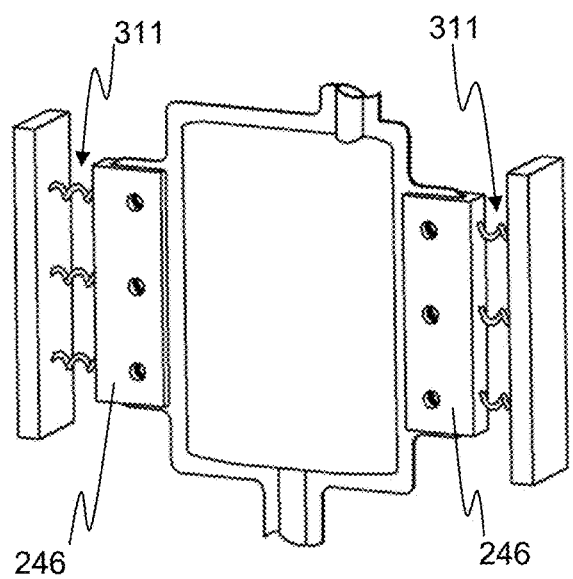
FIG. 40B is an illustration showing additional detail of the clamping mechanism of FIG. 40A.

FIGS. 40A and 40B show an embodiment where the freeze bag 203 is held along its edges via side clamps 246. Flexible members 311 (FIG. 40B) can be included to allow some movement of the bag 203 as rollers (not shown) roll over the bag. This prevents over stressing the bag.

Figure 41:
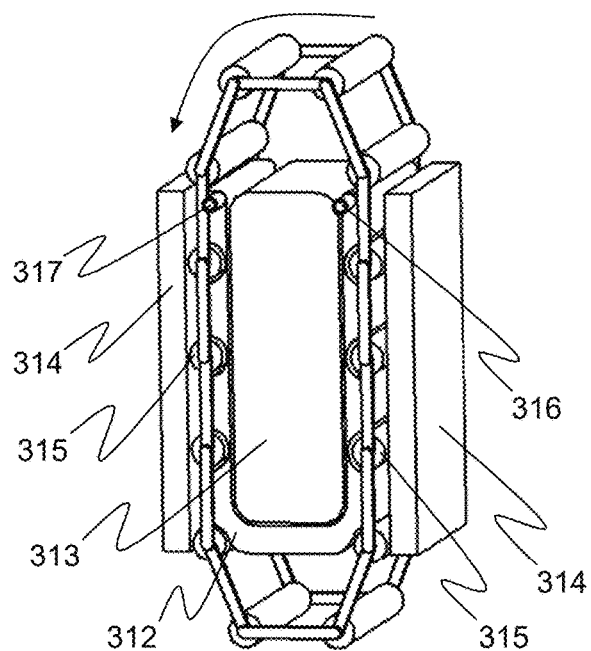
FIG. 41 illustrates an embodiment of a freezer bag according to the present disclosure where the freezer bag wraps around a central cold plate.

FIG. 41 shows an embodiment where the freeze bag 312 wraps around a central cold plate 313. Cold plates 314 are positioned on either end of the central cold plate 313. The rollers 315 move in a counterclockwise loop as they knead the ice cream in bag 312. A dispensing tube 316 extends from an end of the freeze bag. Reservoir tube inlet 317 extends from another end of the freeze bag 312. This arrangement allows for a larger volume freeze bag 312 in a compact space. It also provides for separation of the liquid comestible mixture and frozen comestible mixture.

Figure 42A:
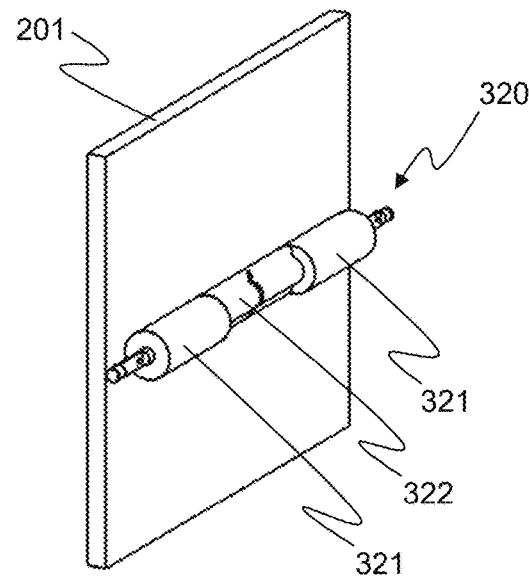
FIG. 42A illustrates an exemplary roller assembly suitable for use in a frozen confection machine made in accordance with the present disclosure and which includes a roller with a dispensing shoe feature.
Figure 42B:
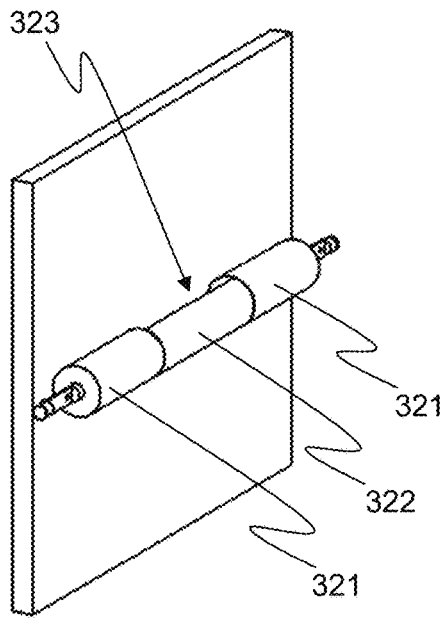
FIG. 42B is an illustration showing additional detail of the roller with dispensing shoe feature of FIG. 42A.
Figure 43:
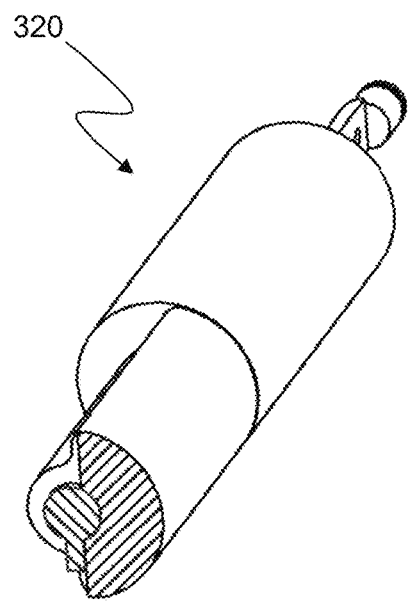
FIG. 43 is another illustration of the roller with dispensing shoe feature of FIG. 42A which shows a cutaway view thereof.

FIGS. 42A and 42B show an embodiment where the roller assembly 320 has rollers 321 and dispensing shoe 322. When the dispensing shoe 322 is in a first position shown in FIG. 42A, the shoe presses the freeze bag (not shown) against cold plate 201. The dispensing shoe 322 along with roller 321 contact the full width of the freeze bag to aid in dispensing as the roller assembly 320 moves down the cold plate. When the dispensing shoe 322 is in a second position as shown in FIG. 42B, there is a gap 323 between rollers 321 which allows the comestible mixture to flow therethrough. FIG. 43 shows a cutaway view of the roller assembly 320. Thus, rollers 321 rotate as the roller assembly 320 moves upwardly and/or downwardly, while the shoe 322 is positioned to slide relative to the freeze bag pressed against the cold plate 201 and dispense product from the freeze bag in the first orientation (FIG. 42A) of the shoe and allows the comestible product to flow around the rollers when the shoe is in a second orientation (FIG. 42B).

FIGS. 44A and 44B show an embodiment where a dispensing shoe 324 extends the full length of the freeze bag (not shown). The dispensing shoe 324 can be in a first position (FIG. 44A) for dispensing and a second position (FIG. 44B) for kneading with rollers 321. FIGS. 45A and 45B each show a close-up detailed view of the dispensing shoe 324 and rollers 321.

The cold plates shown in many of the exemplary embodiments disclosed herein can use one or more of several types of coatings or surface treatments known in the art. These can be used to reduce wear, reduce friction or reduce the likelihood of ice forming and sticking to the cold plate surface. For example, SurfTec's Icephobicr™ coating can be used to reduce the adhesion of frost on the cold plate surface.

From time to time it may be necessary to defrost the cold plates. Frosting of the cold plates can occur when moist air from the atmosphere leaks into the insulated space around the cold plates. Many methods known in the art can be used to defrost the cold plates. These include but are not limited to hot gas bypass for vapor compressor refrigeration or electrical resistance heaters on the cold plates.

Figure 46:
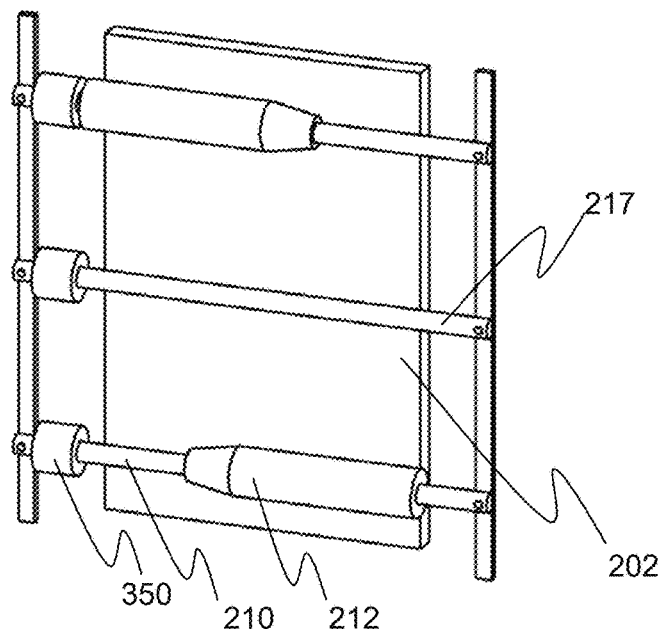
FIG. 46 illustrates a modification of the embodiment illustrated in FIGS. 25-27 where a roller is added to the mixing bar thereof.
Figure 47A:
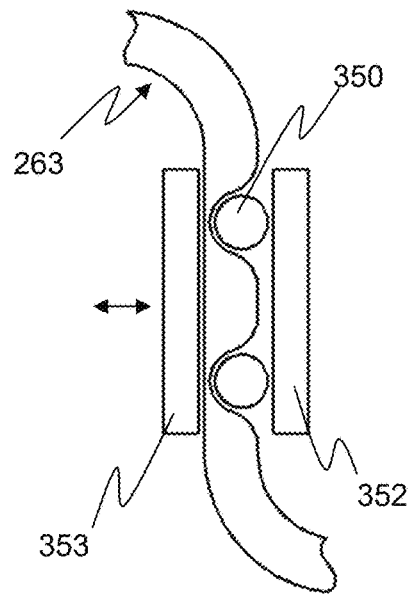
FIG. 47A is an illustration showing additional detail of the modified roller and mixing bar of FIG. 46.
Figure 47B:
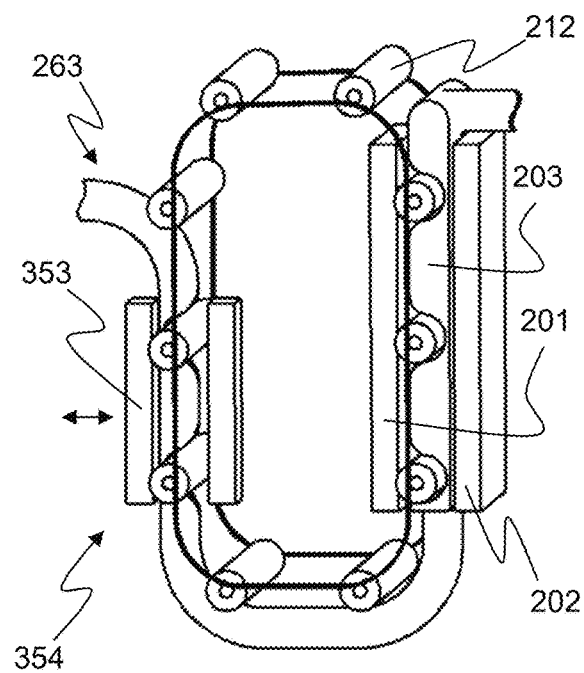
FIG. 47B is another illustration having additional detail of the modified roller and mixing bar of FIG. 46.

The embodiment of FIGS. 25-27 as described above uses a mechanism to knead the comestible mixture. In FIG. 46 and FIGS. 47A and 47B, a modification of the embodiment of FIGS. 25-27 is shown where roller 350 is added to mixing bar 210. Moreover, mixing bar 210 includes generally cylindrical roller 212 with one end thereof being tapered. As mentioned above, rollers can be provided with tapered ends to reduce stress on the freeze bag at the roller edges. The added roller 350 is used in conjunction with a peristaltic pump 354 that pumps comestible mixture in the liquid tube 263 to the freeze bag 203 adjacent cold plate 202. The benefit is that a separate motor is not needed to drive the peristaltic pump 354. Pump plate 352 and/or pump plate 353 can be made moveable to control the pumping action. Other means of interfacing driving a pump using the output of the mixing motor can be devised. For example, drive shaft 217 (FIG. 25) could contain a gear or other drive means for driving a pump. A magnetic clutch could optionally be used for starting and stopping the pump.

Figure 48:
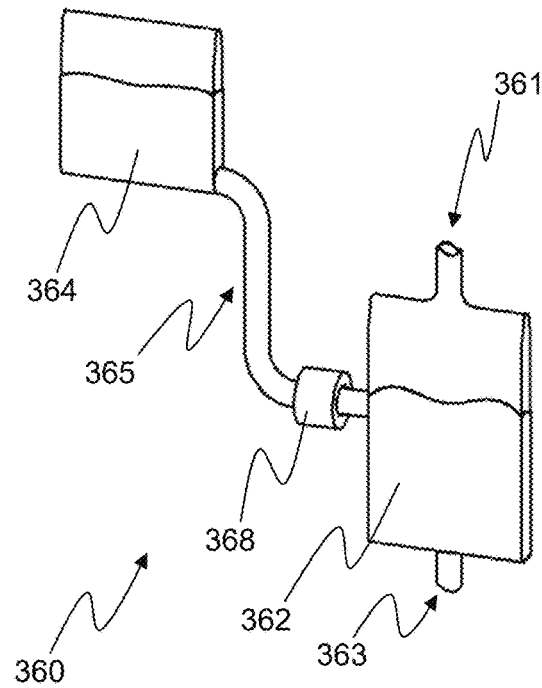
FIG. 48 illustrates an exemplary embodiment of a freezer bag system suitable for use in a frozen confection machine made in accordance with the present disclosure where a dispensing tube is at or near the top of the freeze bag.

FIGS. 48 and 49A-49B shows an embodiment of a bag system 360 where the dispensing tube 361 is at or near the top of the freeze bag 362. In this arrangement the rollers (not shown) tend to move the mixture upward. This can be accomplished by rollers that move upward, by rollers moving horizontally in a coordinated manner, or by other methods apparent to one skilled in the art. Air line 363 pressurizes freeze bag 362 and reservoir bag 364. Liquid tube 365 is in fluid communication with the freeze bag 362 at an intermediate distance between the top and bottom. The air pocket at the top of freeze bag 362 causes the liquid level to equalize at the level of the liquid tube 365 entering the freeze bag 362. As the comestible mixture freezes it becomes viscous. The viscosity of the frozen comestible mixture 366 (FIG. 49B) is high enough so that it is suspended in the freeze bag 362 between the cold plates 201, 202. This provides separation between frozen mixture 366 and liquid mixture 367. As frozen mixture 366 is pushed to the top of the freeze bag by action of the rollers, the liquid level in the freeze bag 362 drops. This allows more liquid to flow to the freeze bag 361 from the reservoir bag 364. This provides an automatic but passive means of moving comestible mixture from the reservoir bag 364 to the freeze bag 362.

Another benefit of the embodiment illustrated in FIGS. 48 and 49A-49B is that when liquid mix 367 enters the freeze bag 362 it is separated from the frozen mix 366. As the rollers move up, some liquid mix 367 is pushed up with the rollers where it begins freezing on the cold plate(s). This creates a slushy zone 368 that tends to float on the liquid mix 367 but is separated by gravity from the frozen mix 366. Therefore, fresh liquid mix 367 does not dilute the frozen mix 366 that is ready to dispense. In this embodiment, and others, it is possible through the action of rollers or other mixing methods that frozen mix 366 could inadvertently be pushed into liquid tube 365 or into other tubes of the various embodiments described herein. This could cause blockage of the tube. A heating element or heating means 368 can be used to melt frozen mix in a tube to restore patency. The dispensing tube 361 is shown for convenience as being approximately centered at the top of the freeze bag 362. However, the dispensing tube could also be along either end of the freeze bag 362 or along the edge of the freeze bag. The orientation of the dispensing tube 361 with respect to cold plates 201, 202 can vary as well. The position of dispensing tube could be perpendicular, parallel, or at some other orientation to the cold plates 201, 202 as is convenient based on a number of design choices.

FIG. 50 shows an embodiment of a bag system 370 having a fill pump 371 and dispense pump or flow meter 372. A communication means 373 (such as an electronic communication, e.g., wire) exists between fill pump 371 and dispense pump/meter 372. When product is dispensed, pump/meter 372 communicates how much was dispensed to the fill pump 371. This allows for the proper amount of liquid mix to be fed from the reservoir bag 374 to the freeze bag 375. The reservoir bag 374 can include a sensor or sensing means 376 to sense a range of physical parameters including but not limited to liquid level, pressure, temperature, weight, flow, color, and opacity. The freeze bag 375 may also include a sensor or sensing means 377 that can sense the same or different parameters as sensing means 376. A processing unit 378 can be used to collect information from the sensors or sensing means 376, 377 to control operation of the machine.

Some comestible mixes may need to be agitated to prevent separation of ingredients in the mix. In conventional soft serve ice cream machines, a motor driven stirrer is used in the reservoir hopper. Such an arrangement can be effective but requires cleaning of components. In the present disclosure, an agitator or means of agitating the reservoir bag can be used to maintain homogeneity of the mixture in the reservoir bag 381. One embodiment of such system 380 is shown in FIGS. 51A and 51B. The reservoir bag 381 of system 380 is placed on a surface or container 382 that is able to oscillate about a pivot point 383. There are numerous ways known in the art which are suitable to cause movement of the container 382 and thus provide desired agitation of the mixture and prevent separation of the mix ingredients.

In FIGS. 52A and 52B, one method of agitating the liquid mixture in the reservoir is shown. A cam 390 is attached to a shaft, such as shaft 218 in FIG. 25. As cam 390 rotates, one end of the reservoir bag platform 391 moves up and down as a result of the eccentric motion of the cam about the shaft centerline. while the other end is attached to a pivot point 392. This causes the contents to slosh in the bag, keeping the contents well mixed.

FIG. 53 illustrates an embodiment of another exemplary kneading/dispensing system 400 for the comestible mixture. In particular, system 400 uses a plurality of piezoelectric transducers 401 to produce ultrasonic vibrations known in the art as being useful for agitating, mixing, homogenizing and pumping fluids. In the present case, vibrations from the piezoelectric transducers 401 mix the comestible mixture and prevent ice crystals from adhering to the wall of the freeze bag 402. The agitation also mixes air in with the mixture. In general, the transducers 401 can be controlled independently. By varying the operating sequencing and intensity of transducer 401, a pumping action can be achieved that moves the comestible mixture toward the dispensing end 403 of the freeze bag.

FIG. 25 shows an embodiment 200 where cooling channels 204 are in the cooling plates 201, 202. Cooling channels 204 are one of several methods useful for cooling the cooling plates. FIG. 54 illustrates another cooling system 410 with certain advantages. As with other embodiments disclosed herein, the cold plates are contained in a partially enclosed or fully enclosed refrigerated space 417 with insulated walls 411. A cooling coil 413 is used to keep the refrigerated space 417 at a desired low temperature. On one or both cold plates 414, there are one or more secondary refrigeration systems. Several types of systems can be employed, but a thermoelectric cooler (TEC) 412 is shown for the current embodiment. The TEC 412 absorbs heat from the cold plates 414 and rejects the heat ($Q_{out}$) to the refrigerated space 417. A circulation fan 418 can also be used in the refrigerated space 412 to enhance convective heat transfer. The cold plates 414 are typically cooled to a temperature below the temperature of refrigerated space 412. This arrangement has several advantages. TECs 412 are solid state cooling devices with no moving parts. The cooling capacity of the TECs 412 is infinitely adjustable between maximum cooling and no cooling. It is easy to create different temperature zones on the cold plate by using multiple independently controllable TECs. Since the TECs 412 only need electrical power to operate, they only need to be attached to the rest of the system by flexible wires. This allows the plates to be easily moved or removed from the system for the purpose of loading comestible mixture, cleaning, repairs etc. The temperature of the cold plate can be easily adjusted for optimizing the temperature for different products. The temperature lift for the TECs 412 is only from the cold plate 414 to the refrigerated space temperature 412, rather than having to reject heat to the ambient. TECs 412 could be used to provide all of the cooling for the system. However, they would be large and inefficient, which would negate benefits of previously described arrangements.

FIG. 55 shows an embodiment 420 similar to that of FIG. 54 where cold plate 414 has heat pipes 415 attached or embedded. Any number of heat pipe technologies known in the art can be used. The cold plate 414 itself can also be constructed as a heat pipe. Heat pipes are passive (non-powered) devices that have very high effective thermal conductivity. Heat pipes contain a liquid that vaporizes at the warm end and condenses at the cool end. Capillary action drives the liquid back to the warm end to absorb more heat. When cold air 416 moves over the heat rejection end of the heat pipe 415, it very quickly reduces the cold plate 414 to very nearly the same temperature as the cold air 416. As with the embodiment 410 of FIG. 54, there is no direct attachment of coolant or refrigerant flow lines to the cold plate, which has benefits previously described. While TECs 412 (FIG. 54) or heat pipes 415 (FIG. 55) are ideal for maintaining the desired temperature on the cold plate, the system as described would work with pure conduction between the cold air and cold plates 414 made of a highly conductive material like aluminum or copper. Typically, in such an arrangements fins would be employed on the side of the cold plate 414 facing the refrigerated space 417.

Figure 56A:
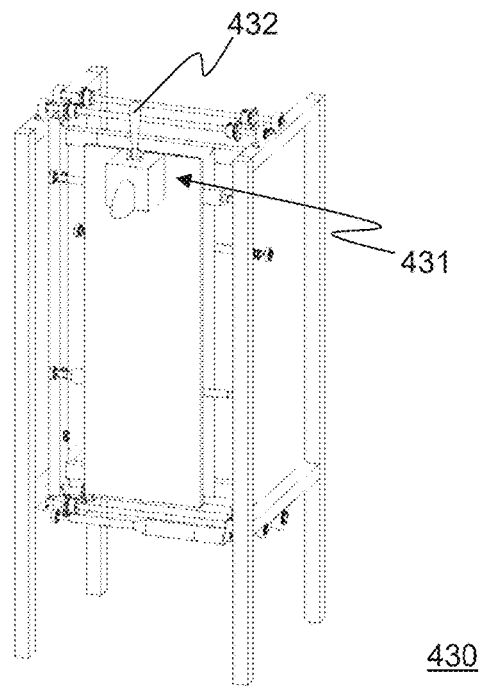
FIG. 56A illustrates an isometric view of an exemplary embodiment of a modular frozen confection machine made in accordance with the present disclosure and which includes a dispensing head and handle for controlling flow of the frozen confection.
Figure 56B:
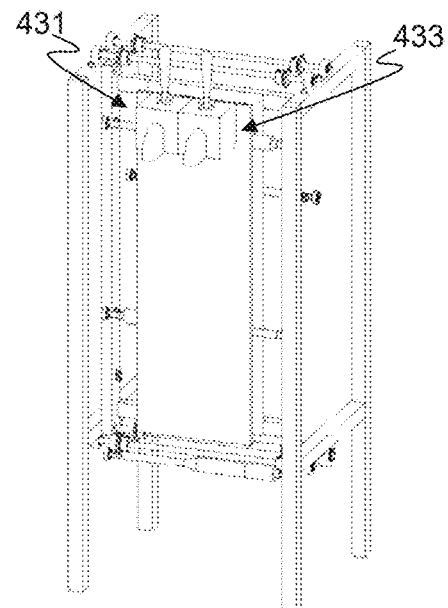
FIG. 56B is another illustration of the frozen confection machine from FIG. 56A which has been modified to include a second dispensing head.
Figure 56C:
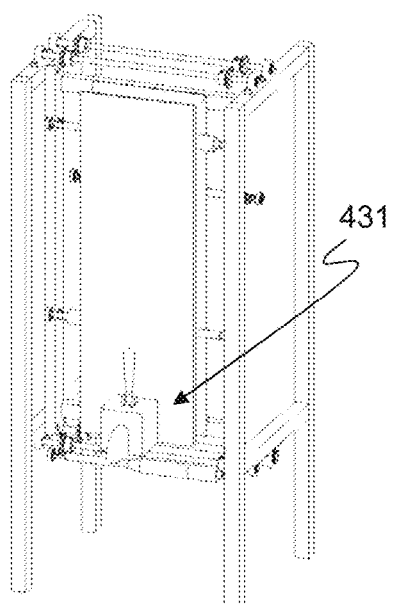
FIG. 56C is another illustration of the frozen confection machine from FIG. 56A which has been modified to move the dispensing head to the lower end of the cold plate.

Conventional frozen confection machines can typically serve one, two, or three flavors from a single machine. However, one and two flavor machines are most common. Very similar technology is currently used for machines that make soft serve products and frozen beverages or shakes. Although the technology for making soft serve and frozen beverages are similar it is different enough that different machines are required for each. In addition, there is no way to convert a single flavor machine to a two-flavor machine or vice versa. The present disclosure has the advantage that the machine is configurable. It can be set up for serving a single flavor or multiple flavors. In addition, it can be configured for serving soft serve products, frozen beverages or one or more of each. With reference to FIGS. 56A-56C, an isometric view of an exemplary embodiment of a frozen confection machine 430 is shown. The dispensing head 431 has a handle 432 that controls the flow of the frozen confection. The dispensing head 431 is modular and movable. The frozen confection machine 430 can be converted by adding a second dispensing head 433 as illustrated in FIG. 56B. This allows the machine to dispense and serve two flavors. A third dispensing head can be added in the middle (not shown) for dispensing a mixture of the two flavors. FIG. 56C shows a configuration where the dispensing head 431 is moved to the lower end of the cold plate. This configuration may be more ideal for dispensing frozen beverages and other frozen confections that have a lower viscosity, whereas having the dispensing head near the top of the cold plate can be more beneficial for higher viscosity soft serve products. In FIGS. 56A-56C the cold plates are shown generally parallel to the front of the machine. The cold plates can be positioned in other orientations. For example the cold plates could be perpendicular to the front of the machine. This would be certain advantages for multiflavor machines.

Figure 57A:
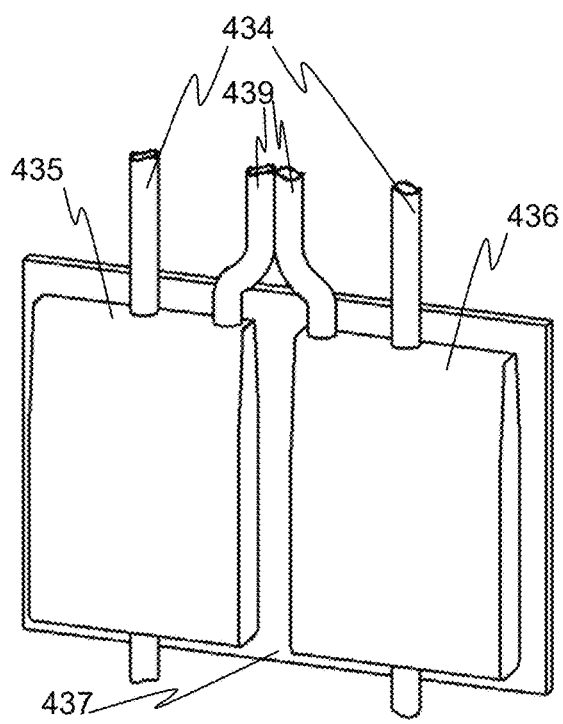
FIG. 57A illustrates an exemplary embodiment of a freezer bag system suitable for use in a frozen confection machine made in accordance with the present disclosure where first and second freeze bags can be used on a single pair of cold plates.
Figure 57B:
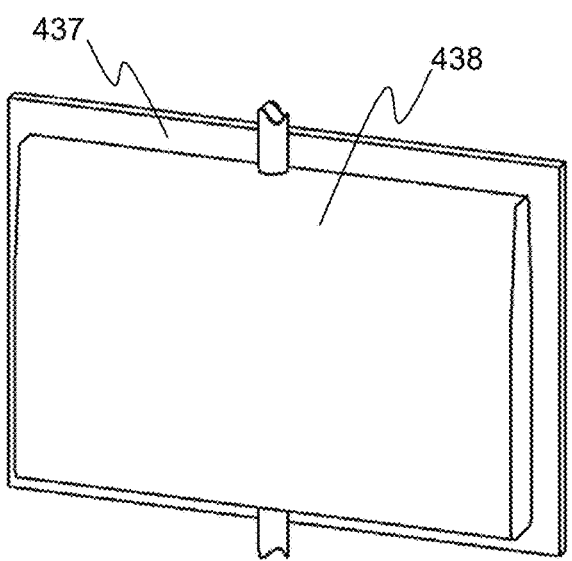
FIG. 57B illustrates an exemplary embodiment of a freezer bag system suitable for use in a frozen confection machine made in accordance with the present disclosure where a large volume single freeze bag is used for serving a single flavor.

An embodiment for the arrangement of the freeze bag for the system 430 of FIGS. 56A-56C is shown in FIGS. 57A-57B. FIG. 57A illustrates how a first freeze bag 435 and second freeze bag 436 can be used on a single pair of cold plates 437. The front cold plate is removed for clarity. This is one option for a machine that can switch between single or multiple flavors. Freeze bags 435, 436 can have a dispensing tube 434 for dispensing a single flavor and dispensing tube 439 for dispensing two flavors simultaneously or as a mix. FIG. 57B shows how a single freeze bag 438 can be used for serving a single flavor with more volume on the same machine.

Figure 58A:
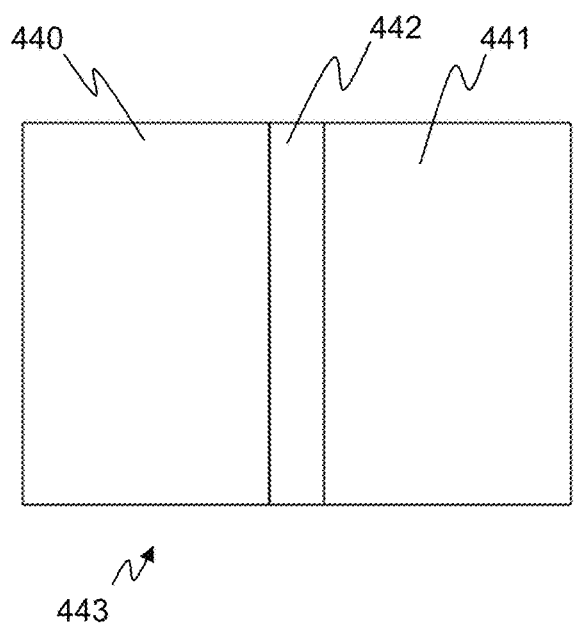
FIG. 58A is a simplified front view of an exemplary cold plate arrangement suitable for use in a frozen confection machine made in accordance with the present disclosure which is configured to dispense multiple flavors.
Figure 58B:
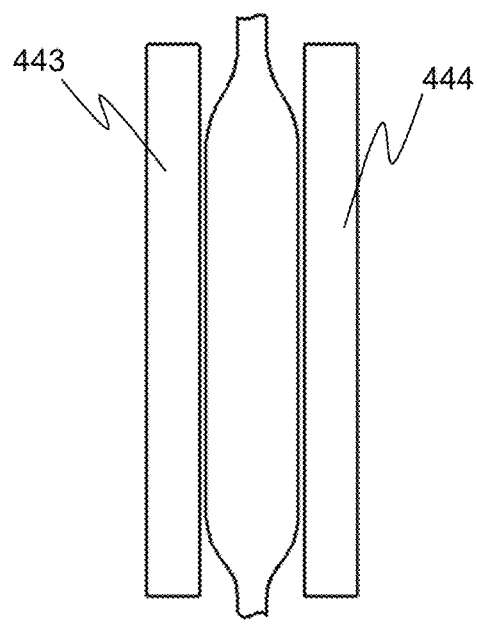
FIG. 58B is a simplified side view illustration of the cold plate arrangement of FIG. 58A.

FIGS. 58A and 58B show a front and side view, respectively, of an alternative cold plate arrangement for a machine capable of serving one or multiple flavors. The rear cold plate 443 has a first side section 440, a second side section 441, and a middle section 442. The middle section 442 is made from a thermally insulating material or can simply be an air gap. The temperature of the first side section 440 and second side section 441 can be controlled independently, which is beneficial if the frozen confection on either side needs to be at a different temperature. The side view in FIG. 58B shows a front cold plate 444 which is divided similarly to the rear cold plate 443.

Figure 59A:
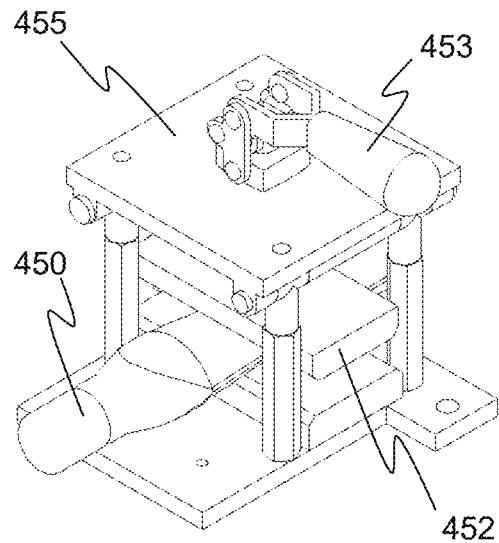
FIG. 59A illustrates an exemplary embodiment of a dispensing head suitable for use in a frozen confection machine made in accordance with the present disclosure which provides for easy loading of a freeze bag nozzle.
Figure 59B:
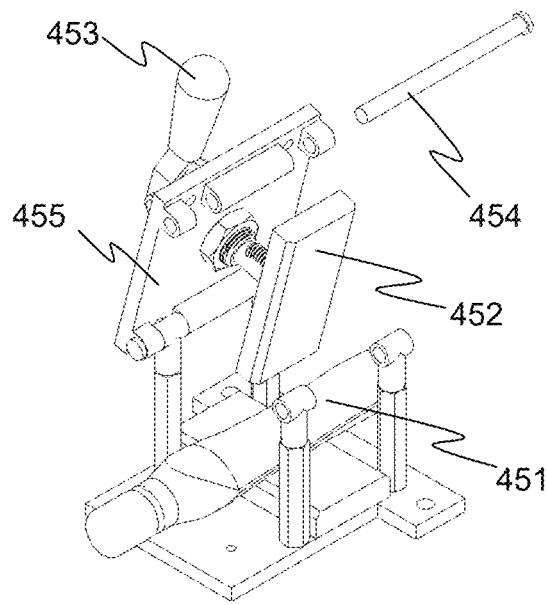
FIG. 59B is another illustration of the dispensing head from FIG. 59A which shows a clamping foot component in a raised position.

FIGS. 59A and 59B show an embodiment of a dispensing head designed for easy loading of the freeze bag nozzle 450. A nozzle 450 is attached to the dispensing end second side section 441 of the freeze bag (not shown). The nozzle is a disposable plastic element that is permanently attached to the dispensing end 451. Removing pin 454 (FIG. 59B) allows the upper plate 455 to pivot out of the way. The nozzle 450 and dispensing end 451 are placed in position as shown. The upper plate 455 is moved back into position and the pin 454 is reinserted. Movement of the handle 453 raises and lowers the clamping foot 452. When the clamping foot 452 is lowered (FIG. 59A), it pinches the dispensing end 451, thus preventing flow of the comestible mixture. When the clamping foot 452 is raised (FIG. 59B), the mixture can flow.

Figure 60:
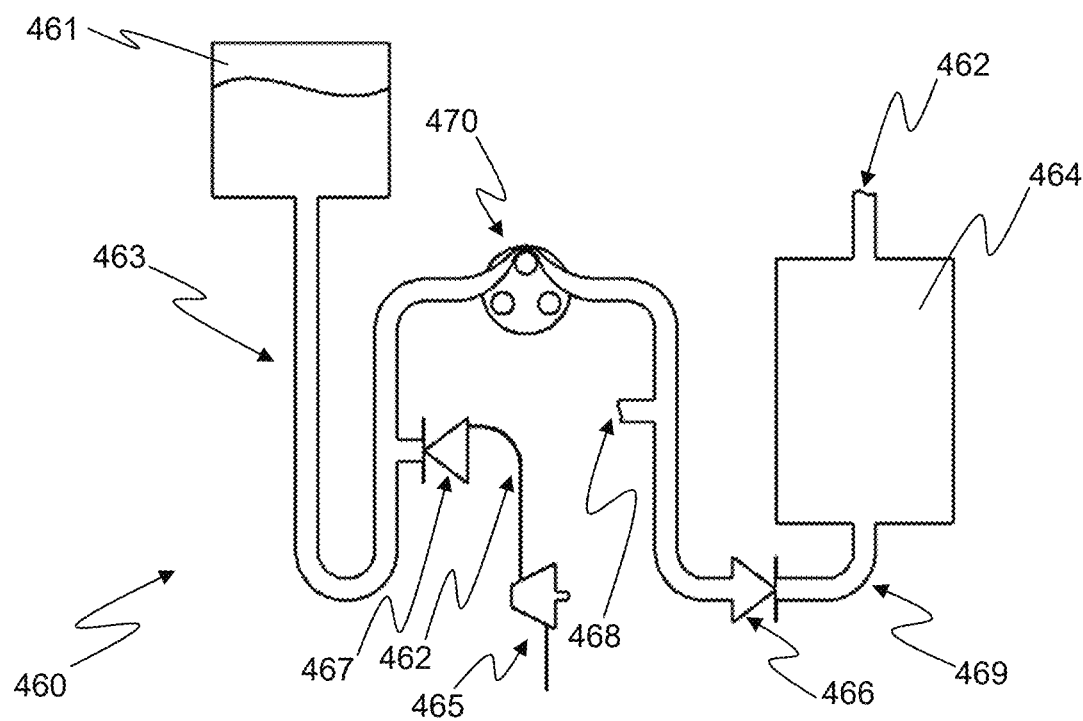
FIG. 60 illustrates an exemplary embodiment of a freezer bag system suitable for use in a frozen confection machine made in accordance with the present disclosure and which includes a pump.

FIG. 60 shows an embodiment of a bag system 460 with certain advantages. Air line 462 feeds air into liquid line 463 coming from the reservoir bag 461. The pressure in the reservoir bag 461 can be at or near the ambient pressure of the surroundings. Note that in most embodiments it is not necessary for the reservoir bag 461 to be a flexible container, however, it is generally desirable that reservoir bag 461 be made of disposable materials such as plastic films. It is also desirable that all tubing that contacts the comestible mixture such as liquid line 463 be made of similar low cost plastic films. Reservoir bag 461 is shown as being positioned above the other components in the bag system, but the bag could be in any position above or below the other components without departing from the scope of the present disclosure. Moreover, FIG. 60 shows the reservoir bag 461 as being sealed, but the bag could also be open or vented to the atmosphere. Pump 470, shown as a peristaltic pump, pumps the mixture of air and comestible mixture to the freeze bag 464. This pressurizes the freeze bag 464 with the desired ratio of air (or other gas) to comestible mixture. It also provides some premixing of air and comestible mixture, which can aid in achieving desired overrun. The pump 470 can be optimized to homogenize the air and comestible mixture. If the reservoir bag 461 is at ambient pressure, air line 462 fed by air compressor 465 only needs to achieve a low discharge pressure since air is injected upstream of the pump 470. An optional check valve 466, shown schematically, can be used to prevent back flow from the freeze bag 464. The pump 470 can also prevent back flow, which can eliminate the need for check valve 466. Pump 470 can optionally be run in reverse to pump comestible mixture from the freeze bag 464 back to the reservoir bag 461. This can be useful for eliminating waste of comestible mixture when it is time to replace the disposable freeze bag 464. An optional check valve 467 is shown in the air line 462. This prevents comestible mixture from getting into the compressor 465.

The bag system 460 illustrated in FIG. 60 can be used with soft serve and slush beverages. For soft serve, the mixing rollers (not shown) assist with the dispensing of the soft serve and the pump 470 adds additional mixture. The pump 470, in general, cannot apply enough pressure to dispense soft serve or the pressure required may be high enough to rupture tubing or some other component in the bag system 460. For a slush beverage, the low viscosity mixture can flow past the rollers as depicted in certain embodiments, which makes them less useful for dispensing. In this case, the pressure from pump 470 can be sufficient to dispense the beverage. For slushes, overrun is not needed or is needed less. In this case, the compressor 465 can be omitted. Air line 468 could be used as an alternative or in conjunction with air line 467. The pressure required to inject air at air line 468 is higher, but it has the advantage of allowing air to be added to the freeze bag 464 without adding comestible mixture.

The bag system 460 of FIG. 60 and other embodiments of the present disclosure may include surface treatments and material enhancements that optimize performance for the application at hand. Many surface treatments are known in the art. For example, it may be desirable to have a frostphobic coating on the inner surface of the freeze bag to aid in release of ice crystals from the bag surface. Antibacterial coatings for plastics are also known in the art. These coatings can be used on the bag system components to increase the time required between bag system replacement. Optionally, the exterior portion of the freeze bag, or other bag system components, can have a surface coating of a low friction material such as polytetrafluoroethylene (PTFE). This would reduce the friction between the bag and rollers for the purpose of increasing bag life and reducing friction and wear on components in the machine.

Figure 61:
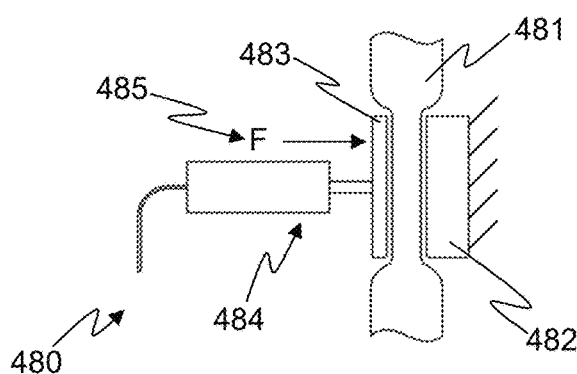
FIG. 61 illustrates an exemplary embodiment of a pressure sensor suitable for use in a frozen confection machine made in accordance with the present disclosure which mates with the outside of the fluid tubing of a freezer bag system.

It can be desirable to sense the pressure in liquid line 463 or freeze bag inlet line 469 or other locations in the system. A pressure sensor in fluid communication with the comestible mixture would be undesirable since the sensor would need to be cleaned and sanitized or made disposable. FIG. 61 shows an inventive pressure sensor 480 that mates with the outside of the tubing of the bag system. Tubing 481 is held between a stationary member 482 and movable member 483. Movable member 483 is free to move side to side in FIG. 61. A force 485 is applied on movable member 483. The force can come from a spring, for example. Tube 481 is made to be highly flexible. Ideally the tubing 481 is made from a plastic material like the freeze bag. The force 485 applied to the movable member 483 tends to collapse the tube 481, while pressure in the tube 481 tends to inflate the tube. The movable member position balanced by these forces can be calibrated to indicate pressure in the tube 481. Sensing member 484 measures the position of the movable member 483. The sensing member 484 can communicate the sensed pressure for display or system control.

The air compressor used for supplying pressurized air in the embodiments of the present disclosure can be of any type known in the art. Since the compressor itself only contacts air or other relatively clean gas and is not in contact with the comestible mixture, the compressor is not subject to regular cleaning and sanitizing. However, it can still be advantageous for the air compressor to be a peristaltic type pump. Conventional peristaltic type pumps require tubing that has some elasticity but is rigid enough to hold its typically round shape. For the present disclosure, there are certain advantages to having the tubing be the same material as the freeze bag and reservoir bag. One benefit is the very low cost for this tubing. Tubing made from this material lies flat unless a higher internal pressure inflates it. This can make it unsuitable for use in a peristaltic pump. If the reservoir bag 461 (FIG. 60) is disposed above the pump 470, hydrostatic pressure from the liquid comestible mixture will inflate the tubing, allowing the tubing to be used with a peristaltic pump. If the reservoir bag 461 is below the pump 470 and/or below the freeze bag 464 any means previously discussed can be used to pressurize the reservoir bag so that the pressure in the reservoir bag is higher than the ambient pressure. This will inflate the tubing and allow the peristaltic pump to function properly.

Figure 62A:
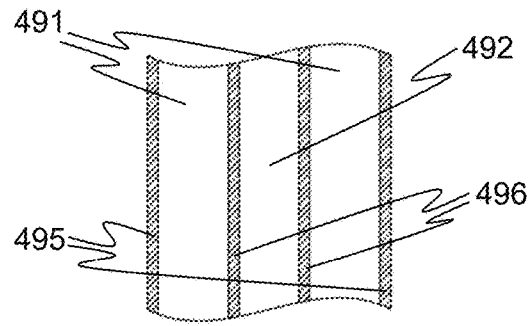
FIG. 62A illustrates an exemplary system for combining liquid and air tubing so that both can be utilized in a peristaltic pump and which is suitable for use in a frozen confection machine made in accordance with the present disclosure.
Figure 62B:
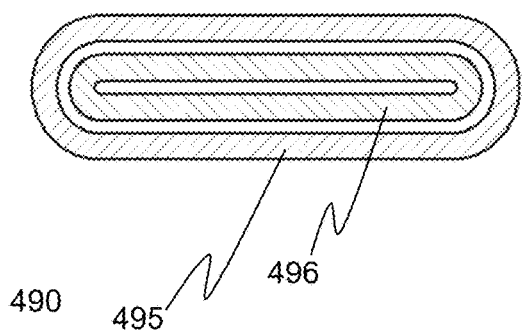
FIG. 62B is an illustration showing additional details of the system of FIG. 62A.
Figure 62C:
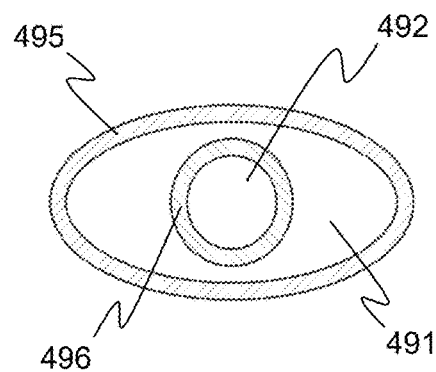
FIG. 62C is another illustration showing additional details of the system of FIG. 62A.
Figure 62D:
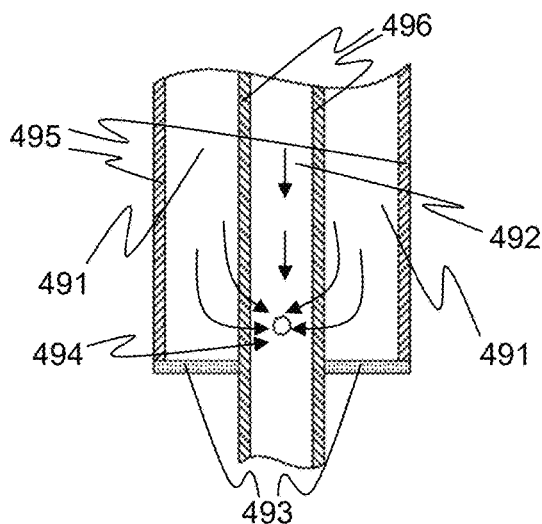
FIG. 62D shows yet another illustration having additional details of the system of FIG. 62A.
Figure 63:
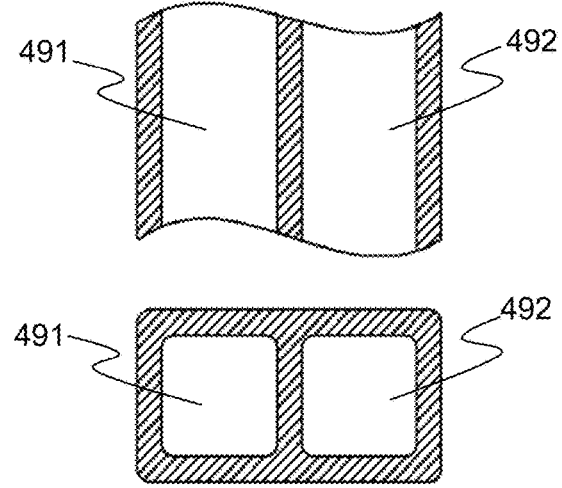
FIG. 63 is an illustration showing additional details of the system of FIG. 62A where both air and liquid can be pumped efficiently when inserted in a peristaltic pump.

FIGS. 62A-62D illustrate a system 490 for combining the liquid and air tubing so that both can be utilized in a peristaltic pump. An inner tube 496 is fitted inside a larger diameter outer tube 495. When there is no pressure in the inner tube 496, it lays flat as shown in the bottom section view of FIG. 62B. When liquid 492 pressurizes inner tube 496, outer tube 495 is partially inflated (FIG. 62C). When inserted in a peristaltic pump, both air 491 and liquid 492 (FIG. 63) can be pumped efficiently. The front section view of FIG. 62D shows one method of injecting air 491 into the liquid line 496. A seal 493 is formed at one end of the air line 495. A hole 494 in the liquid line 496 provides a flow path for air 491 to enter the liquid line 496 from the outer tube 495. The seal end 493 and hole end 494 are located downstream of the pump. One or multiple holes can be used to control flow rate and premixing of the air and comestible mixture.

Figure 64A:
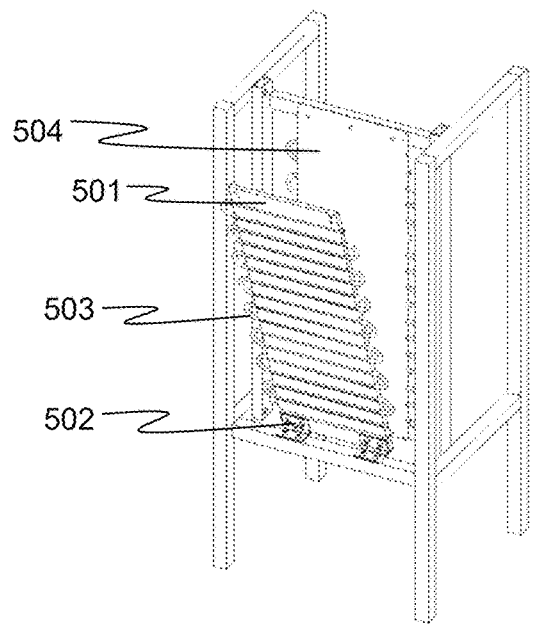
FIG. 64A illustrates an exemplary embodiment of a frozen confection machine made in accordance with the present disclosure and which is configured to ease the loading of the freeze bag into the machine and where the front cold plate is in the open position for loading.
Figure 64B:
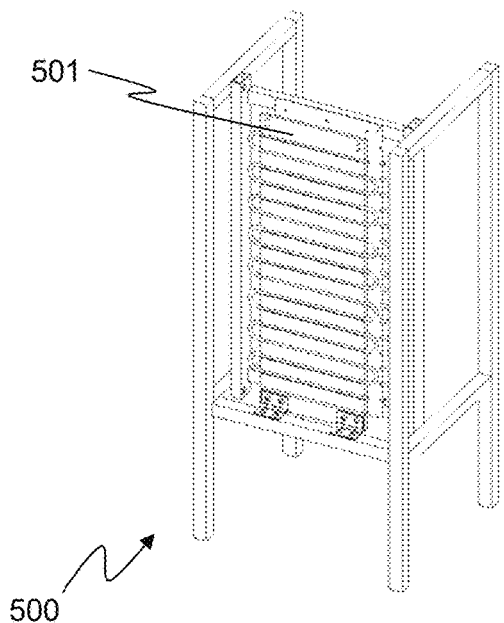
FIG. 64B is another illustration of the frozen confection machine from FIG. 64A where the front cold plate is in the closed position for running the machine.

FIGS. 64A and 64B illustrate an embodiment of a frozen confection machine 500 configured to ease the loading of the freeze bag into the machine. The front cold plate 501 pivots forward on hinges 502. Flex tubing (not shown) connects the coolant tubing 503 to the cooling system (not shown). Pivoting of the front cold plate 501 provides space between the front cold plate 501 and rear cold plate 504 for easily inserting the freeze bag (not shown). FIG. 64A shows the front cold plate 501 in the open position for loading. FIG. 64B shows the front cold plate 501 in the closed position for running the machine.

Figure 65A:
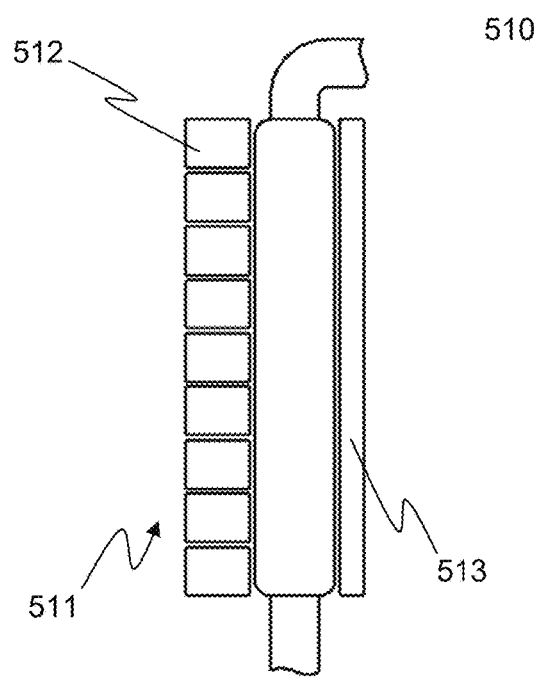
FIG. 65A illustrates an exemplary embodiment of a kneading and dispensing assembly suitable for use in a frozen confection machine made in accordance with the present disclosure which includes a segmented cold plate.
Figure 65B:
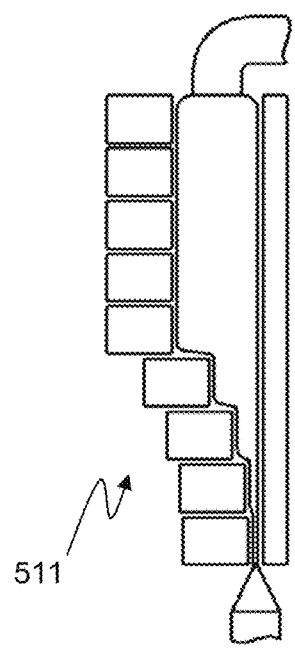
FIG. 65B is an illustration showing additional detail of the segmented cold plate of FIG. 65A and which includes segments that are independently movable from side to side.
Figure 65C:
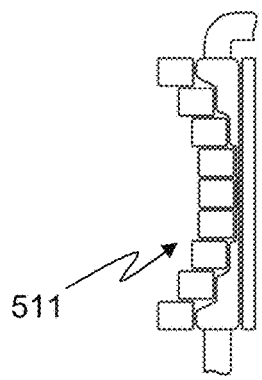
FIG. 65C is a second illustration of the segmented cold plate of FIG. 65B.
Figure 65D:
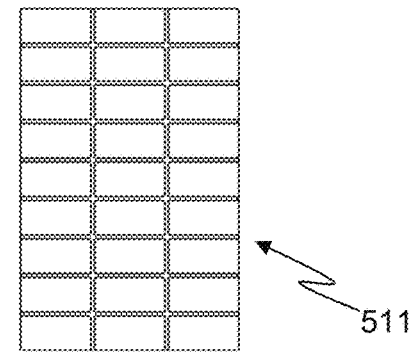
FIG. 65D shows a front view of the segmented cold plate from FIG. 65A.

FIGS. 65A-65H show multiple side views of alternative embodiments for kneading and dispensing the frozen confection in the freeze bag. The alternative embodiment 510 illustrated in FIGS. 65A-65D shows a segmented cold plate 511. The cold plate segments 512 are independently moveable from side to side as illustrated in FIGS. 65B and 65C. Coordinated movement of the segments 512 is used to knead and dispense the mixture. FIG. 65D shows a front view of the segmented cold plate 511 with one possible arrangement of the segments. The second cold plate 513 is shown without segments, but it could also be segmented similar to plate 511.

Figure 65E:
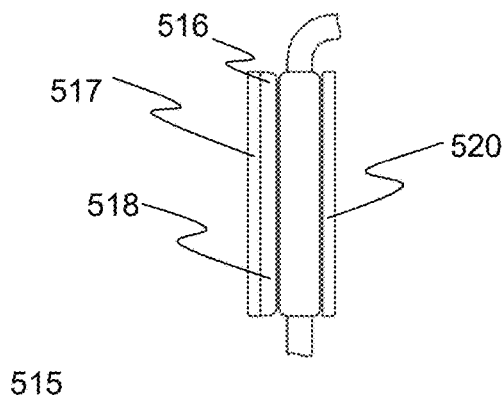
FIG. 65E illustrates another exemplary embodiment of a kneading and dispensing assembly suitable for use in a frozen confection machine made in accordance with the present disclosure which includes a deformable membrane attached to a first cold plate.
Figure 65F:
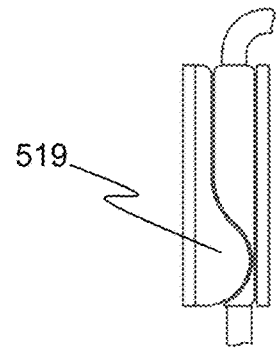
FIG. 65F is an illustration showing additional detail of the deformable membrane and first cold plate of FIG. 65E and which includes a hump in the membrane caused by the application of a magnetic field.
Figure 65G:
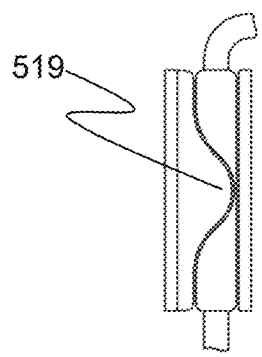
FIG. 65G is a second illustration of the deformable membrane and first cold plate of FIG. 65F.

The alternative embodiment 515 illustrated in FIGS. 65E-65G shows a deformable membrane 516 attached to a first cold plate 517. A ferrofluid 518 or magnetorheological fluid is contained between the membrane 516 and first cold plate 517. Ferrofluids and magnetorheological fluids are known in the art and contain nanoscale or microscale ferromagnetic particles in a carrier fluid. Ferrofluids can be shaped, deformed and moved by proper application of a magnetic field. The ferrofluid is preferably chilled by the cold plate 517. As shown in FIGS. 65F and 65G, application of a magnetic field (not shown) can cause a hump 519 in the membrane 516. Movement of the magnetic field is used to move the hump 519 upward to knead and dispense the comestible mixture. The hump 519 can extend a part of the width of the cold plates 517, 520 which is ideal for kneading. The hump 519 can also extend the full width of the cold plates 517, 520 for dispensing. The movement of the magnetic field can be done by moving permanent magnets, using an intermediate material to distort the magnetic field, using electromagnets, or a combination thereof.

Figure 65H:
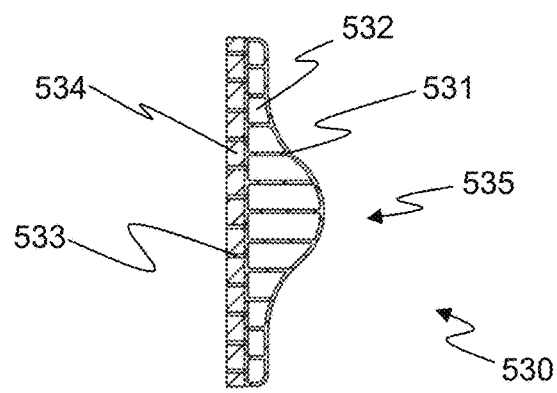
FIG. 65H illustrates another exemplary embodiment of a kneading and dispensing assembly suitable for use in a frozen confection machine made in accordance with the present disclosure which includes a deformable membrane segmented into separate fluid chambers.

FIG. 65H shows an alternative embodiment 530 similar to embodiment 515 in FIGS. 65E-65G. A deformable membrane 531 is segmented into separate fluid chambers 532. Each fluid chamber 532 is in fluid communication with ports 533 in the cold plate 534. The ports 533 are used for filling and emptying the fluid chamber 532 with a chilled fluid. The fluid could be a liquid, gas, or two-phase fluid, but is preferably a liquid. Controlling the filling of each fluid chamber independently is used to form humps 535 or other shapes in the membrane 531 for the purpose of kneading and dispensing the comestible mixture.

Figure 66A:
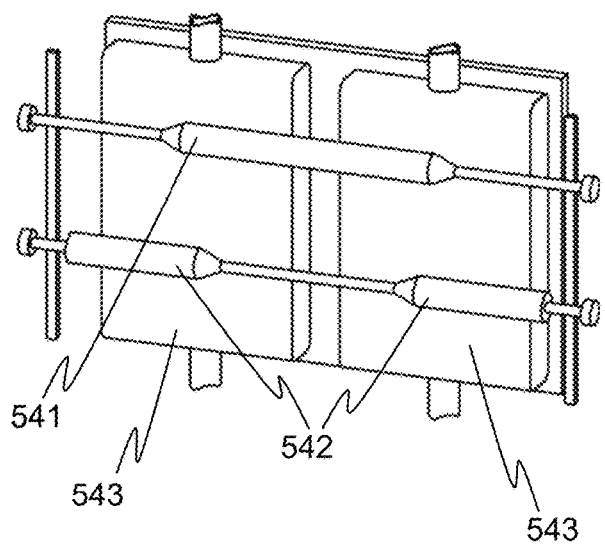
FIG. 66A illustrates an exemplary roller assembly suitable for use in a frozen confection machine made in accordance with the present disclosure and which is configured to work for both single/two flavor setups and with small freeze bags.
Figure 66B:
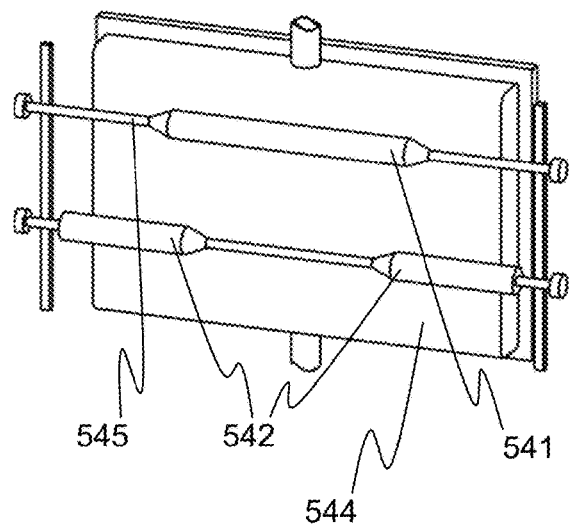
FIG. 66B is an illustration showing additional detail of the roller assembly of FIG. 66A and which is configured to work for both single/two flavor setups and with large freeze bags.

The arrangement of FIGS. 57A-57B illustrates an exemplary frozen confection machine that is convertible between a single and two flavor machine. For such a machine, it would be desirable for the same configuration of kneading rollers to work for both the single and two flavor setups. FIGS. 66A and 66B illustrate a roller configuration that works for both single and two flavor setups. An inner roller 541 is used in conjunction with outer rollers 542. The roller conveyer system illustrated in FIGS. 66A-66B would generally include more than two roller bars 545. However, only two are shown for convenience. When the roller setup shown is used with small freeze bags 543 (FIG. 66A) or a large freeze bag 544 (FIG. 66B), the rollers 541, 542 will cover all parts of the freeze bags. However, the roller setup on each roller bar 545 will not cover the full width of the freeze bags 543, 544, since such an arrangement would prevent the comestible mixture from flowing around the rollers during the kneading and freezing process as needed.

Figure 67:
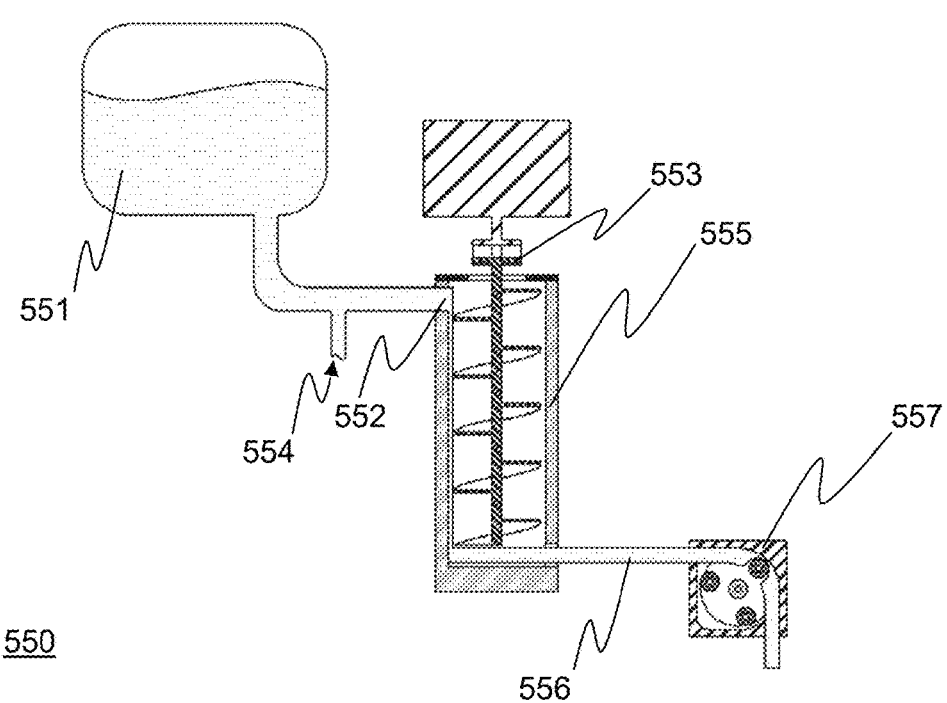
FIG. 67 illustrates an exemplary embodiment of an agitation system which is suitable for use in a frozen confection machine made in accordance with the present disclosure.

Agitation of the comestible mixture in the freeze bag has thus far been described herein as being performed on the outer surface of the freeze bag. However, low cost expendable elements could also be inserted inside the freeze bag to agitate the mixture to achieve small ice crystal size and overrun. FIG. 67 illustrates one such interior agitation system 550. A reservoir bag 551 is attached to a generally tubular freeze bag 552. The freeze bag 552 is supported by a cold tube 555 that cools and freezes the comestible mixture. A mixing rod 553 fits inside the freeze bag 552. The mixing rod 553 is made of injection molded plastic so that it is low cost and disposable. Other low-cost materials and manufacturing methods could be used. Air line 554 is used for introducing air into the comestible mixture. The mixing rod 553 has a helical or other geometry such that when the rod rotates, it mixes the comestible mixture and pushes it downward. The comestible mixture exits the dispensing end 556 of the freeze bag 552. A pump 557 can be used to assist with dispensing.

Figure 68A:
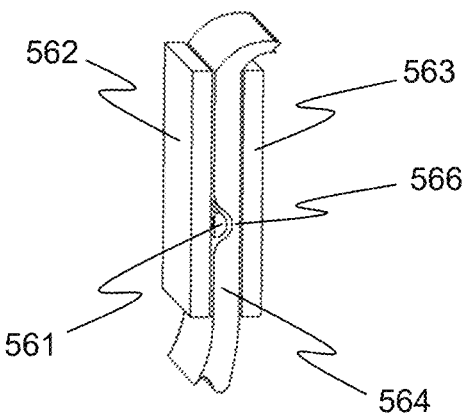
FIG. 68A illustrates another exemplary embodiment of an agitation system suitable for use in a frozen confection machine made in accordance with the present disclosure and which includes a mixing bar having piezoelectric actuators that produce ultrasonic vibrations for agitation.
Figure 68B:
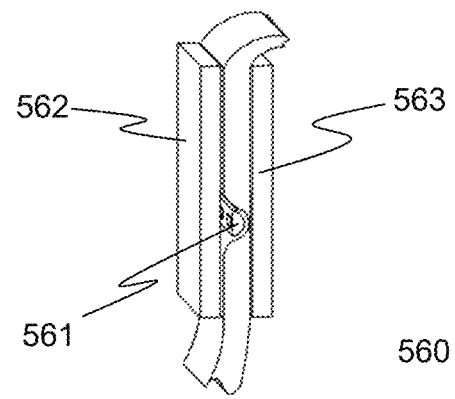
FIG. 68B is an illustration showing additional details of the agitation system of FIG. 68A.
Figure 68C:
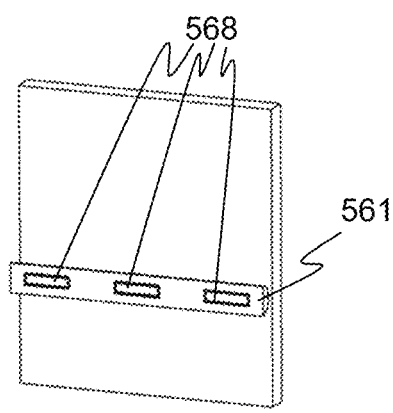
FIG. 68C is another illustration showing additional details of the agitation system of FIG. 68A.
Figure 68D:
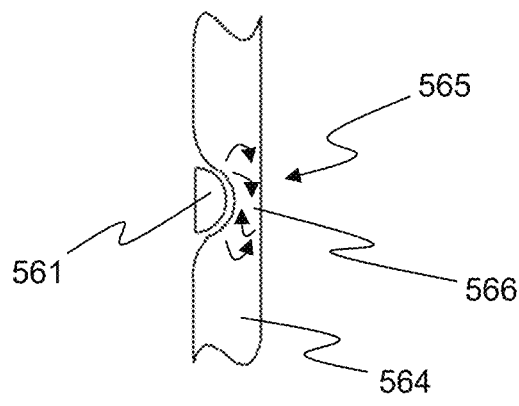

FIGS. 68A-68D illustrate an alternative arrangement 560 where the mixing rollers are replaced with a mixing bar 561 having piezoelectric actuators 568 that produce ultrasonic vibrations in the bar. The mixing bar 561 fits between the cold plates 562, 563. The freeze bag 564 is also between the cold plates 562, 563. The mixing bar 561 is in contact with the freeze bag 564 as shown in FIG. 68A. The ultrasonic vibrations by actuators 568 agitate the comestible mixture in the vicinity 565 of the mixing bar 561. This agitation detaches ice crystals from the freeze bag 564 and moves unfrozen mix to the surface of the freeze bag. Since the ultrasonic vibrations from actuators 568 are providing the mixing action, it is not necessary for the mixing bar 561 to pinch the freeze bag 564 so that there is no gap between the two sides of the freeze bag 564. The gap 566 that exists in the freeze bag 564 at the location of the mixing bar 561 allows the comestible mixture to flow past the mixing bar 561 as it traverses the freeze bag 564. Therefore, the mixing bar 561 can extend the full width of the freeze plates 562, 563 as shown in FIG. 68C. When it is time to dispense product, the mixing bar 561 is moved to one side so that gap 566 is eliminated as shown in FIG. 68B. The arrangement of the system 560 illustrated in FIGS. 68A-68D has several advantages over rollers. For example, mixing of liquid and frozen comestible mix is reduced, a positive dispensing method that eliminates the possible need for a dispensing pump is provided, and the dispensing of both soft serve and slush beverages is permitted.

Figure 69:
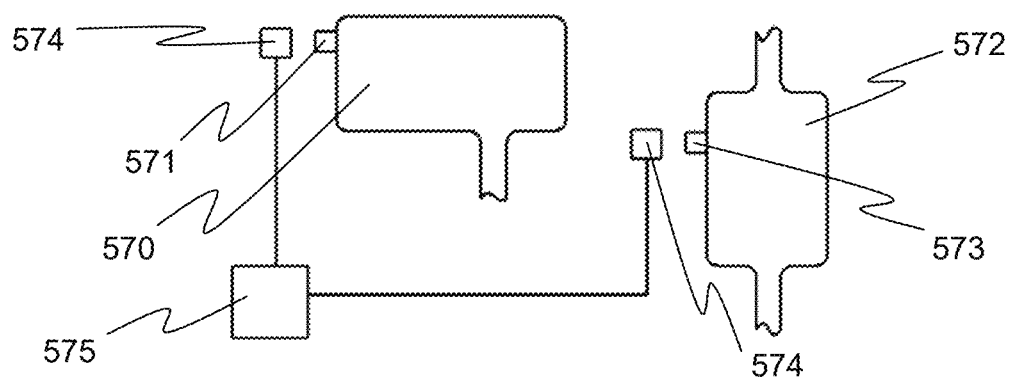

It is possible that the end user of the inventive frozen confection machine embodiments of the present disclosure would attempt to use the bag system components beyond their recommended life. This could result in rupture of the components or allow sufficient time for pathogens to reach unacceptable levels in the comestible mix. It is also possible that use of unauthorized counterfeit bag system components in the frozen confection machine occurs. To avoid these scenarios, FIG. 69 illustrates a system with reservoir bag 570 which is equipped with an encrypted code 571. Similarly, the freeze bag 572 can be equipped with an encrypted code 573. Other bag system components could also have a similar code. The codes 572, 573 can be physically attached to the bag system components, be detachable, or come preinstalled with the components. The encrypted code can use any means of encryption known in the art (or can be unencrypted) and the information can be stored by any means known in the art. Examples include but are not limited to visible markings (machine or human readable), bar codes, QR codes, and/or RFID tags. The data storage method or methods in such embodiments can be active or passive. The frozen confection machine is equipped with one or more sensors 574 or methods of communicating the encrypted information to the frozen confection machine processing unit 575. The processing unit 575 determines if the bag system components are acceptable for use in the machine. The processing unit 575 is also configured to track other parameters in the machine, such as the total time which the various bag system components have been used. The processing unit 575 is further configured to notify the user when it is time to replace bag system components.

There are a multitude of ways known in the art that can be used with the inventive frozen confection machine for sensing various physical parameters, such as but not limited to, weights, temperatures, pressures, speeds, torques, positions, orientations, volume or mass flow rates, electrical current, and power. All or part of this information can be can be processed, acted on, displayed, logged, and transmitted. This can be accomplished with electrical means, mechanical means or other means known in the art. For example, a sensor that measures the weight of the reservoir bag could be used to determine when the reservoir bag is low, this information could be transmitted to a mobile device to notify the user.

Figure 70A:
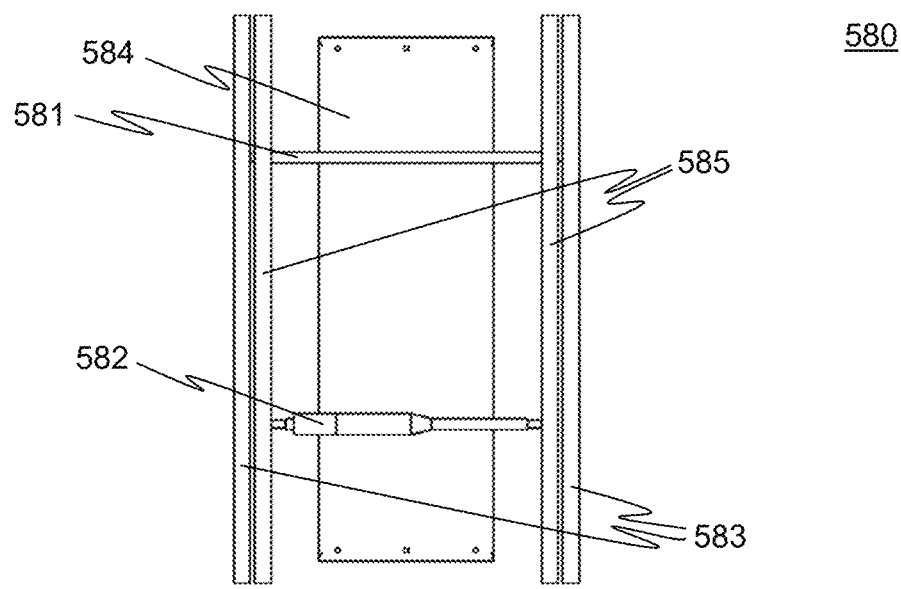
Figure 70B:
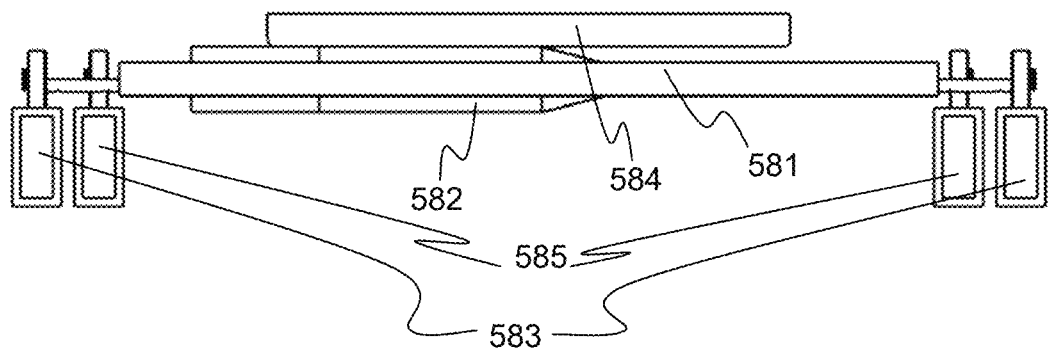
Figure 70C:
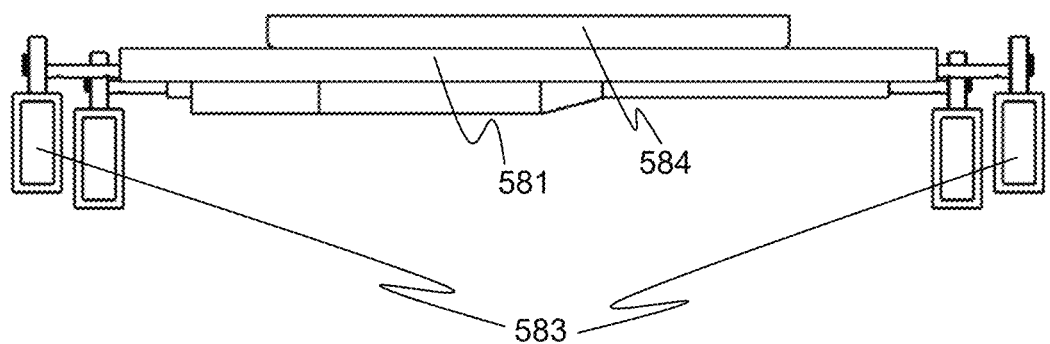

FIG. 70A-70C show a partial assembly of a roller system 580 for churning and dispensing the comestible mixture. The roller system operates in a manner similar to embodiment 200 in FIG. 25., with an added feature to improve dispensing. With reference to FIG. 70 a dispensing roller 581 has an outer diameter that is smaller than the outer diameter of the churning roller 582. The dispensing roller extends the full width of the cold plate 584 and freeze bag (not shown). Inner guide rails 585 control the spacing between the churning roller 582 and cold plate 584. Typically the churning roller 582 is very close to the cold plate 584 and the freeze bag is pinched between them as previously described. Outer guide rails 583 control the spacing between the dispensing roller 581 and cold plate 584. When guide rails 583 are in a first position dispensing (FIG. 70B) roller 581 is spaced off of the cold plate 584. For example, the space between the dispensing roller 581 and cold plate 584 may be approximately ⅛ inch to 2 inches. This allows the comestible mix to flow between the dispensing roller 581 and cold plate 584. When guide rails 583 are in a second position (FIG. 70C) dispensing roller 581 is in close proximity to cold plate 584. Therefore, when dispensing roller 581 is moving toward the dispensing end of the freeze bag the comestible mixture is forced toward the dispensing end and out through the dispensing nozzle. Note that although only two positions of the outer guider rails 583 and dispensing roller 581 are shown, there could in fact many in between positions with other benefits. For example, when the freeze bag is relatively full with frozen comestible mixture it may desirable to maintain some gap between the dispensing roller 581 and cold plate 584 so that dispensing doesn't occur too quickly or freeze bag pressure limits are not exceeded. Also, outer guide rails 583 may not extend the full length of the cold plate 584 or they could be sectioned in various ways so that the distance between the dispensing roller 581 and cold plate 584 can vary along the length of the cold plate. For example, it may be desirable for the dispensing roller 581 to be close to the cold plate 584 only on the end of the cold plate where the frozen comestible mixture is ready for dispensing. The outer guide rails 583 in FIGS. 70B-70C are shown to move in unison, but can, optionally, move independently with certain desirable effects. The inner guide 585 rails are depicted stationary but could also be made movable with certain desirable effects. FIG. 70A-70C depicts only one dispensing roller 581 and one churning roller 582, however, multiple rollers of either and other types can be included as previously described in prior embodiments.

Figure 71:
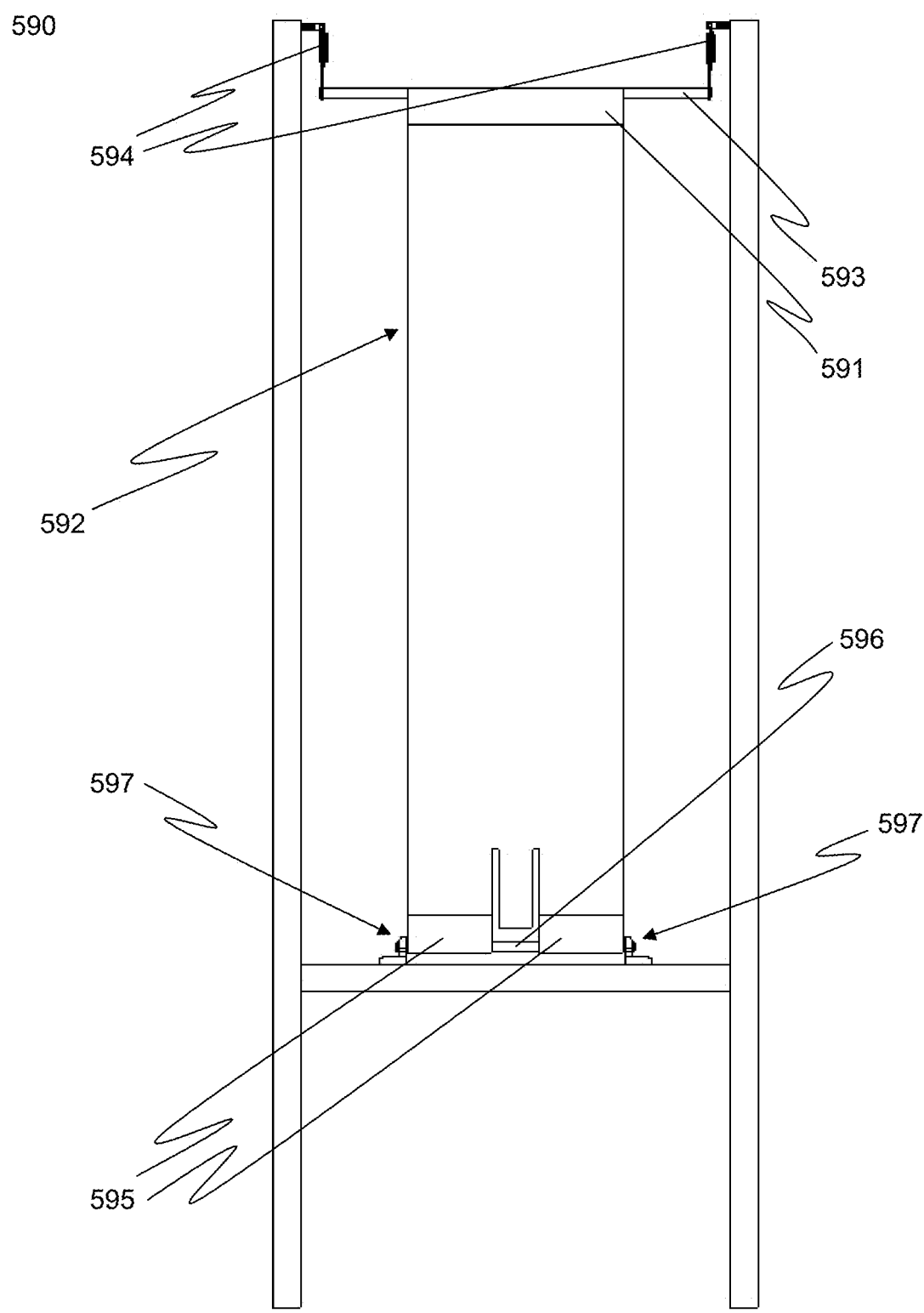

A freeze bag fixturing method 590 is shown in FIG. 71. A looped upper end 591 of freeze bag 592 accepts an upper rod 593 that is supported by springs 594. A lower looped end 595 of freeze bag 592 accepts a lower rod 596 that is supported by restraints 597.

Figure 72A:
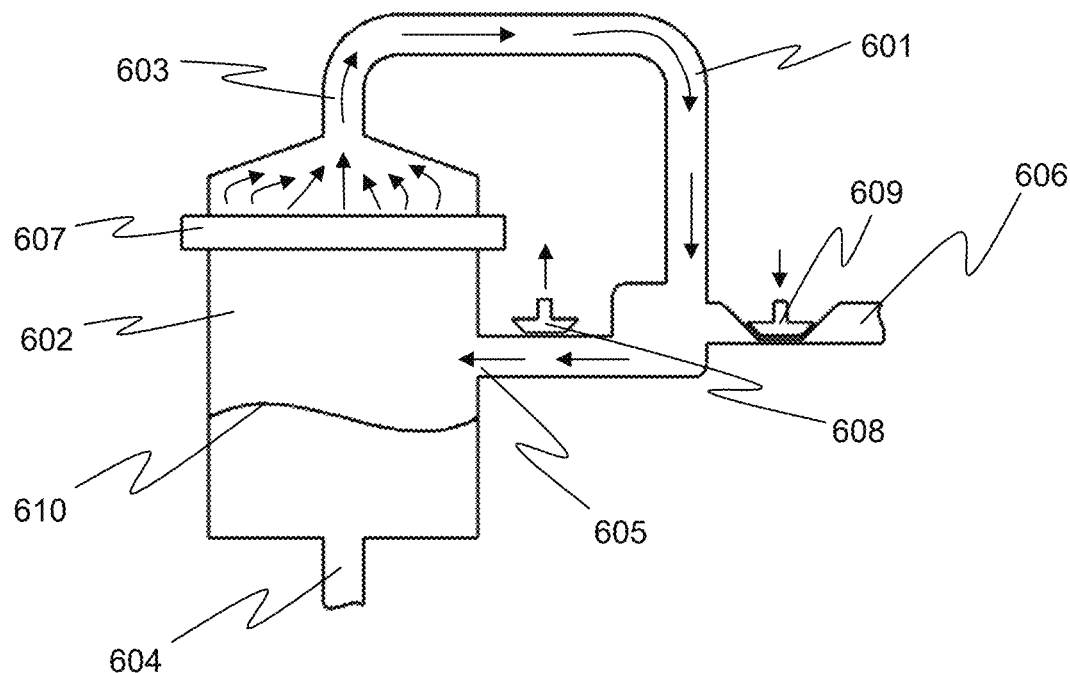
Figure 72B:
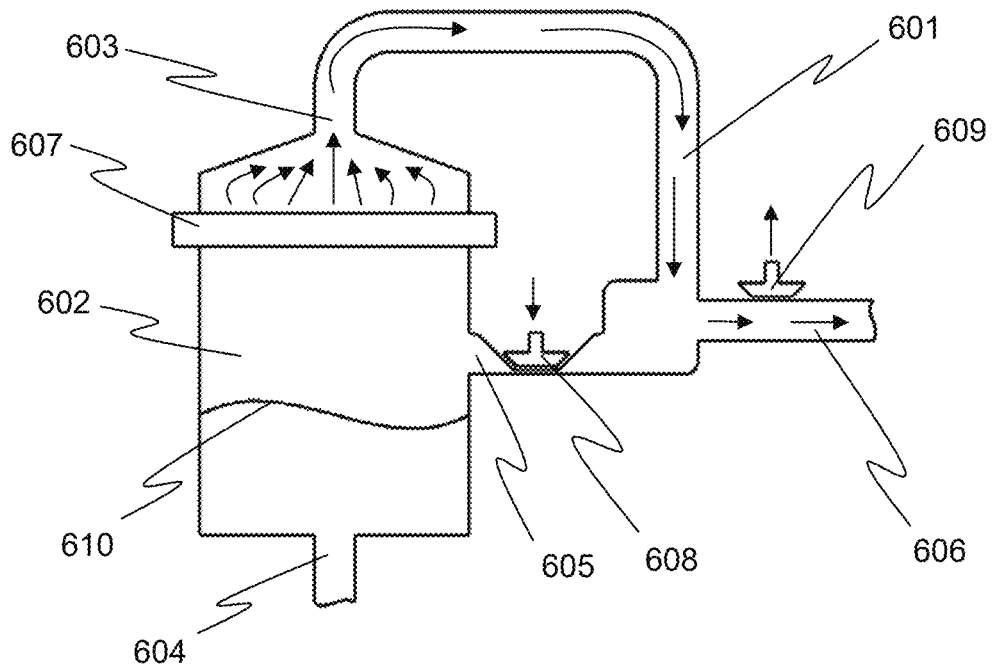

FIGS. 72A-72B depicts an alternate freeze bag system 600. Freeze bag 602 has a bypass tube 601, outlet tube 603, inlet tube 604, return tube 605, and dispensing tube 606. Roller 607 or physical element of any type previously described moves upward in the current figure forcing all or some of the comestible mixture into the outlet tube 603 and into the bypass line 601. When bypass valve 608 and dispensing valve 609 are in a first position, as depicted in FIG. 72A, dispensing valve 609 is closed and the bypass valve 608 is open. In this case, comestible mixture flows back into the freeze bag 602 from the return tube 605. The return tube 605 is shown entering the freeze bag above the liquid level 610 of the comestible mixture. This has certain desirable effects, such as preventing frozen mixture from mixing with liquid mixture. However, the return tube 605 could be at other positions such as below the liquid comestible mixture level 610 with certain benefits. When bypass valve 608 and dispensing valve 609 are in a second position as, depicted in FIG. 72B, comestible mixture is exits through the dispensing tube 606 and is prevented from entering the freeze bag 602 by way of the return tube 605.

Although specific features of the embodiments of the disclosure are shown in some drawings and not others, this is for convenience only as some feature may be combined with any or all the other features in accordance with the disclosure. Other embodiments will occur to those skilled in the art and are within the following claims.

This written description uses examples to describe the disclosure, including the best mode, and also to enable a person skilled in the art to make and use the disclosure. Other examples that occur to those skilled in the art are intended to be within the scope of the disclosure if they have structural elements that do not differ from the same concept, or if they include equivalent structural elements with insubstantial differences.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed is:

1. An apparatus that freezes an associated liquid mixture into an associated product that is at least partially frozen, the apparatus comprising:
   at least one flexible wall freeze bag configured to receive an associated mixture therein;
   at least one physical element configured to contact and move along an outer surface of the freeze bag wherein the physical element causes the walls of the freeze bag to contact each other in the area of the physical element such that a temporary seal is formed and to agitate the associated mixture in the freeze bag and
   the at least one physical element extends between two ends, with a width of the physical element being less than a width of the at least one freeze bag, and such that the agitation includes some of the associated mixture flowing around and beyond at least one end of the at least one physical element;
   a cooling element that cools the associated mixture in the freeze bag through the outer surface of the freeze bag from an initially liquid state to an at least partially frozen state;
   wherein there are plurality of the at least one physical element each extending between the two ends, and a first of the ends being on a first side of the at least one flexible wall freeze bag, and a second of the ends at a second side of the at least one freeze bag, with the associated mixture flowing around and beyond at least one of the first ends in one of the plurality of physical elements and beyond at least one of the second ends in another of the plurality of physical elements; and
   wherein the freeze bag is initially empty when received in the apparatus.

2. The apparatus of claim 1 further comprising a dispensing nozzle in communication with an opening in the freeze bag, the dispensing nozzle having open and closed states to selectively dispense the at least partially frozen state of the associated mixture from the freeze bag.

3. The apparatus of claim 1 wherein the at least one physical element is configured to selectively allow flow therepast.

4. The apparatus of claim 3, wherein the freeze bag has a cavity, and the at least one physical element (i) contacts less than a width of the cavity in the freeze bag such that a flow passage exists from a leading end of the physical element to a trailing end of the physical element to enable the associated mixture to flow within the freeze bag, (ii) includes multiple rollers in spaced relation to enable flow of the associated mixture around the multiple rollers, or (iii) is configured to contact a full width of the cavity in the freeze bag and includes a separate flow passage that enables the associated mixture to flow around the physical element when the dispensing nozzle is closed.

5. The apparatus of claim 1 wherein the freeze bag is configured to be pressurized with a liquid or gas.

6. The apparatus of claim 2 further comprising a support structure that structurally supports the freeze bag therebetween, the support structure configured to at least one of (i) be movable, removable, or adjustable, (ii) form the physical element, (iii) include a cooling element; and (iv) include first and second cold plates that are in thermal contact with opposite faces of the freeze bag.

7. The apparatus of claim 1 further comprising at least one reservoir not in substantial contact with the physical element for agitating the freeze bag, the reservoir configured to contain the associated mixture, and the reservoir in fluid communication with the freeze bag to enable flow of the associated mixture from the reservoir to the freeze bag.

8. The apparatus of claim 2 wherein the freeze bag includes plural freeze bags to contain an associated different mixture.

9. The apparatus of claim 1 wherein a freeze bag outlet is associated with an upper end of the freeze bag and a freeze bag inlet is associated with a lower end of the freeze bag such that higher viscosity, at least partially frozen mixture resists gravity and collects at an upper end of the freeze bag, while lower viscosity, mostly liquid mixture collects at a lower end of the freeze bag.

10. The apparatus of claim 1 wherein the physical element is configured to move from an inlet end of the freeze bag to an outlet end of the freeze bag.

11. The apparatus of claim 1 wherein a separation element separates an inlet end from an outlet end of the freeze bag.

12. The apparatus of claim 7 wherein the associated mixture in the reservoir is mechanically stirred from an outer surface of the reservoir.

13. The apparatus of claim 2 wherein at least one of the reservoir or the freeze bag includes a readable code wherein the readable code includes one of (i) human readable information, (ii) machine readable information, (iii) at least one of passive and active information, and (iv) at least one of encrypted and unencrypted information.

14. The apparatus of claim 1 wherein the cooling element is divided into different cooling or temperature zones.

15. The apparatus of claim 2 further comprising a check valve at the freeze bag opening so associated liquid mixture does not flow back out of the freeze bag.

16. The apparatus of claim 15, wherein the check valve is constructed from a flexible material in tube form with a first tube of a first inflated diameter inserted a distance into a second tube of a second inflated diameter, wherein a second tube diameter is larger than a first tube diameter, such that when a pressure differential urges fluid into the first tube, the pressure differential inflates the first and second tubes allowing relatively unimpeded flow, and when a pressure differential urges fluid into the second tube the pressure differential collapses the portion of the first tube inserted into the second tube, such that flow is impeded.

17. The apparatus of claim 1, wherein a force acts on a movable member to deflect an outer surface of the freeze bag, reservoir, or any tubing associated with the freeze bag or reservoir whereby the force is calibrated to measure the internal fluid pressure therein.

18. The apparatus of claim 1 wherein a tube member is constructed from a flexible material in tube form with a first tube of a first inflated diameter inserted through a second tube of a second inflated diameter, wherein a second tube diameter is larger than a first tube diameter, the second tube is sealed at one end but allows the first tube to pass therethrough, a hole in the first tube toward the sealed end of the second tube such that fluid communication is established between the first tube and the second tube, a fluid volume formed between the first tube and second tube when the first tube is inflated, a peristaltic element pinching the first tube and second tube, the peristaltic element moving toward the sealed end of the second tube urging fluid in the first tube toward and past the sealed end of the second tube, and the fluid in the second tube, urged by the peristaltic element, moving toward the sealed end of the second tube and into the first tube through the hole in the first tube.

19. The apparatus of claim 1, wherein the physical element is a deformable membrane.

20. The apparatus of claim 8 wherein the freeze bags are aligned perpendicular to a front face of the apparatus.

21. The apparatus of claim 1, wherein at least one of the plurality of physical elements allowing flow around and beyond both the first end and the second end.

22. A method of making a frozen confection with an apparatus that freezes a liquid mixture and dispenses a product that is at least partially frozen, the method comprising:

providing at least one flexible wall freeze bag configured to receive an associated mixture therein, the at least one freeze bag being initially empty when moved into the apparatus, and then moving the associated mixture into the freeze bag;

agitating the mixture in the freeze bag with at least one physical element acting on a first external surface of the freeze bag and causing the walls of the freeze bag to contact each other in the area of the physical element such that a temporary seal is formed and the at least one physical element extends between two ends, with a width of the physical element being less than a width of the at least one freeze bag, and such that the agitation includes some of the associated mixture flowing around and beyond at least one end of the at least one physical element;

cooling the mixture in the freeze bag with a cooling element through a second opposed external surface of the freeze bag from an initially liquid state to an at least partially frozen state; and wherein there are plurality of the at least one physical element each extending between the two ends, and a first of the ends being on a first side of the at least one flexible wall freeze bag, and a second of the ends at a second side of the at least one freeze bag, with the associated mixture flowing around and beyond at least one of the first ends in one of the plurality of physical elements and beyond at least one of the second ends in another of the plurality of physical elements.

23. The method of claim 22 further comprising providing an opening in the freeze bag having a dispensing nozzle in communication therewith, the dispensing nozzle having open and closed states, such that the method further includes selectively dispensing the at least partially frozen state of the associated mixture from the freeze bag.

24. The method of claim 22 further comprising configuring the at least one physical element to selectively allow flow therepast.

25. The method of claim 22, further comprising dimensioning the at least one physical element such that the at least one physical element (i) contacts less than a width of the cavity in the freeze bag such that a flow passage exists from a leading end of the physical element to a trailing end of the physical element to enable the associated mixture to flow within the freeze bag, (ii) includes multiple rollers in spaced relation to enable flow of the associated mixture around the multiple rollers, or (iii) is configured to contact a full width of the cavity in the freeze bag and includes a separate flow passage that enables the associated mixture to flow around the physical element when the dispensing nozzle is closed.

26. The method of claim 22 further comprising pressurizing the freeze bag with a liquid or gas.

27. The method of claim 22 further comprising supporting the freeze bag with a support structure, and at least one of configuring the support structure to (i) be movable, removable, or adjustable, (ii) form the physical element, (iii) include a heat absorbing element; and (iv) include first and second cold plates that are in thermal contact with opposite faces of the freeze bag.

28. The method of claim 22 further comprising agitating the freeze bag with the physical element; providing at least one reservoir to contain the associated mixture where the reservoir is not in substantial contact with the physical element, and enabling flow of the associated mixture from the reservoir to the freeze bag.

29. The method of claim 22 wherein the freeze bag providing step includes providing plural freeze bags to contain associated different mixtures.

30. The method of claim 22 providing a freeze bag outlet at an upper end of the freeze bag and a freeze bag inlet at a lower end of the freeze bag such that higher viscosity, at least partially frozen mixture resists gravity and collects at the upper end of the freeze bag, while lower viscosity, mostly liquid mixture collects at the lower end of the freeze bag.

31. The method of claim 22 further comprising configuring the physical element to move from an inlet end of the freeze bag to an outlet end of the freeze bag.

32. The method of claim 22 further comprising controlling contact pressure or displacement of the physical element onto a surface of the freeze bag.

33. The method of claim 22 further comprising providing a separation element that separates an inlet end from an outlet end of the freeze bag.

34. The method of claim 22 further comprising providing at least one reservoir or the freeze bag with a readable code wherein the readable code of the at least one reservoir or the freeze bag includes at least one of (i) human readable information, (ii) machine readable information, (iii) at least one of passive and active information, and (iv) at least one of encrypted and unencrypted information.

35. The method of claim 22 further comprising dividing the cooling element into different cooling or temperature zones.

36. The method of claim 22 further comprising providing a check valve at a freeze bag opening.

37. The method of claim 36, further comprising constructing the check valve from a flexible material in tube form with a first tube of a first inflated diameter inserted a distance into a second tube of a second inflated diameter, wherein a second tube diameter is larger than a first tube diameter, such that when a pressure differential urges fluid into the first tube, the pressure differential inflates the first and second tubes allowing unimpeded flow, and when a pressure differential urges fluid into the second tube the pressure differential collapses a first portion of the first tube inserted into the second tube, such that flow is impeded.

38. The method of claim 22, further comprising providing a force on an outer surface of the freeze bag, reservoir, or any tubing associated with the freeze bag or reservoir and calibrating the force to measure an internal fluid pressure therein.

39. The apparatus of method 22, wherein at least one of the plurality of physical elements allowing flow around and beyond both the first end and the second end.

40. An apparatus that freezes an associated liquid mixture into an associated product that is at least partially frozen, the apparatus comprising:
at least one flexible wall freeze bag configured to receive an associated mixture therein;
at least one physical element acting on an external surface of the freeze bag to agitate the associated mixture in the freeze bag; and
a cooling element that cools the associated mixture in the freeze bag from an initially liquid state to an at least partially frozen state, wherein the freeze bag is initially empty when received in the apparatus.

41. The apparatus of claim 40 further comprising a separation element separating the freeze bag into a section containing more frozen or ready to dispense product and a section that may contain less frozen or not ready to dispense product.

42. The apparatus of claim 41 wherein the separation element is one of a roller, shoe, pressing member, or ultrasonic component.

43. The apparatus of claim 41 wherein the separation element separates an inlet end from an outlet end of the freeze bag.

44. The apparatus of claim 40 wherein the freeze bag includes an inlet that allows introduction of associated mixture into the freeze bag.

45. The apparatus of claim 40 further comprising a dispensing nozzle in communication with an opening in the freeze bag, the dispensing nozzle having open and closed states to selectively dispense the at least partially frozen state of the associated mixture from the freeze bag.

46. The apparatus of claim 40 wherein the at least one physical element is configured to selectively allow flow therepast.

47. The apparatus of claim 40, wherein the freeze bag has a cavity, and the at least one physical element (i) contacts less than a width of the cavity in the freeze bag such that a flow passage exists from a leading end of the physical element to a trailing end of the physical element to enable the associated mixture to flow within the freeze bag, (ii) includes multiple rollers in spaced relation to enable flow of the associated mixture around the multiple rollers, or (iii) is configured to contact a full width of the cavity in the freeze bag and includes a separate flow passage that enables the associated mixture to flow around the physical element when the dispensing nozzle is closed.

48. The apparatus of claim 40 further comprising a support structure that structurally supports the freeze bag therebetween, the support structure configured to at least one of (i) be movable, removable, or adjustable, (ii) form the physical element, (iii) include a cooling element; and (iv) include first and second cold plates that are in thermal contact with opposite faces of the freeze bag.

49. The apparatus of claim 40 further comprising at least one reservoir not in substantial contact with the physical element for agitating the freeze bag, the reservoir configured to contain the associated mixture, and the reservoir in fluid communication with the freeze bag to enable flow of the associated mixture from the reservoir to the freeze bag.

50. The apparatus of claim 40 wherein a freeze bag outlet is associated with an upper end of the freeze bag and a freeze bag inlet is associated with a lower end of the freeze bag such that higher viscosity, at least partially frozen mixture resists gravity and collects at an upper end of the freeze bag, while lower viscosity, mostly liquid mixture collects at a lower end of the freeze bag.

51. The apparatus of claim 40 wherein the physical element is configured to move from an inlet end of the freeze bag to an outlet end of the freeze bag.

52. The apparatus of claim 40, further comprising a freeze bag support structure that includes a freeze bag separation element that when moving vertically upward confines a more viscous, at least partially frozen associated mixture toward an upper end of the freeze bag while a less viscous, less frozen associated mixture falls toward a lower end of the freeze bag.

53. The apparatus of claim 40 further comprising a dispensing nozzle in communication with an opening in the freeze bag, the dispensing nozzle having open and closed states to selectively dispense the at least partially frozen state of the associated mixture from the freeze bag.

* * * * *